（12） United States Patent
Sato et al.

(10) Patent No.: US 10,618,995 B2
(45) Date of Patent: *Apr. 14, 2020

(54) PHOTOSENSITIVE COMPOSITION, IMAGE FORMING METHOD, FILM FORMING METHOD, RESIN, IMAGE, AND FILM

(71) Applicant: FUJIFILM CORPORATION, Minato-ku, Tokyo (JP)

(72) Inventors: Noriaki Sato, Kanagawa (JP); Shota Suzuki, Kanagawa (JP); Yasuhiro Sawamura, Kanagawa (JP); Sean Slater, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,376

(22) Filed: Jul. 19, 2019

(65) Prior Publication Data

US 2019/0338061 A1 Nov. 7, 2019

Related U.S. Application Data

(63) Continuation of application No. 15/890,371, filed on Feb. 7, 2018, now Pat. No. 10,407,531, which is a (Continued)

(30) Foreign Application Priority Data

Aug. 27, 2015 (JP) .................................. 2015-167974

(51) Int. Cl.
*C08F 2/46* (2006.01)
*C08F 2/50* (2006.01)
(Continued)

(52) U.S. Cl.
CPC .............. *C08F 265/06* (2013.01); *B05D 3/06* (2013.01); *B41J 2/01* (2013.01); *B41J 11/002* (2013.01);
(Continued)

(58) Field of Classification Search
CPC ........ C08F 265/06; C08F 2/44; C08F 220/34; C09D 11/01; C09D 11/322; C09D 11/107;
(Continued)

(56) References Cited

U.S. PATENT DOCUMENTS 10,407,531 B2 * 9/2019 Sato ...................... C08F 265/06
2009/0074892 A1 * 3/2009 Bellman .............. A61K 36/889
424/727

FOREIGN PATENT DOCUMENTS

JP H05-142773 A 6/1993
JP 2009-139852 A 6/2009
(Continued)

OTHER PUBLICATIONS

Shoda et al, JP 2010-054808 Machine Translation, Mar. 11, 2010 (Year: 2010).*
(Continued)

Primary Examiner — Jessica Whiteley
(74) Attorney, Agent, or Firm — Solaris Intellectual Property Group, PLLC

(57) ABSTRACT

Provided are a photosensitive composition containing a resin which includes a structural unit A represented by Formula (1) or (2) and a structural unit B represented by Formula (3), (4), or (5); and a radically polymerizable monomer, an image forming method, a film forming method, a resin, an image, and a film. $R^{11}$, $R^{21}$, $R^{31}$, $R^{41}$, and $R^{51}$ represent H or a hydrocarbon group, $R^{12}$ to $R^{14}$ and $R^{22}$ to $R^{24}$ represent a hydrocarbon group, H, or an OH group, $R^{42}$, $R^{43}$, $R^{52}$, and $R^{53}$ represent H or a hydrocarbon group, $L^1$ to $L^3$ represent a single bond or a linking group, $X^1$ represents —O— or —NR$^{15}$—, $X^2$ represent —O— or —NR$^{25}$—, $R^{15}$ and $R^{25}$ represent H or a hydrocarbon group, and $Cy^1$ represents a hydrocarbon group which may contain O and has a cyclic structure.

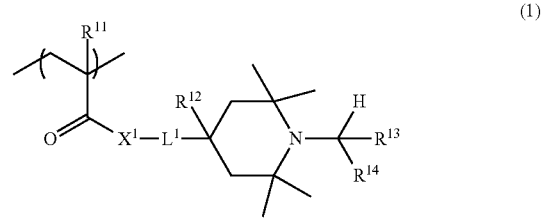

(1)

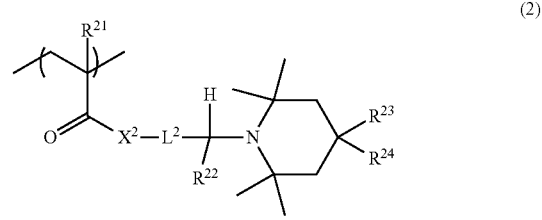

(2)

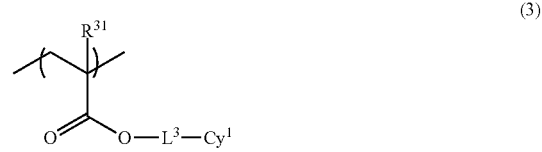

(3)

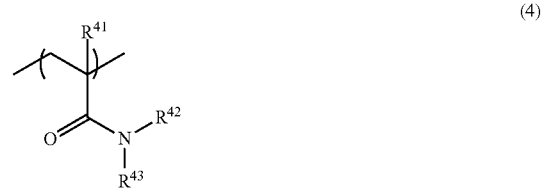

(4)

(Continued)

-continued

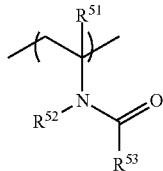

(5)

17 Claims, No Drawings

Related U.S. Application Data continuation of application No. PCT/JP2016/074706, filed on Aug. 24, 2016.

(51) Int. Cl.
| | |
|---|---|
| C08G 61/04 | (2006.01) |
| C08F 265/06 | (2006.01) |
| C08F 220/34 | (2006.01) |
| C08F 2/44 | (2006.01) |
| C09D 11/30 | (2014.01) |
| B41J 2/01 | (2006.01) |
| B05D 3/06 | (2006.01) |
| B41J 11/00 | (2006.01) |
| B41M 5/00 | (2006.01) |
| B41M 7/00 | (2006.01) |
| C09D 11/101 | (2014.01) |
| C09D 11/107 | (2014.01) |
| C09D 11/322 | (2014.01) |

(52) U.S. Cl.
CPC ........ *B41M 5/0047* (2013.01); *B41M 5/0064* (2013.01); *B41M 7/0081* (2013.01); *C08F 2/44* (2013.01); *C08F 220/34* (2013.01); *C09D 11/101* (2013.01); *C09D 11/107* (2013.01); *C09D 11/30* (2013.01); *C09D 11/322* (2013.01)

(58) Field of Classification Search
CPC ........ C09D 11/30; B05D 3/06; B41M 5/0064; B41M 5/0047; B41M 7/0081; B41J 2/01; B41J 11/002

USPC ................ 522/18, 6, 189, 184, 71, 1; 520/1
See application file for complete search history.

(56) References Cited

FOREIGN PATENT DOCUMENTS

| JP | 2009-209352 A | | 9/2009 |
|---|---|---|---|
| JP | 2010-054808 | * | 3/2010 |
| JP | 2010-054808 A | | 3/2010 |
| JP | 2010-85553 A | | 4/2010 |
| JP | 2010-225312 A | | 10/2010 |
| JP | 2011-095433 A | | 5/2011 |
| JP | 2011-225848 A | | 11/2011 |
| JP | 2014-041322 A | | 3/2014 |

OTHER PUBLICATIONS

International Search Report issued in International Application No. PCT/JP2016/074706 dated Oct. 25, 2016.
Written Opinion of the ISA issued in International Application No. PCT/JP2016/074706 dated Oct. 25, 2016.
Examination Report dated Jul. 3, 2018, issued in corresponding AU Patent Application No. 2016311962.
Extended European Search Report dated Jul. 9, 2018, issued in corresponding EP Patent Application No. 16839331.2.
English language translation of the following: Office action dated Nov. 13, 2018 from the JPO in a Japanese patent application No. 2017-536468 corresponding to the instant patent application.
Restriction Requirement dated Dec. 17, 2018 from the US Patent Office in a U.S. Appl. No. 15/890,371.
Non-Final Office action dated Feb. 2, 2019 from the US Patent Office in a U.S. Appl. No. 15/890,371.
Notice of Allowance issued by USPTO in U.S. Appl. No. 15/890,371, dated Apr. 24, 2019.
Supplemental Notice of Allowability issued by USPTO in U.S. Appl. No. 15/890,371, dated Jun. 12, 2019.
English language translation of the following: Office action dated Jun. 26, 2019 from the SIPO in a Chinese patent application No. 201680046963.2 corresponding to the instant patent application.
Australian Office Action dated Jul. 4, 2019, from the Australian Patent Office in an Australian patent application No. 2019200963 corresponding to the instant patent application.

* cited by examiner

PHOTOSENSITIVE COMPOSITION, IMAGE FORMING METHOD, FILM FORMING METHOD, RESIN, IMAGE, AND FILM

This application is continuation of U.S. application Ser. No. 15/890,371, filed Feb. 7, 2018, which is a continuation of, and claims priority to, International Application No. PCT/JP2016/074706, filed Aug. 24, 2016, which claims priority to Japanese Patent Application No. 2015-167974 filed Aug. 27, 2015. Each of the above applications is hereby expressly incorporated by reference, in its entirety, into the present application.

BACKGROUND OF THE INVENTION

1. Field of the Invention

The present invention relates to a photosensitive composition, an image forming method, a film forming method, a resin, an image, and a film.

2. Description of the Related Art

A photosensitive composition is known in various technical fields such as ink compositions, coating compositions for film formation, coating materials, printing plates, and electronic devices (a liquid crystal display device, a solid-state imaging device, and a semiconductor device).

For example, an active radiation curable ink composition including (A) a polymer which includes two or more acidic groups or two or more basic groups; (B) a polymerizable monomer which includes a substituent group capable of forming a counter salt for the acidic groups or the basic groups included in the polymer (A); (C) a photopolymerization initiator; and (D) a polymerizable monomer which has a structure different from that of the polymerizable monomer (B), as an ink composition which is excellent in jetting stability even in a case where stored for a long period of time and has high sensitivity and in which an image obtained by the composition being cured has excellent flexibility, excellent adhesiveness to a recording medium, and high surface hardness, is known (for example, see JP2011-225848A).

Further, as a lithographic printing plate original plate in which development from an acidic region to a neutral region can be performed and which has overcome problems of developability during the development and dispersion stability of a protective layer component (development scum) removed by the development, a lithographic printing plate original plate which includes (A) a sensitizing dye, (B) a polymerization initiator, (C) a polymerizable compound, (D) a photosensitive layer containing a binder polymer, and a protective layer containing at least one kind of acid-modified polyvinyl alcohol in a content of 50% by mass or greater based on the total solid content of the protective layer in order on a hydrophilic support and in which the protective layer and the photosensitive layer of an unexposed portion can be removed by a developer whose pH is in a range of 2 to 8 is known (for example, see JP2009-139852A).

Further, as a photopolymerizable resin composition which is highly sensitive to light in a wavelength range of 300 nm to 600 nm, including visible light, a photopolymerizable resin composition containing a vinyl polymer which has a specific structural unit including a dialkylamino group and an α-diketone which has a specific structure is known (for example, see JP1993-142773A (JP-H05-142773A)).

Further, as an ink composition which has excellent curing sensitivity, scratch resistance, and blocking resistance, and in which stickiness of the surface is suppressed and an image with improved surface curability can be formed, an ink composition containing a polymer which includes (a) a partial structure selected from the group consisting of a fluorine-substituted hydrocarbon group, a siloxane skeleton, and a long-chain alkyl group, a radically polymerizable group, and a tertiary amine structure is known (for example, see JP2009-209352A).

Further, as a dye-containing negative curable composition which is capable of forming an excellent pattern shape without development residual films and residues even in a case where the pixel size becomes finer, a dye-containing negative curable composition containing (A) an organic solvent-soluble dye; (B) a photopolymerization initiator; (C) a polymerizable compound; (D) an amino group-containing alkali-soluble resin which includes a substituted or unsubstituted amino group in the side chain; and (E) an organic solvent is known (for example, see JP2010-85553A).

SUMMARY OF THE INVENTION

However, in regard to the respective photosensitive compositions described in JP2011-225848A, JP2009-139852A, JP1993-142773A (JP-H05-142773A), JP2009-209352A, and JP2010-85553A, further improvement of storage stability, hardness of a formed film, and adhesiveness to a substrate are required in some cases.

The present invention has been made in consideration of the above-described problems and the task thereof is to achieve the following objects.

In other words, an object of the present invention is to provide a photosensitive composition which is capable of forming a film having excellent hardness and excellent adhesiveness to a substrate and has excellent storage stability, and an image forming method and a film forming method using the above-described photosensitive composition.

Further, another object of the present invention is to provide a resin having a new structure, and an image and a film containing the resin.

Specific means for solving the above-described problems includes the following aspects.

<1> A photosensitive composition containing: a resin which includes a structural unit A represented by Formula (1) or (2) and a structural unit B represented by Formula (3), (4), or (5); and a radically polymerizable monomer.

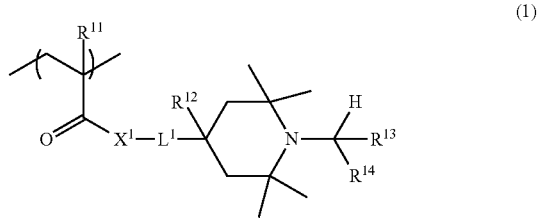

(1)

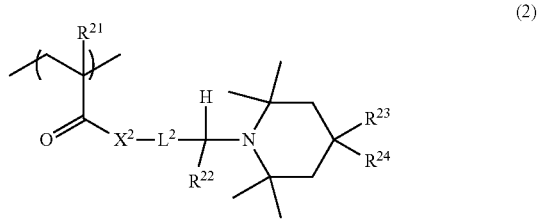

(2)

-continued

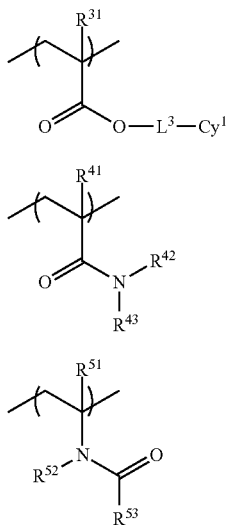

(3)

(4)

(5)

In Formula (1), $R^{11}$ represents a hydrogen atom or a hydrocarbon group, $R^{12}$, $R^{13}$, and $R^{14}$ each independently represent a hydrocarbon group, which may be substituted with a halogen atom and contain an oxygen atom, a hydrogen atom, or a hydroxyl group, $L^1$ represents a single bond or a divalent linking group, $X^1$ represents a —O— group or a —$NR^{15}$— group, and $R^{15}$ represents a hydrogen atom or a hydrocarbon group.

In Formula (2), $R^{21}$ represents a hydrogen atom or a hydrocarbon group, $R^{22}$ represents a hydrocarbon group, which may be substituted with a halogen atom and contain an oxygen atom, a hydrogen atom, or a hydroxyl group, $R^{23}$ and $R^{24}$ each independently represent a hydrocarbon group, which may be substituted with a halogen atom and contain an oxygen atom, a hydrogen atom, or a hydroxyl group or $R^{23}$ and $R^{24}$ are integrated to represent an oxygen atom, $L^2$ represents a single bond or a divalent linking group, $X^2$ represents a —O— group or a —$NR^{25}$— group, and $R^{25}$ represents a hydrogen atom or a hydrocarbon group.

In Formula (3), $R^{31}$ represents a hydrogen atom or a hydrocarbon group, $L^3$ represents a single bond or a divalent linking group, and $Cy^1$ represents a hydrocarbon group which may contain an oxygen atom and has a cyclic structure.

In Formula (4), $R^{41}$ represents a hydrogen atom or a hydrocarbon group, $R^{42}$ and $R^{43}$ each independently represent a hydrocarbon group which may contain an oxygen atom, or a hydrogen atom, and $R^{42}$ and $R^{43}$ may be bonded to each other and form a ring.

In Formula (5), $R^{51}$ represents a hydrogen atom or a hydrocarbon group, $R^{52}$ and $R^{53}$ each independently represent a hydrogen atom or a hydrocarbon group, and $R^{52}$ and $R^{53}$ may be bonded to each other and form a ring.

<2> The photosensitive composition according to <1>,
in Formula (1), $R^{11}$ represents a hydrogen atom or an alkyl group having 1 to 3 carbon atoms, $R^{12}$, $R^{13}$, and $R^{14}$ each independently represent a hydrocarbon group having 1 to 12 carbon atoms, which may be substituted with a halogen atom and contain an oxygen atom, a hydrogen atom, or a hydroxyl group, $L^1$ represents a single bond, an alkylene group having 1 to 3 carbon atoms, or a group represented by any one of Formulae (L11) to (L14), and $R^{15}$ represents a hydrogen atom or an alkyl group having 1 to 3 carbon atoms, in Formula (2), $R^{21}$ represents a hydrogen atom or an alkyl group having 1 to 3 carbon atoms, $R^{22}$ represents a hydrocarbon group having 1 to 12 carbon atoms, which may be substituted with a halogen atom and contain an oxygen atom, a hydrogen atom, or a hydroxyl group, $R^{23}$ and $R^{24}$ each independently represent a hydrocarbon group having 1 to 12 carbon atoms, which may be substituted with a halogen atom and contain an oxygen atom, a hydrogen atom, or a hydroxyl group or $R^{23}$ and $R^{24}$ are integrated to represent an oxygen atom, $L^2$ represents an alkylene group having 1 to 3 carbon atoms or a group represented by any one of Formulae (L21) to (L24), and $R^{25}$ represents a hydrogen atom or an alkyl group having 1 to 3 carbon atoms, in Formula (3), $R^{31}$ represents a hydrogen atom or an alkyl group having 1 to 3 carbon atoms, $L^3$ represents a single bond, an alkylene group having 1 to 3 carbon atoms, or a group represented by any one of Formulae (L31) to (L34), and $Cy^1$ represents a hydrocarbon group which may contain an oxygen atom, has a cyclic structure, and has 3 to 20 carbon atoms, in Formula (4), $R^{41}$ represents a hydrogen atom or an alkyl group having 1 to 3 carbon atoms, and $R^{42}$ and $R^{43}$ each independently represent a hydrogen atom or an alkyl group having 1 to 6 carbon atoms or $R^{42}$ and $R^{43}$ are bonded to each other and represent a group represented by any one of Formulae (N41) to (N44), and in Formula (5), $R^{51}$ represents a hydrogen atom or an alkyl group having 1 to 3 carbon atoms, and $R^{52}$ and $R^{53}$ each independently represent a hydrogen atom or an alkyl group having 1 to 6 carbon atoms or $R^{52}$ and $R^{53}$ are bonded to each other and represent a group represented by Formula (N51) or (N52).

 (L11)

 (L12)

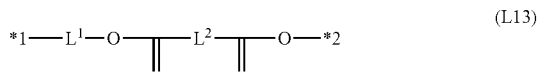 (L13)

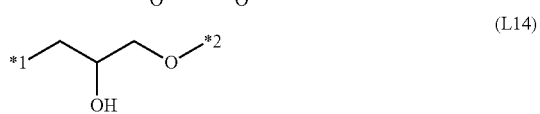 (L14)

 (L21)

 (L22)

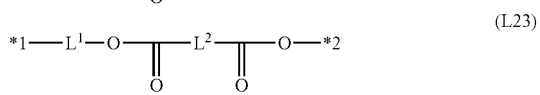 (L23)

 (L24)

 (L31)

 (L32)

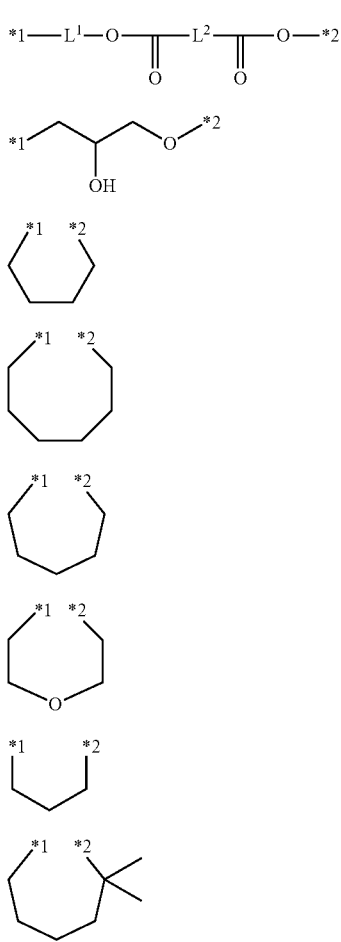

In Formula (L11), L represents an alkylene group having 1 to 3 carbon atoms, n represents an integer of 1 to 4, *1 represents a binding position with respect to $X^1$, and *2 represents a binding position with respect to a carbon atom.

In Formula (L12), L represents an alkylene group having 1 to 3 carbon atoms, *1 represents a binding position with respect to $X^1$, and *2 represents a binding position with respect to a carbon atom.

In Formula (L13), $L^1$ and $L^2$ each independently represent an alkylene group having 1 to 3 carbon atoms, *1 represents a binding position with respect to $X^1$, and *2 represents a binding position with respect to a carbon atom.

In Formula (L14), *1 represents a binding position with respect to $X^1$, and *2 represents a binding position with respect to a carbon atom.

In Formula (L21), L represents an alkylene group having 1 to 3 carbon atoms, n represents an integer of 1 to 4, *1 represents a binding position with respect to $X^2$, and *2 represents a binding position with respect to a carbon atom.

In Formula (L22), L represents an alkylene group having 1 to 3 carbon atoms, *1 represents a binding position with respect to $X^2$, and *2 represents a binding position with respect to a carbon atom.

In Formula (L23), $L^1$ and $L^2$ each independently represent an alkylene group having 1 to 3 carbon atoms, *1 represents a binding position with respect to $X^2$, and *2 represents a binding position with respect to a carbon atom.

In Formula (L24), *1 represents a binding position with respect to $X^2$, and *2 represents a binding position with respect to a carbon atom.

In Formula (L31), L represents an alkylene group having 1 to 3 carbon atoms, n represents an integer of 1 to 4, *1 represents a binding position with respect to an oxygen atom, and *2 represents a binding position with respect to $Cy^1$.

In Formula (L32), L represents an alkylene group having 1 to 3 carbon atoms, *1 represents a binding position with respect to an oxygen atom, and *2 represents a binding position with respect to $Cy^1$.

In Formula (L33), $L^1$ and $L^2$ each independently represent an alkylene group having 1 to 3 carbon atoms, *1 represents a binding position with respect to an oxygen atom, and *2 represents a binding position with respect to $Cy^1$.

In Formula (L34), *1 represents a binding position with respect to an oxygen atom, and *2 represents a binding position with respect to $Cy^1$.

In Formulae (N41) to (N44), *1 and *2 represent a binding position with respect to a nitrogen atom.

In Formulae (N51) and (N52), *1 represents a binding position with respect to a nitrogen atom, and *2 represents a binding position with respect to a carbon atom.

<3> The photosensitive composition according to <1> or <2>, in which the total content of the structural unit A and the structural unit B in the resin is 80% by mass or greater based on the total amount of the resin.

<4> The photosensitive composition according to any one of <1> to <3>, in which the proportion of the structural unit A in the total content of the structural unit A and the structural unit B in the resin is in a range of 10% by mass to 90% by mass.

<5> The photosensitive composition according to any one of <1> to <4>, in which the structural unit A is at least one structural unit C selected from the group consisting of a structural unit represented by Formula (1-1), a structural unit represented by Formula (1-2), a structural unit represented by Formula (1-3), a structural unit represented by Formula (1-4), a structural unit represented by Formula (1-5), a structural unit represented by Formula (1-6), a structural unit represented by Formula (1-7), a structural unit represented by Formula (1-8), and a structural unit represented by Formula (2-1).

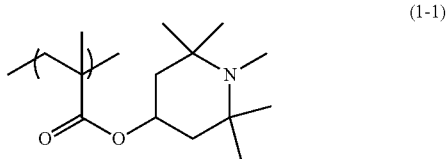

(1-1)

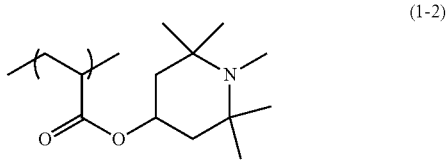

(1-2)

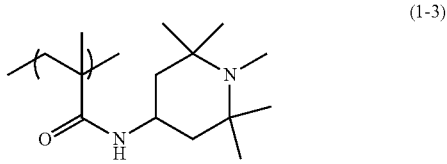

(1-3)

-continued (1-4)
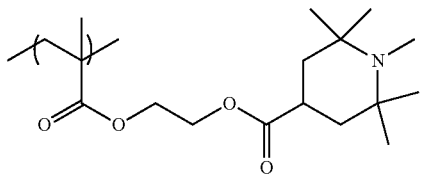

(1-5)
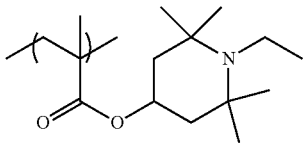

(1-6)
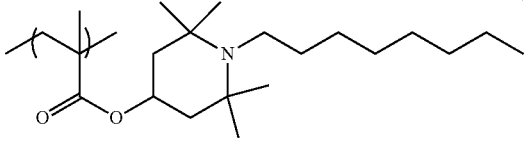

(1-7)
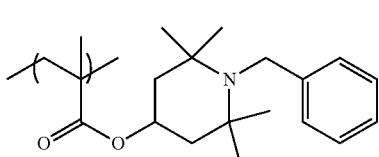

(1-8)
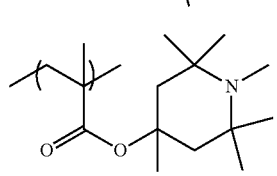

(2-1)
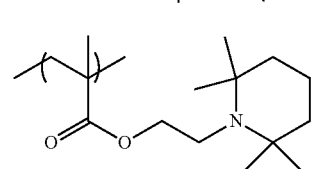

<6> The photosensitive composition according to any one of <1> to <5>, in which the structural unit B is at least one structural unit D selected from the group consisting of a structural unit represented by Formula (3-3), a structural unit represented by Formula (3-4), a structural unit represented by Formula (3-5), a structural unit represented by Formula (4-1), a structural unit represented by Formula (4-2), a structural unit represented by Formula (4-3), a structural unit represented by Formula (4-4), a structural unit represented by Formula (5-1), a structural unit represented by Formula (5-2), and a structural unit represented by Formula (5-3).

(3-3)
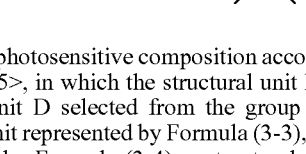

(3-4)
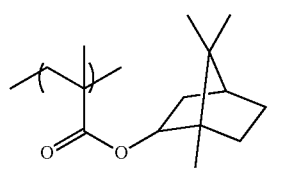

-continued (3-5)
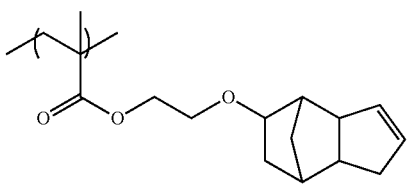

(4-1)
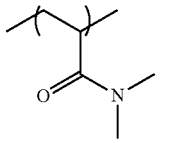

(4-2)
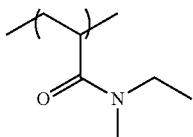

(4-3)
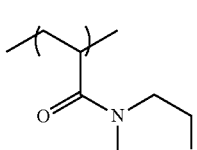

(4-4)
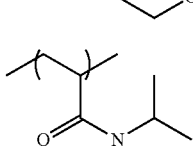

(5-1)
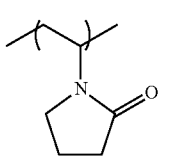

(5-2)
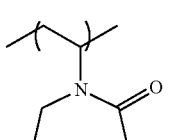

(5-3)
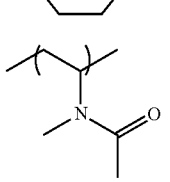

<7> The photosensitive composition according to any one of <1> to <5>, in which $Cy^1$ in Formula (3) includes a polycyclic structure as the cyclic structure, and $R^{41}$ in Formula (4) represents a hydrogen atom.

<8> The photosensitive composition according to any one of <1> to <7>, in which the structural unit B includes at least one structural unit represented by Formula (3) and further includes at least one selected from the group consisting of structural units represented by Formulae (4) and (5).

<9> The photosensitive composition according to any one of <1> to <8>, in which the weight-average molecular weight of the resin is in a range of 1000 to 50000.

<10> The photosensitive composition according to any one of <1> to <9>, in which the content of the resin is in a range of 0.5% by mass to 10.0% by mass based on the total amount of the photosensitive composition.

<11> The photosensitive composition according to any one of <1> to <10>, in which the radically polymerizable monomer includes a monofunctional radically polymerizable monomer.

<12> The photosensitive composition according to any one of <1> to <11>, in which the content of the radically polymerizable monomer is 50% by mass or greater based on the total amount of the photosensitive composition.

<13> The photosensitive composition according to any one of <1> to <12>, further containing a photopolymerization initiator.

<14> An image forming method comprising: an application process of applying an ink composition which is the photosensitive composition according to any one of <1> to <13> onto a recording medium according to an ink-jet method; and an irradiation process of irradiating the ink composition applied onto the recording medium with active energy rays.

<15> A film forming method comprising: an application process of applying the photosensitive composition according to any one of <1> to <13> onto a substrate; and an irradiation process of irradiating the photosensitive composition applied onto the substrate with active energy rays.

<16> A resin comprising: at least one structural unit C selected from the group consisting of a structural unit represented by Formula (1-1), a structural unit represented by Formula (1-2), a structural unit represented by Formula (1-3), a structural unit represented by Formula (1-4), a structural unit represented by Formula (1-5), a structural unit represented by Formula (1-6), a structural unit represented by Formula (1-7), a structural unit represented by Formula (1-8), and a structural unit represented by Formula (2-1); and at least one structural unit D selected from the group consisting of a structural unit represented by Formula (3-3), a structural unit represented by Formula (3-4), a structural unit represented by Formula (3-5), a structural unit represented by Formula (4-1), a structural unit represented by Formula (4-2), a structural unit represented by Formula (4-3), a structural unit represented by Formula (4-4), a structural unit represented by Formula (5-1), a structural unit represented by Formula (5-2), and a structural unit represented by Formula (5-3).

(1-1)

(1-2)

(1-3)

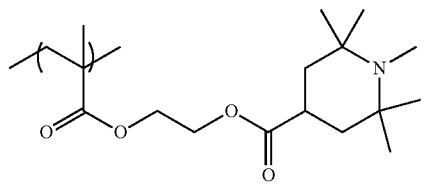
(1-4)

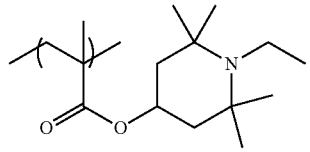
(1-5)

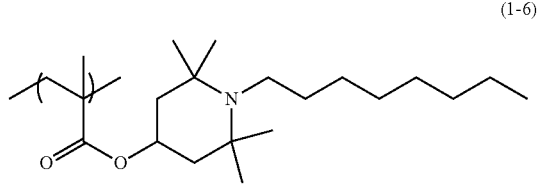
(1-6)

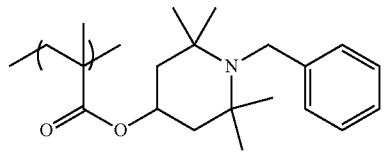
(1-7)

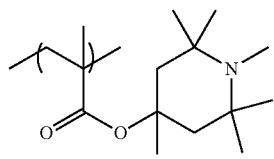
(1-8)

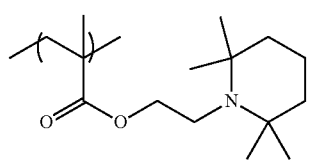
(2-1)

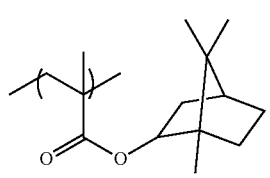
(3-3)

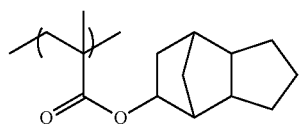
(3-4)

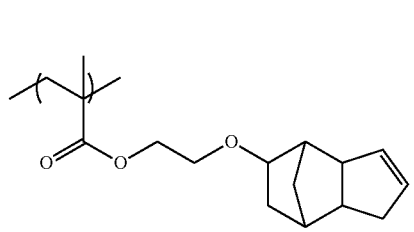
(3-5)

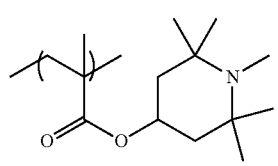

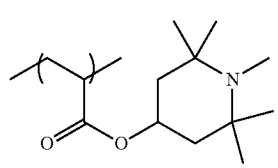

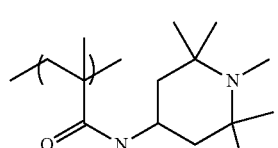

-continued

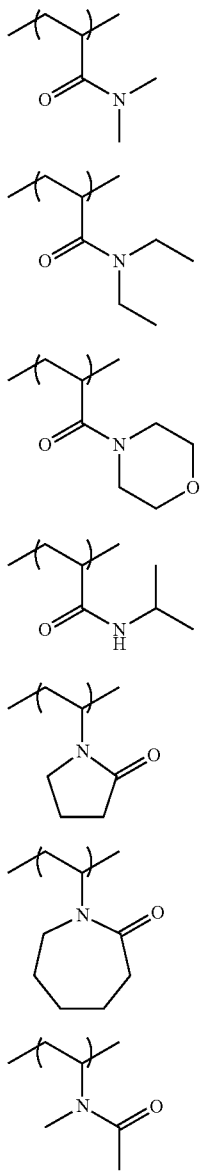

(4-1)
(4-2)
(4-3)
(4-4)
(5-1)
(5-2)
(5-3)

<17> The resin according to <16>, in which the structural unit D includes at least one selected from the group consisting of a structural unit represented by Formula (3-3), a structural unit represented by Formula (3-4), and a structural unit represented by Formula (3-5) and further includes at least one selected from the group consisting of a structural unit represented by Formula (4-1), a structural unit represented by Formula (4-2), a structural unit represented by Formula (4-3), a structural unit represented by Formula (4-4), a structural unit represented by Formula (5-1), a structural unit represented by Formula (5-2), and a structural unit represented by Formula (5-3).

<18> An image containing: the resin according to <16> or <17>.

<19> A film containing: the resin according to <16> or <17>.

According to the present invention, it is possible to provide a photosensitive composition which is capable of forming a film having excellent hardness and excellent adhesiveness to a substrate and has excellent storage stability, and an image forming method and a film forming method using the above-described photosensitive composition.

Further, according to the present invention, it is also possible to provide a resin having a new structure, and an image and a film containing the resin.

DESCRIPTION OF THE PREFERRED EMBODIMENTS

Hereinafter, specific embodiments of the present invention will be described in detail, but the present invention is not particularly limited to the embodiments described below and can be implemented by appropriately adding modifications within the range not obstructing the purpose of the present invention.

The numerical ranges shown using "to" in the present specification indicate ranges including the numerical values described before and after "to" as the lower limits and the upper limits.

In the present specification, in a case where a plurality of substances corresponding to respective components in a composition are present, the amount of the respective components in the composition indicates the total amount of the plurality of substances present in the composition unless otherwise noted.

In the present specification, the meaning of the term "process" includes not only an independent process but also a process whose intended purpose is achieved even in a case where the process is not clearly distinguished from other processes.

In the present specification, the "light" has a concept including active energy rays such as γ-rays, β-rays, electron beams, ultraviolet rays, visible light, and infrared rays.

In the present specification, ultraviolet rays are also referred to as "ultraviolet (UV) light."

In the present specification, light generated from light emitting diode (LED) light sources is also referred to as "LED light."

In the present specification, "(meth)acrylic acid" has a concept including both of acrylic acid and methacrylic acid, "(meth)acrylate" has a concept including both of acrylate and methacrylate, and a "(meth)acryloyl group" has a concept including both of an acryloyl group and a methacryloyl group.

In the present specification, ratios of respective structural units in a resin are also referred to as "copolymerization ratios."

[Photosensitive Composition]

A photosensitive composition of the present invention contains a resin which includes a structural unit A represented by Formula (1) or (2) and a structural unit B represented by Formula (3), (4), or (5) (hereinafter, also referred to as a "specific resin") and a radically polymerizable monomer.

In the photosensitive composition of the present invention, the structural unit A is at least one structural unit selected from the group consisting of a structural unit represented by Formula (1) and a structural unit represented by Formula (2).

Further, in the photosensitive composition of the present invention, the structural unit B is at least one structural unit selected from the group consisting of a structural unit represented by Formula (3), a structural unit represented by Formula (4), and a structural unit represented by Formula (5).

Hereinafter, the structural unit represented by Formula (1), the structural unit represented by Formula (2), the structural unit represented by Formula (3), the structural unit represented by Formula (4), and the structural unit represented by Formula (5) are respectively referred to as a unit (1), a unit (2), a unit (3), a unit (4), and a unit (5) in some cases.

Similarly, a structural unit represented by Formula (X) is referred to as a unit (X) in some cases.

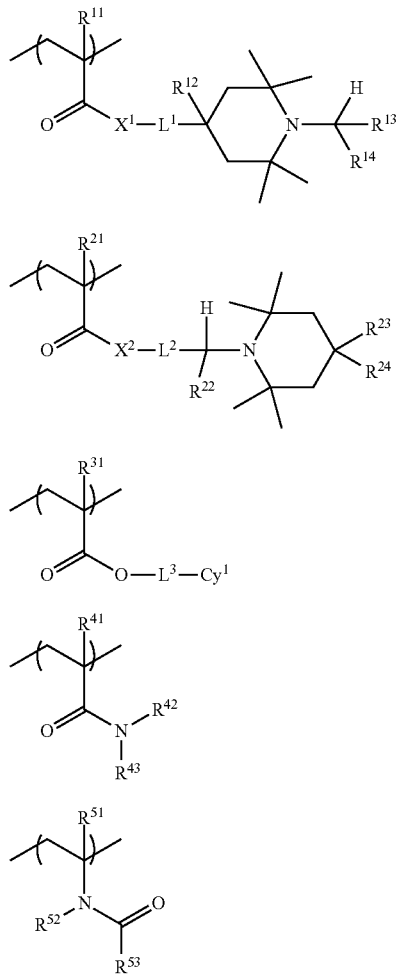

In Formula (1), $R^{11}$ represents a hydrogen atom or a hydrocarbon group, and $R^{12}$, $R^{13}$, and $R^{14}$ each independently represent a hydrocarbon group, which may be substituted with a halogen atom and contain an oxygen atom, a hydrogen atom, or a hydroxyl group. $L^1$ represents a single bond or a divalent linking group, and $X^1$ represents a —O— group or a —NR$^{15}$— group. $R^{15}$ represents a hydrogen atom or a hydrocarbon group.

In Formula (2), $R^{21}$ represents a hydrogen atom or a hydrocarbon group, and $R^{22}$ represents a hydrocarbon group, which may be substituted with a halogen atom and contain an oxygen atom, a hydrogen atom, or a hydroxyl group. $R^{23}$ and $R^{24}$ each independently represent a hydrocarbon group, which may be substituted with a halogen atom and contain an oxygen atom, a hydrogen atom, or a hydroxyl group or $R^{23}$ and $R^{24}$ are integrated to represent an oxygen atom (in other words, a group represented by =O). $L^2$ represents a single bond or a divalent linking group, and $X^2$ represents a —O— group or a —NR$^{25}$— group. $R^{25}$ represents a hydrogen atom or a hydrocarbon group.

In Formula (3), $R^{31}$ represents a hydrogen atom or a hydrocarbon group, $L^3$ represents a single bond or a divalent linking group, and $Cy^1$ represents a hydrocarbon group which may contain an oxygen atom and has a cyclic structure.

In Formula (4), $R^{41}$ represents a hydrogen atom or a hydrocarbon group, and $R^{42}$ and $R^{43}$ each independently represent a hydrocarbon group which may contain an oxygen atom, or a hydrogen atom. $R^{42}$ and $R^{43}$ may be bonded to each other and form a ring.

In Formula (5), $R^{51}$ represents a hydrogen atom or a hydrocarbon group, and $R^{52}$ and $R^{53}$ each independently represent a hydrogen atom or a hydrocarbon group. $R^{52}$ and $R^{53}$ may be bonded to each other and form a ring.

According to the photosensitive composition of the present invention, it is possible to form a film which has excellent hardness and excellent adhesiveness to a substrate. Further, the photosensitive composition of the present invention has excellent storage stability.

The reason why a film which has excellent hardness and excellent adhesiveness to a substrate can be formed by the photosensitive composition of the present invention is assumed as follows.

A specific resin which is one component of the photosensitive composition includes at least one structural unit selected from the group consisting of a unit (1) and a unit (2), as the structural unit A.

Both of the units (1) and (2) have a hindered amine structure, includes a carbon atom (hereinafter, also referred to as "α-carbon") in the α-position with respect to a nitrogen atom of the hindered amine structure, and further includes at least one hydrogen atom (hereinafter, also referred to as "α-hydrogen") bonded to the α-carbon.

In Formulae (1) and (2), hydrogen atoms surrounded by circles shown by broken lines indicate α-hydrogen.

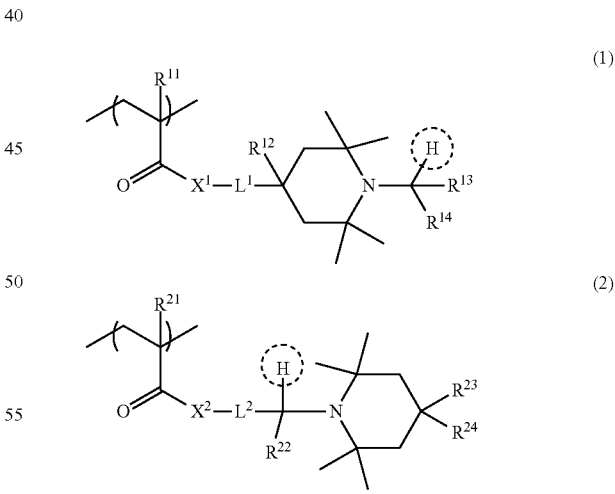

It is considered that the structural unit A (that is, at least one selected from the group consisting of the unit (1) and the unit (2)) containing α-hydrogen has a function of suppressing a phenomenon (oxygen inhibition) in which radical polymerization of a radically polymerizable monomer is inhibited by oxygen. For this reason, it is considered that radical polymerization of a radically polymerizable monomer efficiently proceeds at the time of irradiation with light by the photosensitive composition containing a specific resin, which has the structural unit A, and a radically polymerizable monomer.

Moreover, it is considered that the structural unit B (at least one selected from the group consisting of the unit (3), the unit (4), and the unit (5)) included in a specific resin contributes to hardness of a film to be formed and adhesiveness to a substrate of this film.

Accordingly, it is considered that the effect resulting from the structural unit A and the effect resulting from the structural unit B are combined with each other and improve the hardness of a film to be formed and the adhesiveness to a substrate by the photosensitive composition containing a specific resin which has both of the structural unit A and the structural unit B and a radically polymerizable monomer.

In addition, the reason why the photosensitive composition of the present invention has excellent storage stability is assumed as follows.

That is, it is considered that neither of the structural unit A and the structural unit B contain an aminoalkyl group (specifically, an aminoalkyl group which does not have a hindered amine structure and contains a primary amino group; an aminoalkyl group which does not have a hindered amine structure and contains a secondary amino group; and an aminoalkyl group which does not have a hindered amine structure and contains a tertiary amino group) which may become a factor of lowering the storage stability of the photosensitive composition and does not have a hindered amine structure.

Particularly, it is considered that the structural unit A having a hindered amine structure greatly improves the storage stability of the photosensitive composition, compared to a structural unit containing an aminoalkyl group which does not have a hindered amine structure.

Therefore, it is considered that the storage stability of the photosensitive composition is improved by the photosensitive composition containing a specific resin which has both of the structural units A and B.

In addition, according to the photosensitive composition of the present invention, it is possible to form a film having excellent blocking resistance (that is, a film whose stickiness is suppressed). The reason for this is considered to be the same as the reason for which a film with excellent hardness and excellent adhesiveness to a substrate can be formed.

Further, in a case where the photosensitive composition of the present invention is used as an ink composition for an ink jet (hereinafter, also referred to as an "ink composition"), the jetting stability thereof from an ink jet head is also excellent. The reason for this is considered to be the same as the reason for which the photosensitive composition has excellent storage stability.

For example, specific resins described in specific examples (A-24) and (A-7) of the paragraphs 0100 to 0103 of Patent Document 1 (JP2011-225848A) do not have the above-described structural unit A (see comparative resins a and c in "examples" described below). Further, a resin described in a specific example (A-25) of the paragraph 0103 of the same Document does not have the above-described structural unit B (see a comparative resin b in "examples" described below).

Further, PA-5 described in the paragraph 0219 of Patent Document 2 (JP-2009-139852A) does not have the above-described structural unit A (see a comparative resin d in "examples" described below).

As described above, specific resins containing both of the structural units A and B are not disclosed in any of JP2011-225848A, JP2009-139852A, JP1993-142773A (JP-H05-142773A), JP2009-209352A, and JP2010-85553A.

As described above, the structural unit A in the present invention includes at least one selected from the group consisting of the unit (1) and the unit (2), but it is particularly preferable that the structural unit A includes at least one selected from the group consisting of the unit (1) from viewpoints of the hardness and blocking resistance of a film.

Further, a specific resin may have other structural units other than the structural units A and B within the range in which the effects of the present invention are not impaired.

Further, the specific resin may have only one kind of structural unit A or may have two or more kinds thereof.

Further, the specific resin may have only one kind of structural unit B or may have two or more kinds thereof.

In this case, from a viewpoint of more effectively exhibiting the effects of the present invention, the total content of the structural units A and B is preferably 80% by mass or greater, more preferably 90% by mass or greater, still more preferably 95% by mass or greater, and ideally 100% by mass based on the total amount of the specific resin.

Moreover, the proportion of the structural unit A in the total content of the structural units A and B in the specific resin is not particularly limited.

The proportion is preferably in a range of 10% by mass to 90% by mass, more preferably in a range of 20% by mass to 80% by mass, and particularly preferably in a range of 30% by mass to 70% by mass.

In a case where the proportion thereof is 10% by mass or greater, the adhesiveness of a film to a substrate and the blocking resistance of the film are further improved.

In a case where the proportion thereof is 90% by mass or less, the adhesiveness of a film to a substrate is further improved.

Moreover, as a preferable range of the proportion of the structural unit A in the total amount of the specific resin, the same range as the preferable range of the proportion of the structural unit A in the total content of the structural units A and B is exemplified.

In addition, from the viewpoint of more effectively exhibiting the effects of the present invention, it is preferable that the structural unit A is at least one structural unit C selected from the group consisting of the following units (1-1) to (1-8) and (2-1).

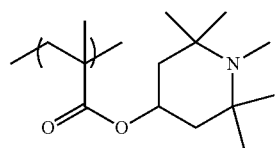

(1-1)

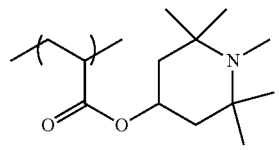

(1-2)

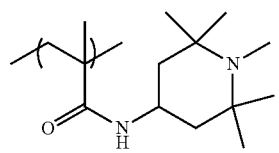

(1-3)

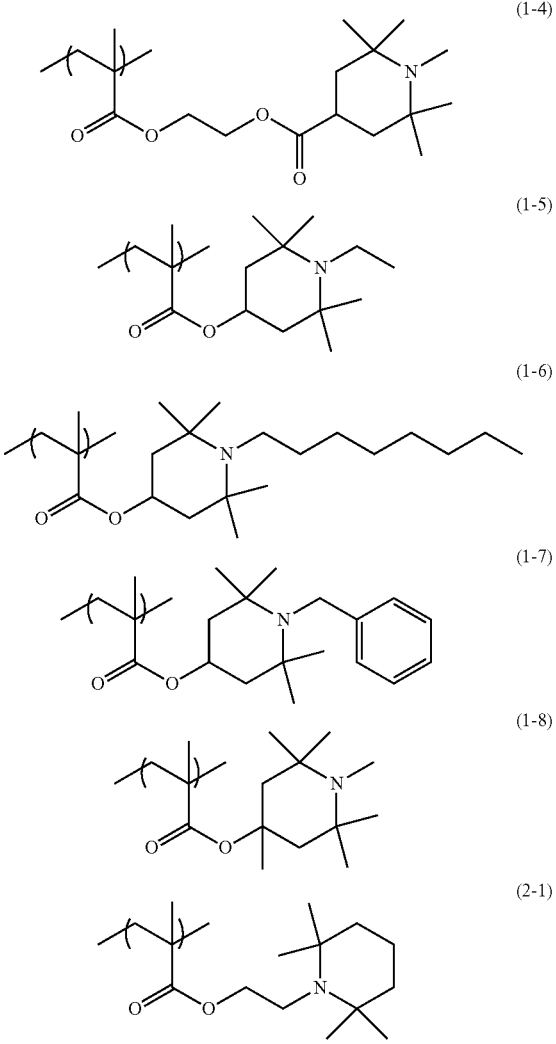

From the viewpoint of the blocking resistance, it is preferable that the specific resin includes at least one selected from the units (1-1), (1-2), (1-4), and (1-8) from among the units (1-1) to (1-8) and (2-1).

Further, from the viewpoints of the hardness and the blocking resistance of a film, it is particularly preferable that the specific resin includes the unit (1-1) from among the units (1-1) to (1-8) and (2-1).

Further, from the viewpoint of effectively exhibiting the effects of the present invention (particularly from the viewpoints of the blocking resistance of a film and the adhesiveness of the film to a substrate), it is preferable that the structural unit B is at least one structural unit D selected from the group consisting of the following units (3-3) to (3-5), (4-1) to (4-4), and (5-1) to (5-3).

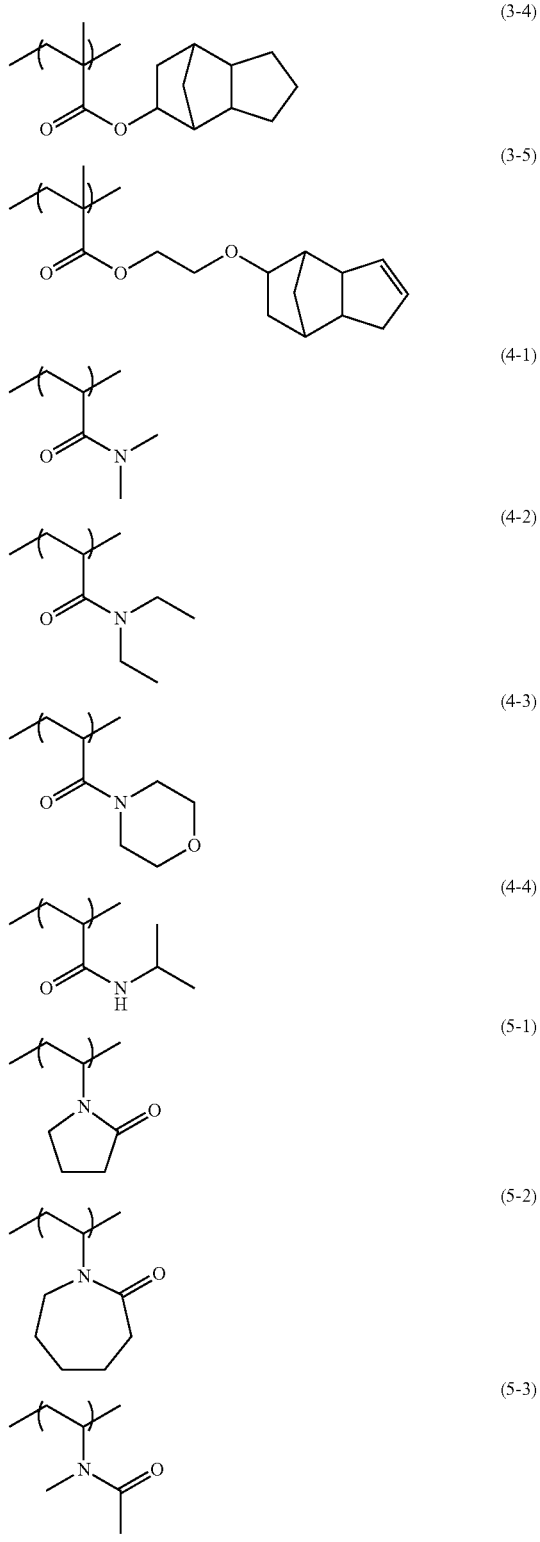

From the viewpoints of the hardness of a film, the blocking resistance of the film, and the adhesiveness of the film to a substrate, it is preferable that the specific resin includes at least one unit selected from the units (4-1) to (4-3), (5-1), and (5-2) from among the units (3-3) to (3-5), (4-) to (4-4), and (5-1) to (5-3).

Moreover, in the specific resin, it is preferable that $Cy^1$ in Formula (3) has a polycyclic structure as a cyclic structure and $R^{41}$ in Formula (4) represents a hydrogen atom.

In such a mode, the blocking resistance of a film and the adhesiveness of the film to a substrate are further improved.

Moreover, the weight-average molecular weight (Mw) of the specific resin is not particularly limited, and the weight-average molecular weight (Mw) of the specific resin may be in a range of, for example, 1000 to 100000.

From the viewpoint of the hardness of a film, the weight-average molecular weight (Mw) of the specific resin is preferably 1000 or greater, more preferably 2000 or greater, and particularly preferably 3000 or greater.

From the viewpoints of the storage stability and the jetting stability in a case where the photosensitive composition is used as an ink composition, the weight-average molecular weight (Mw) of the specific resin is preferably 50000 or less, more preferably 40000 or less, and particularly preferably 30000 or less.

In the present specification, the weight-average molecular weight (Mw) indicates a value measured by gel permeation chromatography (GPC).

The measurement with gel permeation chromatography (GPC) is performed using HLC (registered trademark)-8020GPC (manufactured by TOSOH CORPORATION) as a measuring device; three of TSK gel (registered trademark) Super Multipore HZ-H (4.6 mmID×15 cm, manufactured by TOSOH CORPORATION) as a column; and tetrahydrofuran (THF) as an eluent. Moreover, the measurement is performed using an RI detector under the conditions of a sample concentration of 0.45% by mass, a flow rate of 0.35 ml/min, a sample injection amount of 10 μl, and a measurement temperature of 40° C.

The calibration curve is prepared from eight samples of "standard samples TSK standard, polystyrene" (manufactured by TOSOH CORPORATION): "F-40," "F-20," "F-4," "F-1," "A-5000," "A-2500," "A-1000," and "n-propylbenzene."

In addition, only one kind or two or more kinds of the specific resins may be contained in the photosensitive composition of the present invention.

The content of the specific resin can be adjusted to be in a range of 0.5% by mass to 10.0% by mass based on the total amount of the photosensitive composition.

From the viewpoint of the hardness of a film, the content of the specific resin is preferably 0.5% by mass or greater, more preferably 1.0% by mass or greater, still more preferably 1.5% by mass or greater, and particularly preferably 2.0% by mass or greater based on the total amount of the photosensitive composition.

From the viewpoints of the storage stability and the jetting stability in the case where the photosensitive composition is used as an ink composition, the content of the specific resin is preferably 10.0% by mass or less, more preferably 9.0% by mass or less, still more preferably 8.0% by mass or less, and particularly preferably 7.0% by mass or less based on the total amount of the photosensitive composition.

Moreover, only one kind or two or more kinds of the radically polymerizable monomers may be contained in the photosensitive composition of the present invention.

It is preferable that the radically polymerizable monomers include at least one monofunctional radically polymerizable monomer (in the present specification, also referred to as a "monofunctional monomer").

In a case where the radically polymerizable monomers include a monofunctional radically polymerizable monomer, the compatibility between the specific resin and the radically polymerizable monomer is further improved, and the storage stability and the jetting stability in the case where the photosensitive composition is used as an ink composition is further improved.

From the viewpoint of the compatibility with the specific resin, it is preferable that the monofunctional radically polymerizable monomers include at least one compound selected from the group consisting of N-vinyl caprolactam, 2-phenoxyethyl acrylate (PEA), cyclic trimethylolpropane formal acrylate (CTFA), isobornyl acrylate (IBOA), tetrahydrofurfuryl acrylate, 2-(2-ethoxyethoxy)ethyl acrylate, octyl acrylate, decyl acrylate, tridecyl acrylate, isodecyl acrylate, lauryl acrylate, 3,3,5-trimethyl cyclohexyl acrylate (TMCHA), dicyclopentenyl acrylate (DCPA), and 4-t-butyl-cyclohexyl acrylate.

Further, in the photosensitive composition, from the viewpoint of the hardness of a film, it is preferable that the radically polymerizable monomers include a polyfunctional radically polymerizable monomer (in the present specification, also referred to as a "polyfunctional monomer").

Moreover, from the viewpoint of more effectively exhibiting the effects of the present invention, the content of the radically polymerizable monomer in the photosensitive composition is preferably 50% by mass or greater, more preferably 60% by mass or greater, and particularly preferably 65% by mass or greater based on the total amount of the photosensitive composition.

The upper limit of the content of the radically polymerizable monomer is not particularly limited, and the upper limit thereof can be set to, for example, 95% by mass or can be set to 90% by mass.

Moreover, from the viewpoint of more effectively exhibiting the effects of the present invention, it is preferable that the photosensitive composition includes at least one photopolymerization initiator.

From the viewpoint of curing sensitivity, it is preferable that the photopolymerization initiator includes at least one selected from the group consisting of a carbonyl compound and an acyl phosphine oxide compound.

The photosensitive composition of the present invention can be suitably used as a liquid to form a film (for example, an image) on a substrate (for example, a recording medium).

As such a liquid, an ink composition used to form an image on a substrate serving as a recording medium and a coating solution (for example, a coating agent, an adhesive, or a coating material) used to form a coating film on a substrate can be exemplified.

It is particularly preferable that the photosensitive composition of the present invention is used for ink jet recording (that is, the photosensitive composition of the present invention is used as an ink composition).

The ink composition which is one application of the photosensitive composition of the present invention may be an ink composition that contains a colorant or a transparent ink composition (also referred to as a "clear ink") that does not contain a colorant.

The same applies to the coating solution which is another application of the photosensitive composition of the present invention.

The substrate used to form a film using the photosensitive composition of the present invention is not particularly limited and, for example, a known substrate can be used as a support or a recording material.

Examples of the substrate include paper, paper on which plastic (for example, polyethylene, polypropylene, or polystyrene) is laminated, a metal plate (for example, a plate of a metal such as aluminum, zinc, or copper), a plastic film (for example, a film of polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, or an acrylic resin), paper on which the above-described metal is laminated or vapor-deposited, and a plastic film on which the above-described metal is laminated or vapor-deposited.

Since the photosensitive composition of the present invention can form a film having excellent adhesiveness on a substrate, the photosensitive composition is particularly suitable for use to form a film on a non-absorbable substrate.

Preferred examples of the non-absorbable substrate include plastic substrates such as a polyvinyl chloride (PVC) substrate, a polystyrene (PS) substrate, a polycarbonate (PC) substrate, a polyethylene terephthalate (PET) substrate, a polypropylene (PP) substrate, and an acrylic resin substrate.

Hereinafter, the photosensitive composition of the present invention will be described in detail.

<Specific Resin>

The photosensitive composition of the present invention contains a specific resin having the structural units A and B.

The preferable ranges (preferable ranges such as the proportion of the structural units A and B, the total content of the structural units A and B based on the total amount of the specific resin, the content of the specific resin based on the total amount of the photosensitive composition, and the weight-average molecular weight) of the specific resin are as described above.

As described above, the structural unit A is at least one selected from the group consisting of the unit (1) and the unit (2).

As described above, the structural unit B is at least one selected from the group consisting of the unit (3), the unit (4), and the unit (5).

Hereinafter, each unit will be described.

(Unit (1))

The unit (1) is a structural unit represented by Formula (1).

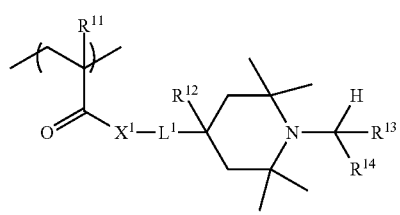

(1)

In Formula (1), $R^{11}$ represents a hydrogen atom or a hydrocarbon group, and $R^{12}$, $R^{13}$, and $R^{14}$ each independently represent a hydrocarbon group, which may be substituted with a halogen atom and contain an oxygen atom, a hydrogen atom, or a hydroxyl group. $L^1$ represents a single bond or a divalent linking group, and $X^1$ represents a —O— group or a —$NR^{15}$— group. $R^{15}$ represents a hydrogen atom or a hydrocarbon group.

As $R^{11}$, a hydrogen atom or an alkyl group having 1 to 3 carbon atoms is preferable, a hydrogen atom, a methyl group, or an ethyl group is more preferable, and a hydrogen atom or a methyl group is particularly preferable.

In $R^{12}$, the number of carbon atoms of the hydrocarbon group which may be substituted with a halogen atom and contain an oxygen atom is preferably in a range of 1 to 12, more preferably in a range of 1 to 3, still more preferably 1 or 2, and particularly preferably 1.

Moreover, in the present specification, as the halogen atom in "the hydrocarbon group which may be substituted with a halogen atom and contain an oxygen atom," a fluorine atom, a chlorine atom, or a bromine atom is preferable and a fluorine atom or a chlorine atom is more preferable.

Further, in the present specification, the expression "which may be substituted with a halogen atom" in "the hydrocarbon group which may be substituted with a halogen atom and contain an oxygen atom," means that the hydrocarbon group may be substituted with at least one halogen atom.

In regard to "the hydrocarbon group which may contain an oxygen atom" in $R^{12}$, examples of the hydrocarbon group containing an oxygen atom include a hydrocarbon group substituted with an alkoxy group, a hydrocarbon group substituted with an acyl group, a hydrocarbon group substituted with an acyloxy group, a hydrocarbon group substituted with an alkoxycarbonyl group, a hydrocarbon group substituted with a hydroxyl group, and a hydrocarbon group substituted with a carboxyl group.

As $R^{12}$, a hydrocarbon group, which may be substituted with a halogen atom, contain an oxygen atom, and has 1 to 12 carbon atoms, a hydrogen atom, or a hydroxyl group is preferable; a hydrogen atom, a hydroxyl group, an alkyl group having 1 to 12 carbon atoms, a halogenated alkyl group having 1 to 12 carbon atoms (preferably an alkyl chloride group having 1 to 12 carbon atoms), an alkenyl group having 2 to 12 carbon atoms, an acyloxyalkyl group having 3 to 12 carbon atoms, an aryl group having 6 to 12 carbon atoms (such as a phenyl group, a naphthyl group, or a biphenyl group), an aralkyl group having 7 to 12 carbon atoms (such as a benzyl group), or an aryloxyalkyl group having 7 to 12 carbon atoms (such as a phenoxyethyl group) is preferable; a hydrogen atom, an alkyl group having 1 to 12 carbon atoms, or an aryl group having 6 to 12 carbon atoms is more preferable; a hydrogen atom or an alkyl group having 1 to 3 carbon atoms is still more preferable; a hydrogen atom, a methyl group, or an ethyl group is even still more preferable; and a hydrogen atom or a methyl group is particularly preferable.

In $R^{13}$ and $R^{14}$, the number of carbon atoms of the hydrocarbon group which may be substituted with a halogen atom and contain an oxygen atom is preferably in a range of 1 to 12.

Examples of "the hydrocarbon group which may contain an oxygen atom" in $R^{13}$ and $R^{14}$ are the same as those of the hydrocarbon group which may contain an oxygen atom in $R^{12}$.

In $R^{13}$ and $R^{14}$, as the hydrocarbon group which may be substituted with a halogen atom and contain an oxygen atom, an alkyl group having 1 to 12 carbon atoms, a halogenated alkyl group having 1 to 12 carbon atoms (preferably an alkyl chloride group having 1 to 12 carbon atoms), an alkenyl group having 2 to 12 carbon atoms, an acyloxyalkyl group having 3 to 12 carbon atoms, an aryl group having 6 to 12 carbon atoms (such as a phenyl group, a naphthyl group, or a biphenyl group), an aralkyl group having 7 to 12 carbon atoms (such as a benzyl group), or an aryloxyalkyl group having 7 to 12 carbon atoms (such as a phenoxyethyl group) is preferable; an alkyl group having 1 to 12 carbon atoms or an aryl group having 6 to 12 carbon atoms is more preferable; and an alkyl group having 1 to 8 carbon atoms or a phenyl group is particularly preferable.

As $R^{13}$ and $R^{14}$, a hydrocarbon group which may be substituted with a halogen atom, contain an oxygen atom, and has 1 to 12 carbon atoms, a hydrogen atom, or a hydroxyl group is preferable.

In $L^1$, as a divalent linking group, an alkylene group having 1 to 3 carbon atoms or a group represented by any one of Formulae (L11) to (L14) is preferable.

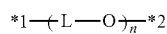

(L11)

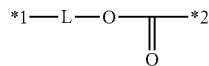

(L12)

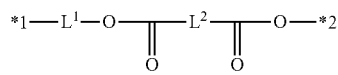

(L13)

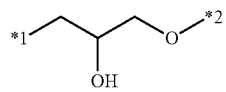

(L14)

In Formula (L11), L represents an alkylene group having 1 to 3 carbon atoms, n represents an integer of 1 to 4, *1 represents a binding position with respect to $X^1$, and *2 represents a binding position with respect to a carbon atom.

In Formula (L12), L represents an alkylene group having 1 to 3 carbon atoms, *1 represents a binding position with respect to $X^1$, and *2 represents a binding position with respect to a carbon atom.

In Formula (L13), $L^1$ and $L^2$ each independently represent an alkylene group having 1 to 3 carbon atoms, *1 represents a binding position with respect to $X^1$, and *2 represents a binding position with respect to a carbon atom.

In Formula (L14), *1 represents a binding position with respect to $X^1$, and *2 represents a binding position with respect to a carbon atom.

n in Formula (L11) is preferably an integer of 1 to 3, more preferably an integer of 1 or 2, and particularly preferably an integer of 1.

$X^1$ represents a —O— group or a —$NR^{15}$— group, and $R^{15}$ represents a hydrogen atom or a hydrocarbon group.

As $R^{15}$, a hydrogen atom or an alkyl group having 1 to 3 carbon atoms is preferable; a hydrogen atom, a methyl group, or an ethyl group is more preferable; and a hydrogen atom or a methyl group is particularly preferable.

A particularly preferable mode of Formula (1) is that $R^{11}$ represents a hydrogen atom or an alkyl group having 1 to 3 carbon atoms, $R^{12}$, $R^{13}$, and $R^{14}$ each independently represent a hydrocarbon group, which may be substituted with a halogen atom, contain an oxygen atom, and has 1 to 12 carbon atoms, a hydrogen atom, or a hydroxyl group, $L^1$ represents a single bond, an alkylene group having 1 to 3 carbon atoms, or a group represented by any one of Formulae (L11) to (L14), and $R^{15}$ represents a hydrogen atom or an alkyl group having 1 to 3 carbon atoms.

Hereinafter, specific examples of the unit (1) (units (1-1) to (1-16)) will be shown, but the unit (1) is not limited to the following specific examples. Among the following specific examples, preferable units are as described above.

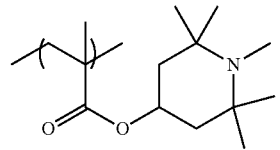

(1-1)

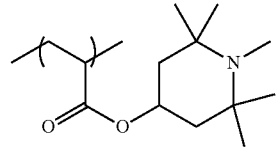

(1-2)

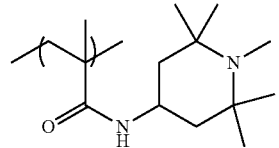

(1-3)

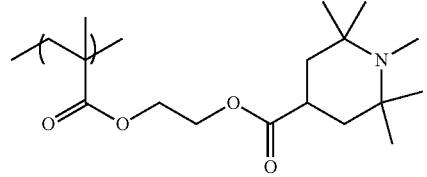

(1-4)

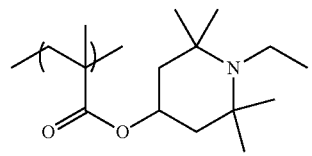

(1-5)

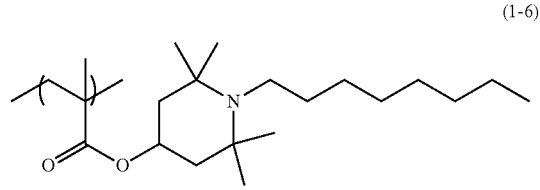

(1-6)

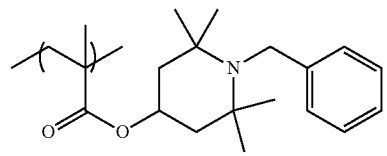

(1-7)

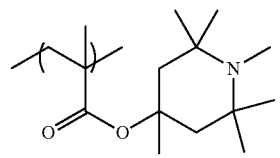

(1-8)

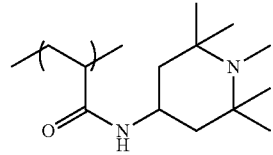

(1-9)

-continued

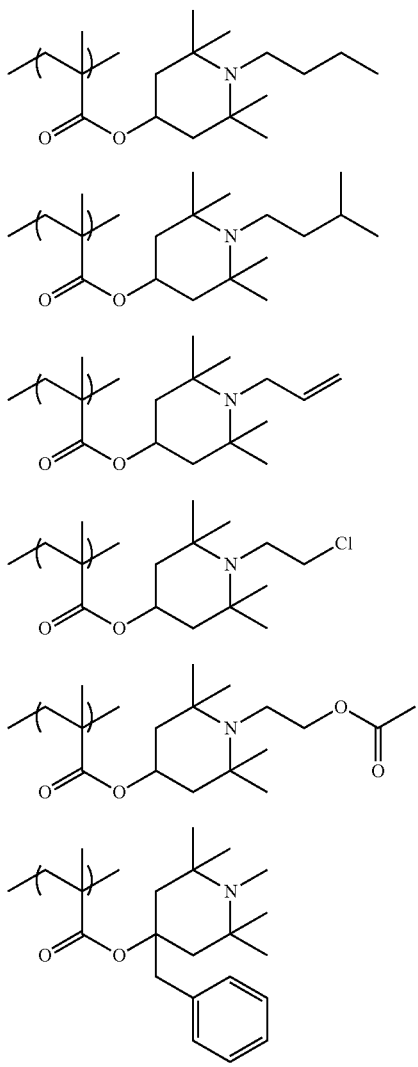

(1-10)

(1-11)

(1-12)

(1-13)

(1-14)

(1-15)

(1-16)

(Unit (2))
The unit (2) is a structural unit represented by Formula (2).

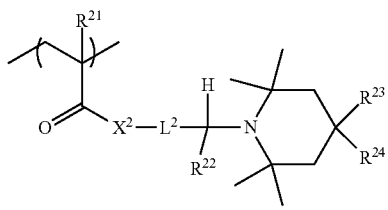

(2)

In Formula (2), $R^{21}$ represents a hydrogen atom or a hydrocarbon group, and $R^{22}$ represents a hydrocarbon group, which may be substituted with a halogen atom and contain an oxygen atom, a hydrogen atom, or a hydroxyl group. $R^{23}$ and $R^{24}$ each independently represent a hydrocarbon group, which may be substituted with a halogen atom and contain an oxygen atom, a hydrogen atom, or a hydroxyl group or $R^{23}$ and $R^{24}$ are integrated to represent an oxygen atom (in other words, a group represented by =O, for example, see the unit (2-3) described below). $L^2$ represents a single bond or a divalent linking group, and $X^2$ represents a —O— group or a —NR$^{25}$— group. $R^{25}$ represents a hydrogen atom or a hydrocarbon group.

The preferable range of $R^{21}$ in Formula (2) is the same as that of $R^{11}$ in Formula (1).

The preferable range of $R^{22}$ in Formula (2) is the same as that of $R^{12}$ in Formula (1).

The preferable ranges of $R^{23}$ and $R^{24}$ in Formula (2) are respectively the same as those of $R^{13}$ and $R^{14}$ in Formula (1), but it is also preferable that $R^{23}$ and $R^{24}$ are integrated to represent an oxygen atom.

In $L^2$, as the divalent linking group, an alkylene group having 1 to 3 carbon atoms or a group represented by any one of Formulae (L21) to (24) is preferable.

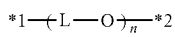 (L21)

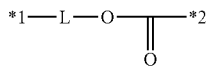 (L22)

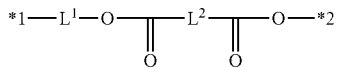 (L23)

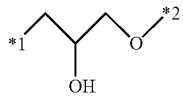 (L24)

In Formula (L21), L represents an alkylene group having 1 to 3 carbon atoms, n represents an integer of 1 to 4, *1 represents a binding position with respect to $X^2$, and *2 represents a binding position with respect to a carbon atom.

In Formula (L22), L represents an alkylene group having 1 to 3 carbon atoms, *1 represents a binding position with respect to $X^2$, and *2 represents a binding position with respect to a carbon atom.

In Formula (L23), $L^1$ and $L^2$ each independently represent an alkylene group having 1 to 3 carbon atoms, *1 represents a binding position with respect to $X^2$, and *2 represents a binding position with respect to a carbon atom.

In Formula (L24), *1 represents a binding position with respect to $X^2$, and *2 represents a binding position with respect to a carbon atom.

n in Formula (L21) is preferably an integer of 1 to 3, more preferably 1 or 2, and particularly preferably 1.

$X^2$ represents a —O— group or a —NR$^{25}$— group, and $R^{25}$ represents a hydrogen atom or a hydrocarbon group.

As $R^{25}$, a hydrogen atom or an alkyl group having 1 to 3 carbon atoms is preferable; a hydrogen atom, a methyl group, or an ethyl group is more preferable; and a hydrogen atom or a methyl group is particularly preferable.

A particularly preferable mode of Formula (2) is that $R^{21}$ represents a hydrogen atom or an alkyl group having 1 to 3 carbon atoms, $R^{22}$ represents a hydrocarbon group, which may be substituted with a halogen atom, contain an oxygen atom, and has 1 to 12 carbon atoms, a hydrogen atom, or a hydroxyl group, $R^{23}$ and $R^{24}$ each independently represent a hydrocarbon group, which may be substituted with a halogen atom, contain an oxygen atom, and has 1 to 12 carbon atoms, a hydrogen atom, or a hydroxyl group or $R^{23}$ and $R^{24}$ are integrated to represent an oxygen atom, $L^2$ represents an alkylene group having 1 to 3 carbon atoms or a group represented by any one of Formulae (L21) to (L24), and $R^{25}$ represents a hydrogen atom or an alkyl group having 1 to 3 carbon atoms.

Hereinafter, specific examples of the unit (2) (units (2-1) to (2-5)) will be shown, but the unit (2) is not limited to the following specific examples. Among the following specific examples, preferable units are as described above.

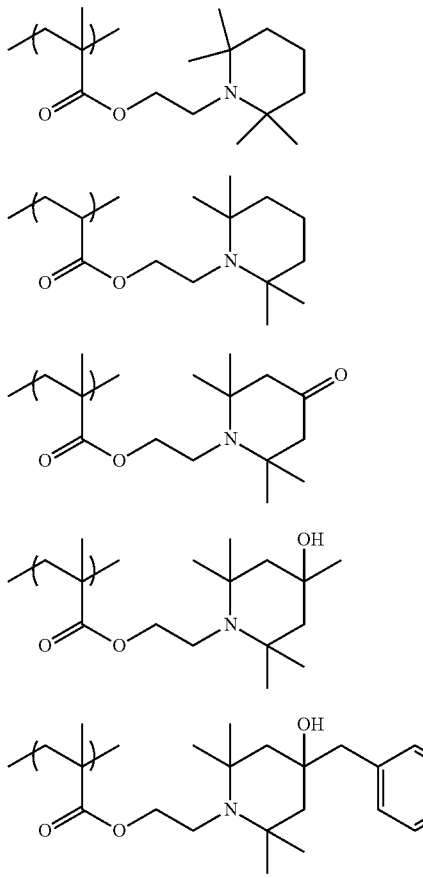

(2-1)

(2-2)

(2-3)

(2-4)

(2-5)

(Unit (3))
The unit (3) is a structural unit represented by Formula (3).

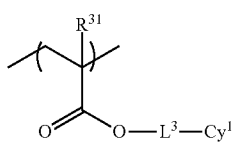

(3)

In Formula (3), $R^{31}$ represents a hydrogen atom or a hydrocarbon group, $L^3$ represents a single bond or a divalent linking group, and $Cy^1$ represents a hydrocarbon group which may contain an oxygen atom and has a cyclic structure.

The preferable range of $R^{31}$ in Formula (3) is the same as that of $R^{11}$ in Formula (1).

In $L^3$, as the divalent linking group, an alkylene group having 1 to 3 carbon atoms or a group represented by any one of Formulae (L31) to (L34) is preferable.

(L31)

(L32)

(L33)

(L34)

In Formula (L31), L represents an alkylene group having 1 to 3 carbon atoms, n represents an integer of 1 to 4, *1 represents a binding position with respect to an oxygen atom, and *2 represents a binding position with respect to $Cy^1$.

In Formula (L32), L represents an alkylene group having 1 to 3 carbon atoms, *1 represents a binding position with respect to an oxygen atom, and *2 represents a binding position with respect to $Cy^1$.

In Formula (L33), $L^1$ and $L^2$ each independently represent an alkylene group having 1 to 3 carbon atoms, *1 represents a binding position with respect to an oxygen atom, and *2 represents a binding position with respect to $Cy^1$.

In Formula (L34), *1 represents a binding position with respect to an oxygen atom, and *2 represents a binding position with respect to $Cy^1$.

n in Formula (L31) is preferably an integer of 1 to 3, more preferably 1 or 2, and particularly preferably 1.

In $Cy^1$, the number of carbon atoms of the hydrocarbon group which may contain an oxygen atom and has a cyclic structure is preferably in a range of 3 to 20, more preferably in a range of 6 to 20, still more preferably in a range of 6 to 12, and particularly preferably in a range of 6 to 10.

Examples of the hydrocarbon group which may contain an oxygen atom and has a cyclic structure include a substituted or unsubstituted aryl group, a substituted or unsubstituted alicyclic group, a substituted or unsubstituted cyclic acetal group, a substituted or unsubstituted cyclic ether group, a substituted or unsubstituted lactone group, and a substituted or unsubstituted heteroaryl group which contains an oxygen atom as a heteroatom. As the substituent groups in the substituted aryl group, the substituted alicyclic group, the substituted cyclic acetal group, the substituted cyclic ether group, the substituted lactone group, and the substituted heteroaryl group, an alkoxy group, an acyl group, an acyloxy group, an alkoxycarbonyl group, a hydroxyl group, and a carboxyl group can be respectively exemplified.

Examples of the hydrocarbon group which may contain an oxygen atom and has a cyclic structure include a phenyl group, a naphthyl group, a biphenyl group, a cyclohexyl group, an alkylcyclohexyl group, a norbornyl group, a dicyclopentanyl group, a dicyclopentenyl group, an adamantyl group, a furfuryl group, a hydrofurfuryl group, a cyclic acetal group, a cyclic ether group, and a lactone group.

A particularly preferable mode of Formula (3) is that $R^{31}$ represents a hydrogen atom or an alkyl group having 1 to 3 carbon atoms, $L^3$ represents a single bond, an alkylene group having 1 to 3 carbon atoms, or a group represented by any one of Formulae (L31) to (L34), and $Cy^1$ represents a hydrocarbon group which may contain an oxygen atom, has a cyclic structure, and has 3 to 20 carbon atoms.

Moreover, from the viewpoint of the blocking resistance of a film and the adhesiveness of the film to a substrate, it is preferable that $Cy^1$ has a polycyclic structure and more preferable that $Cy^1$ has a polycyclic alicyclic structure, as a cyclic structure.

Hereinafter, specific examples of the unit (3) (units (3-1) to (3-21)) will be shown, but the unit (3) is not limited to the following specific examples. Among the following specific examples, preferable units are as described above.

(3-1)

(3-2)

(3-3)

(3-4)

(3-5)

(3-6)

(3-7)

(3-8) 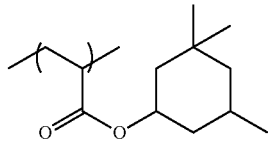

(3-9) 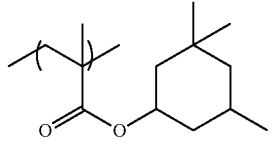

(3-10) 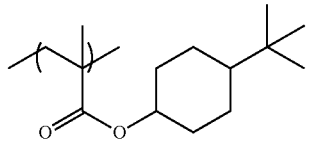

(3-11) 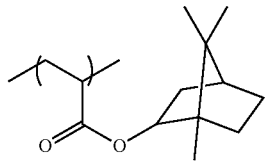

(3-12) 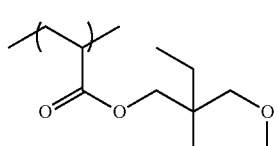

(3-13) 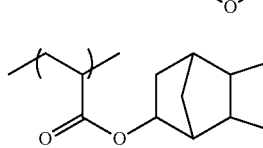

(3-14) 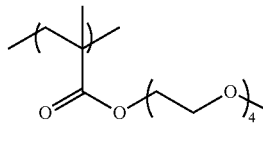

(3-15) 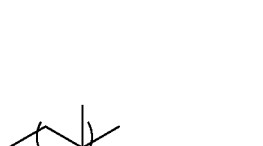

(3-16) 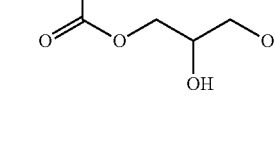

-continued

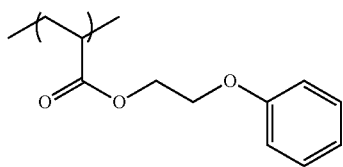
(3-17)

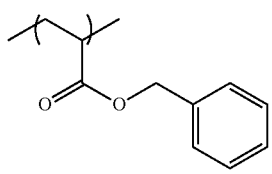
(3-18)

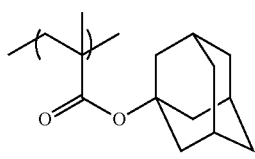
(3-19)

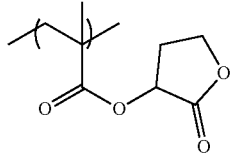
(3-20)

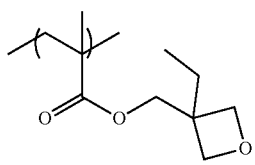
(3-21)

(Unit (4))

The unit (4) is a structural unit represented by Formula (4).

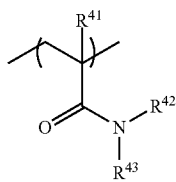
(4)

In Formula (4), $R^{41}$ represents a hydrogen atom or a hydrocarbon group, and $R^{42}$ and $R^{43}$ each independently represent a hydrocarbon group which may contain an oxygen atom, or a hydrogen atom. $R^{42}$ and $R^{43}$ may be bonded to each other (that is, $R^{42}$ and $R^{43}$ are integrated) and form a ring.

As $R^{41}$, a hydrogen atom or an alkyl group having 1 to 3 carbon atoms is preferable; a hydrogen atom, a methyl group, or an ethyl group is more preferable; a hydrogen atom or a methyl group is still more preferable; and a hydrogen atom is particularly preferable.

In $R^{42}$ and $R^{43}$, the number of carbon atoms of the hydrocarbon group which may contain an oxygen atom is preferably in a range of 1 to 6 and more preferably in a range of 1 to 3.

In regard to the expression "the hydrocarbon group which may contain an oxygen atom" in $R^{42}$ and $R^{43}$, examples of the hydrocarbon group containing an oxygen atom are the same as those of the hydrocarbon group containing an oxygen atom in $R^{12}$ in Formula (1).

From the viewpoint of the hardness of a film, it is preferable that $R^{42}$ and $R^{43}$ in Formula (4) each independently represent a hydrocarbon group which may contain an oxygen atom or $R^{42}$ and $R^{43}$ are bonded to each other (that is, $R^{42}$ and $R^{43}$ are integrated) and form a ring.

Further, in a case where $R^{42}$ and $R^{43}$ are bonded to each other and form a ring, it is preferable that $R^{42}$ and $R^{43}$ represent a group represented by any one of Formulae (N41) to (N44).

(N41)

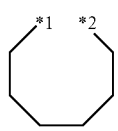
(N42)

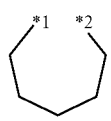
(N43)

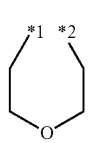
(N44)

In Formulae (N41) to (N44), *1 and *2 represent a binding position with respect to a nitrogen atom.

A particularly preferable mode of Formula (4) is that $R^{41}$ represents a hydrogen atom or an alkyl group having 1 to 3 carbon atoms, and $R^{42}$ and $R^{43}$ each independently represent a hydrogen atom or an alkyl group having 1 to 3 carbon atoms or $R^{42}$ and $R^{43}$ are bonded to each other and represent a group represented by any one of Formulae (N41) to (N44).

Among such modes, from the viewpoint of the hardness of a film, a more preferable mode is that $R^{42}$ and $R^{43}$ each independently represent an alkyl group having 1 to 3 carbon atoms or $R^{42}$ and $R^{43}$ are bonded to each other (that is, $R^{42}$ and $R^{43}$ are integrated) and represent a group represented by any one of Formulae (N41) to (N44).

Hereinafter, specific examples of the unit (4) (units (4-1) to (4-12)) will be shown, but the unit (4) is not limited to the following specific examples. Among the following specific examples, preferable units are as described above.

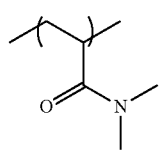
(4-1)

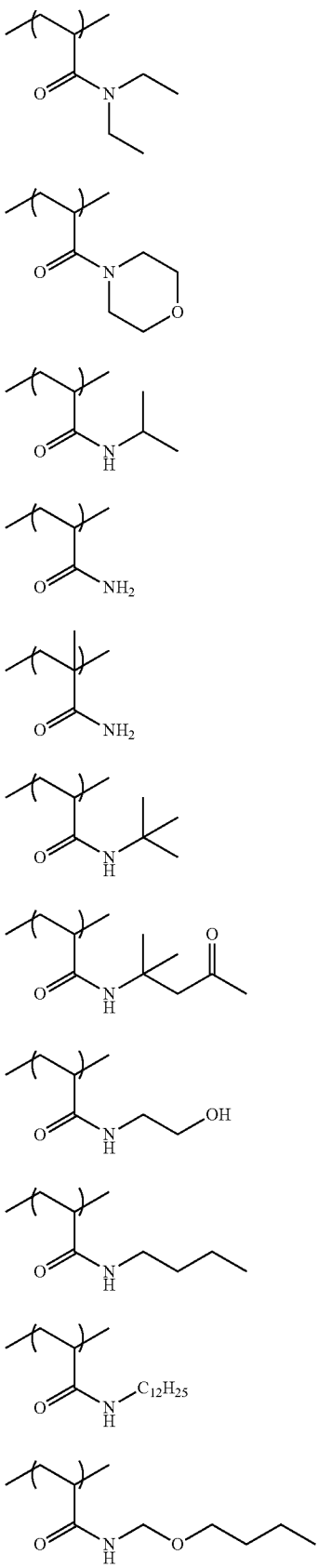

(4-2)
(4-3)
(4-4)
(4-5)
(4-6)
(4-7)
(4-8)
(4-9)
(4-10)
(4-11)
(4-12)

(Unit (5))

The unit (5) is a structural unit represented by Formula (5)

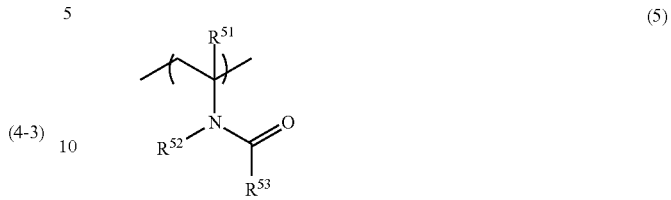

In Formula (5), $R^{51}$ represents a hydrogen atom or a hydrocarbon group, and $R^{52}$ and $R^{53}$ each independently represent a hydrogen atom or a hydrocarbon group. $R^{52}$ and $R^{53}$ may be bonded to each other and form a ring.

As $R^{51}$, a hydrogen atom or an alkyl group having 1 to 3 carbon atoms is preferable; a hydrogen atom, a methyl group, or an ethyl group is more preferable; a hydrogen atom or a methyl group is still more preferable; and a hydrogen atom is particularly preferable.

In $R^{52}$ and $R^{53}$, the number of carbon atoms of the hydrocarbon group is preferably in a range of 1 to 6 and more preferably in a range of 1 to 3.

From the viewpoint of the hardness of a film, it is preferable that $R^{52}$ and $R^{53}$ in Formula (5) each independently represent a hydrocarbon group or $R^{52}$ and $R^{53}$ are bonded to each other (that is, $R^{52}$ and $R^{53}$ are integrated) and form a ring.

Further, in a case where $R^{52}$ and $R^{53}$ are bonded to each other and form a ring, it is particularly preferable that the group formed by $R^{52}$ and $R^{53}$ being integrated is a group represented by Formula (N51) or (N52).

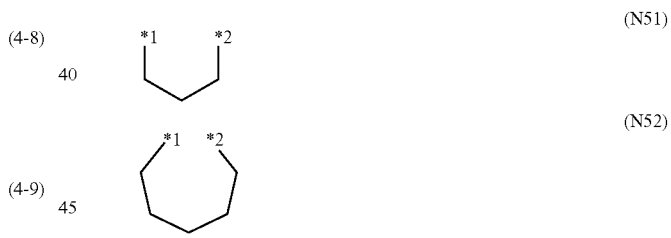

In Formula (N51) or (N52), *1 represents a binding position with respect to a nitrogen atom, and *2 represents a binding position with respect to a carbon atom.

A preferable mode of Formula (5) is that $R^{51}$ represents a hydrogen atom or an alkyl group (preferably a hydrogen atom) having 1 to 3 carbon atoms, and $R^{52}$ and $R^{53}$ each independently represent a hydrogen atom or an alkyl group having 1 to 6 carbon atoms or $R^{52}$ and $R^{53}$ are bonded to each other (that is, $R^{52}$ and $R^{53}$ are integrated) and represent a group represented by Formula (N51) or (N52).

Among such modes, from the viewpoint of the hardness of a film, a more preferable mode is that $R^{52}$ and $R^{53}$ each independently represent an alkyl group having 1 to 6 carbon atoms or $R^{52}$ and $R^{53}$ are bonded to each other and represent a group represented by Formula (N51) or (N52).

Hereinafter, specific examples of the unit (5) (units (5-1) to (5-5)) will be shown, but the unit (5) is not limited to the following specific examples. Among the following specific examples, preferable units are as described above.

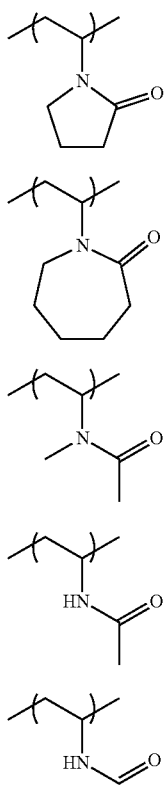

(5-1)

(5-2)

(5-3)

(5-4)

(5-5)

A particularly preferable combination of the structural units A and B in the specific resin is that the structural unit A includes the unit (1-1) and the structural unit B includes at least one selected from the units (4-1) to (4-3), (5-1), and (5-2).

A more preferable combination thereof is that the structural unit A includes the unit (1-1) and the structural unit B includes at least one selected from the units (4-3) and (5-2).

A particularly preferable combination thereof is that the structural unit A includes the unit (1-1) and the structural unit B includes both of the units (4-3) and (5-2).

Further, from the viewpoints of forming a film with excellent hardness and adhesiveness to the substrate and improving jetting properties, a particularly preferable combination is that the structural unit A includes the unit (1-1) and the structural unit B includes at least one of the unit (3-3), the unit (3-4), or the unit (3-5) and at least one of the unit (4-3), the unit (5-1), or the unit (5-2). Further, a still more preferable combination is that the structural unit A includes the unit (1-1) and the structural unit B includes at least one of the unit (3-3), the unit (3-4), or the unit (3-5) and the unit (5-2).

(Other Structural Units)

The specific resin may include other structural units other than the structural units A and B.

As other structural units, for example, structural units derived from a vinyl monomer can be suitably selected and used.

In this case, as described above, the total content of the structural units A and B is preferably 80% by mass or greater, more preferably 90% by mass or greater, still more preferably 95% by mass or greater, and ideally 100% by mass based on the total amount of the specific resin.

Moreover, the specific resin may include a structural unit having an aminoalkyl group as other structural units other than the structural units A and B within the range in which the storage stability of the photosensitive composition is not impaired.

In this case, from the viewpoint of the storage stability of the photosensitive composition, the content of the structural unit having an aminoalkyl group, as other structural units, is preferably 10% by mass or less, more preferably 3% by mass or less, and still more preferably 1% by mass or less based on the total amount of the specific resin. From the viewpoint of the storage stability of the photosensitive composition, a particularly preferable mode is that the specific resin does not include a structural unit having an aminoalkyl group, as other structural units.

<Radically Polymerizable Monomer>

The photosensitive composition of the present invention contains a radically polymerizable monomer (hereinafter, also simply referred to as a "polymerizable monomer"). Only one kind or two or more kinds of the polymerizable monomers may be contained in the photosensitive composition.

The preferable ranges of the content of the polymerizable monomer based on the total amount of the photosensitive composition are as described above.

It is preferable that a compound including at least one ethylenic double bond in a molecule is used as the polymerizable monomer.

As the polymerizable monomer, known polymerizable monomers described in the paragraphs 0108 to 0137 of JP2011-225848A, the paragraphs 0150 to 0188 of JP2009-139852A, and the paragraphs 0122 to 0127 of JP2009-209352A can be used.

As the polymerizable monomer, a monofunctional polymerizable monomer, a polyfunctional polymerizable monomer, or a combination of a monofunctional polymerizable monomer and a polyfunctional polymerizable monomer may be used.

The monofunctional polymerizable monomer is advantageous in that the viscosity of the photosensitive composition is decreased and the jetting stability in the case where the photosensitive composition is used as an ink composition is improved.

The polyfunctional polymerizable monomer is advantageous in terms of the hardness of a film.

Examples of the monofunctional polymerizable monomer include an N-vinyl compound such as N-vinylcaprolactam or N-vinylpyrrolidone; a monofunctional acrylate compound such as 2-phenoxyethyl acrylate (PEA), benzyl acrylate, cyclic trimethylolpropane formal acrylate (CTFA), isobornyl acrylate (IBOA), tetrahydrofurfuryl acrylate, 2-(2-ethoxyethoxy)ethyl acrylate, octyl acrylate, decyl acrylate, tridecyl acrylate, isodecyl acrylate, lauryl acrylate, 3,3,5-trimethyl cyclohexyl acrylate (TMCHA), dicyclopentenyl acrylate (DCPA), 4-t-butylcyclohexyl acrylate, cyclohexyl acrylate, caprolactone-modified acrylate, hydroxyethyl acrylate, hydroxybutyl acrylate, polyethylene glycol acrylate, polypropylene glycol acrylate, nonylphenoxy polyethylene glycol acrylate, or nonylphenoxy polypropylene glycol acrylate; a monofunctional methacrylate compound such as 2-phenoxyethyl methacrylate, benzyl methacrylate, isobornyl methacrylate (IBOA), tetrahydrofurfuryl methacrylate, 2-(2-ethoxyethoxy)ethyl methacrylate, octyl methacrylate, decyl methacrylate, tridecyl methacrylate, isodecyl methacrylate, lauryl methacrylate, 3,3,5-trimethyl cyclohexyl methacrylate (TMCHA), dicyclopentenyl methacrylate (DCPA), 4-t-butylcyclohexyl methacrylate, cyclohexyl methacrylate, caprolactone-modified methacrylate, hydroxyethyl methacrylate, hydroxybutyl methacrylate, polyethylene glycol methacrylate, polypropylene glycol methacrylate, nonylphenoxy polyethylene glycol methacrylate, or nonylphenoxy polypropylene glycol methacrylate; a monofunctional vinyl ether compound such as N-propyl vinyl ether, isopropyl vinyl ether, N-butyl vinyl ether, isobutyl vinyl ether, 2-ethylhexyl vinyl ether, cyclohexyl vinyl ether, 2-hydroxy ethyl vinyl ether, 4-hydroxybutyl vinyl ether, or cyclohexane dimethanol monovinyl ether; a monofunctional acrylamide compound such as acrylamide, N,N-diemthylacrylamide, N,N-diethylacrylamide, acryloylmorpholine, N-isopropylacrylamide, N-hydroxyethyl acrylamide, N-butyl acrylamide, N-tert-butyl acrylamide, N-(1,1-dimethyl-3-oxobutyl)acrylamide, N-dodecyl acrylamide, or N-(buthoxymethyl)acrylamide; and a monofunctional methacrylamide compound such as methacrylamide, N-phenylmethacrylamide, N-(methoxymethyl)methacrylamide, N,N-dimethylmethacrylamide, or N-tert-butylmethacrylamide.

From the viewpoint of the compatibility with the specific resin, preferable examples of the monofunctional polymerizable monomer are as described above.

Examples of the polyfunctional polymerizable monomer include a polyfunctional acrylate compound such as hexanediol diacrylate (HDDA), dipropylene glycol diacrylate (DPGDA), polyethylene glycol diacrylate, polypropylene glycol diacrylate, pentaerythritol triacrylate, pentaerythritol tetraacrylate, dipentaerythritol pentaacrylate, dipentaerythritol hexaacrylate (DPHA), trimethylolpropane triacrylate, ditrimethylolpropane tetraacrylate, nonanediol diacrylate, decanediol diacrylate, neopentyl glycol diacrylate, polyethylene glycol-modified bisphenol A diacrylate, dioxane glycol diacrylate, cyclohexane dimethanol diacrylate, or tricyclodecane dimethanol diacrylate; 2-(2-vinyloxyethoxy) ethylacrylate (VEEA); a polyfunctional vinyl compound such as 1,4-butanediol divinyl ether, cyclohexanedimethanol divinyl ether, diethylene glycol divinyl ether, or triethylene glycol divinyl ether (DVE3); and a polyfunctional methacrylate compound such as hexanediol dimethacrylate, dipropylene glycol dimethacrylate (DPGDA), polyethylene glycol dimethacrylate, polypropylene glycol dimethacrylate, pentaerythritol trimethacrylate, pentaerythritol tetramethacrylate, neopentyl glycol dimethacrylate, or polyethylene glycol-modified bisphenol A dimethacrylate.

In addition to the above-described polymerizable compounds, commercially available products described in "*Cross-linking Agent Handbook*" (1981, edited by Shinzo Yamashita, published by Taiseisha, Ltd.), "*UV•EB Curing Handbook* (part of raw materials)" (1985, edited by Kiyoshi Kato, published by Kobunshi Kankokai), "*Application and Market of UV•EB Curing Technology*" (pp. 79, 1989, edited by Rad Tech Japan, CMC Publishing Co., Ltd.), "Polyester Resin Handbook" (1988, written by Eiichiro Takiyama, published by Nikkan Kogyo Shimbun, Ltd.); and a radically polymerizable monomer which is known in the field can be used.

As polymerizable monomers, commercially available products on the market may be used. Examples of the commercially available products of the polymerizable monomers include ethoxylated or propoxylated acrylate such as AH-600, AT-600, UA-306H, UA-306T, UA-306I, UA-510H, UF-8001G, DAUA-167 (all manufactured by KYOEISHA CHEMICAL Co., LTD.), SR444, SR454, SR492, SR499, CD501, SR502, SR9020, CD9021, SR9035, SR494 (all manufactured by Sartomer Company), and an isocyanuric monomer such as A-9300, A-9300-1CL (both manufactured by Shin-Nakamura Chemical Co., Ltd.).

Moreover, other commercially available products of the polymerizable monomers include neopentyl glycol propylene oxide adduct diacrylate (NPGPODA, manufactured by Sartomer Company), dipentaerythritol pentaacrylate (SR399E, manufactured by Sartomer Company), pentaerythritol triacrylate (ATMM-3L, manufactured by Shin-Nakamura Chemical Co., Ltd.), and dipentaerythritol hexaacrylate (A-DPH, manufactured by Shin-Nakamura Chemical Co., Ltd.).

The weight-average molecular weight of the polymerizable monomer is preferably 100 to less than 1,000, more preferably in a range of 100 to 800, and still more preferably in a range of 150 to 700.

The weight-average molecular weight of the polymerizable monomer is a value measured by gel permeation chromatography (GPC).

Preferable ranges of the content of the polymerizable monomer are as described above.

<Radically Polymerizable Resin>

The photosensitive composition of the present invention can contain a radically polymerizable resin (hereinafter, also simply referred to as a "polymerizable resin"). In this case, only one kind or two or more kinds of the polymerizable resins may be contained in the photosensitive composition.

In a case where the photosensitive composition of the present invention contains a radically polymerizable resin, the effects of the above-described structural unit A (effects of suppressing a phenomenon in which radical polymerization is inhibited by oxygen) are exhibited with respect to radical polymerization of the radically polymerizable monomer and radical polymerization of the radically polymerizable resin.

Here, the polymerizable resin indicates a resin including a polymerizable group.

The concept of the polymerizable resin includes an oligomer including a polymerizable group and a polymer including a polymerizable group.

Examples of the resin which is the base of the polymerizable resin include an acrylic resin, a urethane resin, a polyester resin, a polyether resin, a polycarbonate resin, an epoxy resin, and a polybutadiene resin. Among these, from a viewpoint of reducing curing contraction, a resin which includes both of a hard segment and a soft segment and in which the stress at the time of curing can be relaxed is preferable and at least one resin selected particularly from a urethane resin, a polyester resin, and an epoxy resin is more preferable.

As the polymerizable group contained in the polymerizable resin, a group including an ethylenic double bond is preferable and a group including at least one of a vinyl group and a 1-methylvinyl group is more preferable.

From the viewpoint of polymerization reactivity and the hardness of a film to be formed, a (meth)acryloyl group is particularly preferable as the polymerizable group.

These polymerizable groups can be introduced into a resin (a polymer or an oligomer) through a polymer reaction or copolymerization.

For example, a polymerizable group can be introduced into a polymer (or an oligomer) using a reaction of a polymer (or an oligomer) including a carboxy group in the side chain thereof with glycidyl methacrylate or a reaction of a polymer (or an oligomer) including an epoxy group with ethylenically unsaturated group-containing carboxylic acid such as methacrylic acid. These groups may be used in combination.

As the polymerizable resin, commercially available products in the market may be used.

Examples of the commercially available products of the acrylic resin including a polymerizable group include (ACA)Z200M, (ACA)Z230AA, (ACA)Z251, (ACA)Z254F (all manufactured by DAICEL-ALLNEX. LTD.), and HITALOID 7975D (manufactured by Hitachi Chemical Co., Ltd.).

Examples of the commercially available products of the urethane resin including a polymerizable group include EBECRYL (registered trademark) 8402, EBECRYL (registered trademark) 8405, EBECRYL (registered trademark) 9270, EBECRYL (registered trademark) 8311, EBECRYL (registered trademark) 8701, KRM 8667, KRM 8528 (all manufactured by DAICEL-ALLNEX. LTD.), CN964, CN9012, CN968, CN996, CN975, CN9782 (all manufactured by Sartomer Company), UV-6300B, UV-7600B, UV-7605B, UV-7620EA, UV-7630B (all manufactured by Nippon Synthetic Chemical Industry Co., Ltd.), U-6HA, U-15HA, U-108A, U-200PA, UA-4200 (all manufactured by Shin-Nakamura Chemical Co., Ltd.), TESLAC 2300, HITALOID 4863, TESLAC 2328, TESLAC 2350, HITALOID 7902-1 (all manufactured by Hitachi Chemical Co., Ltd.), 8UA-017, 8UA-239, 8UA-239H, 8UA-140, 8UA-585H, 8UA-347H, and 8UX-015A (all manufactured by TAISEI FINE CHEMICAL CO., LTD.).

Examples of the commercially available products of the polyester resin including a polymerizable group include CN294, CN2254, CN2260, CN2271E, CN2300, CN2301, CN2302, CN2303, CN2304 (all manufactured by Sartomer Company), EBECRYL (registered trademark) 436, EBECRYL (registered trademark) 438, EBECRYL (registered trademark) 446, EBECRYL (registered trademark) 524, EBECRYL (registered trademark) 525, EBECRYL (registered trademark) 811, and EBECRYL (registered trademark) 812 (all manufactured by DAICEL-ALLNEX. LTD.).

Examples of the commercially available products of the polyether resin including a polymerizable group include BLEMMER (registered trademark) ADE-400A and BLEMMER (registered trademark) ADP-400 (both manufactured by NOF CORPORATION).

Examples of the commercially available products of the polycarbonate resin including a polymerizable group include polycarbonate diol diacrylate (manufactured by Ube Industries, Ltd.).

Examples of the commercially available products of the epoxy resin including a polymerizable group include EBECRYL (registered trademark) 3708 (manufactured by DAICEL-ALLNEX. LTD.), CN120, CN120B60, CN120B80, CN120E50 (all manufactured by Sartomer Company), and HITALOID 7851 (manufactured by Hitachi Chemical Co., Ltd.).

Examples of the commercially available products of the polybutadiene resin including a polymerizable group include CN301, CN303, and CN307 (all manufactured by Satomer Company).

From the viewpoint of balancing the adhesiveness and the dispersion stability, the weight-average molecular weight of the polymerizable resin is preferably in a range of 1,000 to 100,000, more preferably in a range of 1,000 to 40,000, and still more preferably in a range of 1,000 to 10,000.

The weight-average molecular weight of the polymerizable resin is a value measured by gel permeation chromatography (GPC).

In a case where the photosensitive composition of the present invention contains a polymerizable resin, from the viewpoint of effectively exhibiting the effects of the present invention, the content of the polymerizable resin is preferably in a range of 0.1% by mass to 10% by mass, more preferably in a range of 0.3% by mass to 5.0% by mass, and particularly preferably in a range of 1.0% by mass to 3.0% by mass based on the total amount of the photosensitive composition.

<Photopolymerization Initiator>

It is preferable that the photosensitive composition of the present invention contains a photopolymerization initiator.

In a case where the photosensitive composition of the present invention contains a photopolymerization initiator, one kind or two or more kinds of the photopolymerization initiators may be contained.

A known photopolymerization initiator which absorbs light (that is, active energy rays) and generates a radical that is a polymerization initiator species can be used as a photopolymerization initiator.

Preferred examples of the photopolymerization initiator include (a) carbonyl compounds such as aromatic ketones, (b) an acyl phosphine oxide compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound.

The compounds of (a) to (m) described above may be used alone or in combination of two or more kinds thereof for these photopolymerization initiators.

As preferred examples of (a) the carbonyl compound, (b) the acylphosphine oxide compound, and (e) the thio compound, compounds having a benzophenone skeleton or a thioxanthone skeleton described in "RADIATION CURING IN POLYMER SCIENCE AND TECHNOLOGY," J. P. FOUASSIER, J. F. RABEK (1993), pp. 77 to 117 are exemplified.

More preferred examples thereof include an α-thiobenzophenone compound described in JP1972-6416B (JP-S47-6416B), a benzoin ether compound described in JP1972-3981B (JP-S47-3981B), an α-substituted benzoin compound described in JP1972-22326B (JP-S47-22326B), a benzoin derivative described in JP1972-23664B (JP-S47-23664B), aroyl phosphonate ester described in JP1982-30704B (JP-S52-30704B), dialkoxybenzophenone described in JP1985-26483B (JP-S60-26483B), benzoin ethers described in JP1985-26403B (JP-S60-26403B) and JP1987-81345B (JP-S62-81345B), α-aminobenzophenones described in JP1989-34242B (JP-H01-3424B), U.S. Pat. No. 4,318,791A pamphlet, and EP0284561A1, p-di(dimethylaminobenzoyl)benzene described in JP1990-211452A (JP-H02-211452A), thio-substituted aromatic ketone described in JP1986-194062A (JP-S61-194062A), acylphosphine sulfide described in JP1990-9597B (JP-H02-9597B), acyl phosphine described in JP1990-9596B (JP-H02-9597B), thioxanthones described in JP1988-61950B (JP-S63-61950B), and coumarins described in JP1984-42864B (JP-S59-42864B).

Moreover, polymerization initiators described in JP2008-105379A and JP2009-114290A are also preferable.

Among these photopolymerization initiators, (a) the carbonyl compound or (b) the acylphosphine oxide compound is more preferable and specific examples thereof include bis(2,4,6-trimethylbenzoyl)-phenylphosphine oxide (for example, IRGACURE (registered trademark) 819, manufactured by BASF Japan Ltd.), 2-(dimethylamine)-1-(4-morpholinophenyl)-2-benzyl-1-butanone (for example, IRGACURE (registered trademark) 369, manufactured by BASF Japan Ltd.), 2-methyl-1-(4-methylthiophenyl)-2-morpholinopropan-1-one (for example, IRGACURE (registered trademark) 907, manufactured by BASF Japan Ltd.), 1-hydroxy-cyclohexyl-phenyl-ketone (for example, IRGACURE (registered trademark) 184, manufactured by BASF Japan Ltd.), and 2,4,6-trimethylbenzoyl-diphenyl-phosphine oxide (for example, DAROCUR (registered trademark) TPO and LUCIRIN (registered trademark) TPO (both manufactured by BASF Japan Ltd.)).

Among these, from the viewpoints of improving the sensitivity and the compatibility with LED light, as the photopolymerization initiator, (b) the acylphosphine oxide compound is preferable and a monoacylphosphine oxide compound (particularly preferably, 2,4,6-trimethylbenzoyl-diphenyl-phosphine oxide) or a bisacyl phosphine oxide compound (particularly preferably, bis(2,4,6-trimethylbenzoyl)-phenylphosphine oxide) is more preferable.

In a case where the photosensitive composition of the present invention contains a photopolymerization initiator, the content of the photopolymerization initiator is preferably in a range of 1.0% by mass to 25.0% by mass, more preferably in a range of 2.0% by mass to 20.0% by mass, and still more preferably in a range of 3.0% by mass to 15.0% by mass based on the total amount of the photosensitive composition.

<Sensitizer>

From the viewpoint of improving the sensitivity, the photosensitive composition of the present invention can contain a sensitizer.

Particularly, in a case where LED light is used for curing a film, it is preferable that the photosensitive composition of the present invention contains the above-described photopolymerization initiator and a sensitizer.

In a case where the photosensitive composition of the present invention contains a sensitizer, only one kind or two or more kinds of sensitizers may be contained.

A sensitizer is a substance that absorbs specific active energy rays and enters an electronically-excited state. A sensitizer having entered in an electronically-excited state is brought into a contact with a photopolymerization initiator and causes actions of electron transfer, energy transfer, heat generation, and the like. In this manner, chemical change in the photopolymerization initiator, that is, decomposition or generation of a radical, an acid, or a base is promoted.

Examples of the sensitizer include a benzophenone (BP), a thioxanthone, isopropylthioxanthone (ITX), ethyl 4-(dimethylamino)benzoate (EDB), anthraquinone, a 3-acyl coumarin derivative, terphenyl, styryl ketone, 3-(aroylmethylene)thiazoline, camphorquinone, eosin, rhodamine, and erythrosine.

Moreover, a compound represented by Formula (i) which is described in JP2010-24276A or a compound represented by Formula (I) which is described in JP1994-107718A (JP-H06-107718A) can be suitably used as a sensitizer.

Among the sensitizers described above, from the viewpoint of compatibility with LED light and reactivity with a photopolymerization initiator, at least one selected from thioxanthone, isopropylthioxanthone, ethyl 4-(dimethylamino)benzoate, and benzophenone is preferable.

In a case where the photosensitive composition of the present invention contains a sensitizer, the content of the sensitizer is preferably in a range of 0.5% by mass to 10% by mass, more preferably in a range of 1.0% by mass to 7.0% by mass, and particularly preferably 2.0% by mass to 6.0% by mass.

<Surfactant>

The photosensitive composition of the present invention may contain a surfactant.

As a surfactant, surfactants described in JP1987-173463A (JP-S62-173463A) and JP1987-183457A (JP-S62-183457A) can be exemplified. Examples thereof include anionic surfactants such as dialkyl sulfosuccinate, alkyl naphthalene sulfonate, and fatty acid salts; nonionic surfactants such as polyoxyethylene alkyl ether, polyoxyethylene alkyl allyl ether, acetylene glycol, a polyoxyethylene•polyoxypropylene block copolymer and siloxanes such as modified polydimethylsiloxane; cationic surfactants such as alkylamine salts and quaternary ammonium salts; and betaine-based surfactants such as carbobetaine and sulfobetaine.

Further, an organic fluoro compound which does not include a polymerizable group may be used instead of a surfactant. It is preferable that the organic fluoro compound is hydrophobic. As the organic fluoro compound, for example, a fluorine-containing surfactant, an oily fluorine-containing compound (for example, fluorine oil), a solid-like fluorine compound resin (for example, a tetrafluoroethylene resin), and compounds described in JP1982-9053B (JP-S57-9053B) (sections 8 to 17) and JP1987-135826B (JP-S62-135826B) are exemplified.

In a case where the photosensitive composition of the present invention contains a surfactant, the content of the surfactant is preferably in a range of 0.01% by mass to 5.0% by mass, more preferably in a range of 0.1% by mass to 3.0% by mass, and particularly preferably in a range of 0.3% by mass to 2.0% by mass based on the total amount of the photosensitive composition.

(Polymerization Inhibitor)

The photosensitive composition of the present invention may contain a polymerization inhibitor.

Examples of the polymerization inhibitor include p-methoxyphenol, quinones (such as hydroquinone, benzoquinone, and methoxybenzoquinone), phenothiazine, catechols, alkylphenols (such as dibutyl hydroxy toluene (BHT)), alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cupferron Al, and tris(N-nitroso-N-phenylhydroxylamine)aluminum salts.

Among these, at least one selected from p-methoxyphenol, catechols, quinones, alkylphenols, TEMPO, TEMPOL, cupferron Al, and tris(N-nitroso-N-phenylhydroxyamine) aluminum salts is preferable and at least one selected from p-methoxyphenol, hydroquinone, benzoquinone, BHT, TEMPO, TEMPOL, cupferron Al, and tris(N-nitroso-N-phenylhydroxyamine)aluminum salts is more preferable.

In a case where the photosensitive composition of the present invention contains a polymerization inhibitor, the content of the polymerization initiator is preferably in a range of 0.01% by mass to 2.0% by mass, more preferably in a range of 0.02% by mass to 1.0% by mass, and particularly preferably in a range of 0.03% by mass to 0.5% by mass based on the total amount of the photosensitive composition.

<Solvent>

The photosensitive composition of the present invention may contain a solvent.

Examples of the solvent include ketone such as acetone, methyl ethyl ketone, or diethyl ketone; alcohol such as methanol, ethanol, 2-propanol, 1-propanol, 1-butanol, or tert-butanol; a chlorinated solvent such as chloroform or methylene chloride; an aromatic solvent such as benzene or toluene; an ester solvent such as ethyl acetate, butyl acetate, or isopropyl acetate; an ether solvent such as diethyl ether, tetrahydrofuran, or dioxane; and a glycol ether solvent such as ethylene glycol monomethyl ether, ethylene glycol dimethyl ether.

In a case where the photosensitive composition of the present invention contains a solvent, from the viewpoint of reducing influence on a substrate, the content of the solvent is preferably 5% by mass or less, more preferably in a range of 0.01% by mass to 5% by mass, and particularly preferably in a range of 0.01% by mass to 3% by mass based on the total amount of the photosensitive composition.

<Water>

The photosensitive composition of the present invention may contain an infinitesimal amount of water within the range in which the effects of the present invention are not impaired.

However, from the viewpoint of more effectively obtaining the effects of the present invention, it is preferable that the photosensitive composition of the present invention is a non-aqueous photosensitive composition which does not substantially contain water. Specifically, the content of water is preferably 3% by mass or less, more preferably 2% by mass or less, and particularly preferably 1% by mass or less based on the total amount of the photosensitive composition.

<Colorant>

The photosensitive composition of the present invention may contain at least one colorant.

The photosensitive composition containing a colorant can be suitably used as an ink composition.

The colorant is not particularly limited and can be used by being arbitrarily selected from known coloring materials such as pigments, water-soluble dyes, and dispersed dyes. Among these, in terms of excellent weather fastness and being rich in color reproducibility, it is more preferable that the photosensitive composition contains a pigment.

The pigment is not particularly limited and can be appropriately selected according to the purpose thereof. Examples thereof include known organic pigments and inorganic pigments, resin particles dyed with a dye, commercially available pigment dispersions, and surface-treated pigments (for example, pigments being dispersed in water, liquid compounds, or insoluble resins as a dispersion medium and pigments which are surface-treated by a resin or a pigment derivative).

Examples of the organic pigments and inorganic pigments include yellow pigments, red pigments, magenta pigments, blue pigments, cyan pigments, green pigments, orange pigments, purple pigments, brown pigments, black pigments, and white pigments.

In a case where a pigment is used as a colorant, a pigment dispersant may be used as necessary at the time of preparation of pigment particles.

The colorants such as pigments and pigment dispersants can be appropriately referred to known documents, for example, the paragraphs 0152 to 0158 of JP2011-225848A and the paragraphs 0132 to 0149 of JP2009-209352A.

In a case where the photosensitive composition of the present invention contains a colorant, the content of the colorant can be set to be in a range of 0.05% by mass to 20% by mass and is preferably in a range of 0.2% by mass to 10% by mass based on the total amount of the photosensitive composition.

<Other Components>

The photosensitive composition of the present invention may contain components other than the components described above.

Examples of the other components include an ultraviolet absorber, a co-sensitizer, an antioxidant, a fading inhibitor, and a conductive salt.

Other components can be appropriately referred to known documents of JP2011-225848A, JP2009-209352A, and the like.

<Preferable Physical Properties>

The viscosity of the photosensitive composition of the present invention is not particularly limited.

The viscosity of the photosensitive composition of the present invention at 25° C. is preferably in a range of 10 mPa·s to 50 mPa·s, more preferably in a range of 10 mPa·s to 30 mPa·s, and still more preferably in a range of 10 mPa·s to 25 mPa·s. The viscosity of the photosensitive composition can be adjusted by, for example, adjusting the compositional ratios of respective components to be contained.

The viscosity mentioned here is a value measured using a viscometer "VISCOMETER RE-85L" (manufactured by TOKI SANGYO CO., LTD.).

In a case where the viscosity of the photosensitive composition is in the above-described preferable range, the jetting stability can be further improved particularly in the case where the photosensitive composition is used as an ink composition.

The surface tension of the photosensitive composition of the present invention is not particularly limited.

The surface tension of the photosensitive composition of the present invention at 30° C. is preferably in a range of 20 mN/m to 30 mN/m and more preferably in a range of 23 mN/m to 28 mN/m. In a case where a film is formed on various substrates such as polyolefin, PET, coated paper, and uncoated paper, the surface tension thereof is preferably 30 mN/m or less in terms of wettability and preferably 20 mN/m or greater in terms of suppression of bleeding and permeability.

The surface tension mentioned here is a value measured using a surface tensiometer DY-700 (manufactured by Kyowa Interface Science Co., Ltd.).

[Image Forming Method]

An image forming method of the present embodiment includes an application process of applying an ink composition which is the photosensitive composition of the present invention onto a recording medium according to an ink-jet method; and an irradiation process of irradiating the ink composition applied onto the recording medium with active energy rays.

According to the image forming method of the present embodiment, it is possible to form an image having excellent hardness and adhesiveness to a recording medium. Further, the formed image is also excellent in blocking resistance.

Moreover, the image forming method of the present embodiment is also excellent in storage stability and jetting stability of the ink composition.

(Application Process)

The application process is a process of applying the ink composition which is the photosensitive composition of the present invention onto a recording medium.

As the mode of applying the ink composition onto a recording medium, a mode of applying the ink composition onto a recording medium according to an ink-jet method is particularly preferable.

Substrates exemplified as the "substrates for forming a film" described above can be used as the recording medium.

Application of the ink composition according to the ink-jet method can be performed using a known ink jet recording device.

The ink jet recording device is not particularly limited and a known ink jet recording device which can achieve the target resolution can be arbitrarily selected and used. That is, in a case of known ink jet recording devices including commercially available products, it is possible to perform jetting of an ink composition to a recording medium according to the image forming method.

Examples of the ink jet recording device include devices including an ink supply system, a temperature sensor, and heating means.

The ink supply system is formed of an original tank including an ink composition, a supply pipe, an ink supply tank immediately front of an ink-jet head, a filter, and a piezoelectric ink-jet head. The piezoelectric ink-jet head can drive multi-size dots of preferably in a range of 1 pl to 100 pl and more preferably in a range of 8 pl to 30 pl so as to be jetted with the resolution of preferably in a range of 320 dpi×320 dpi (dot per inch) to 4000 dpi×4000 dpi (dot per inch), more preferably in a range of 400 dpi×400 dpi to 1600 dpi×1600 dpi, and still more preferably in a range of 720 dpi×720 dpi to 1600 dpi×1600 dpi. In addition, "dpi" indicates the number of dots per 2.54 cm (1 inch).

(Irradiation Process)

The irradiation process is a process of irradiating the ink composition applied onto a recording medium with active energy rays.

By irradiating the ink composition applied onto a recording medium with active energy rays, it becomes possible that a polymerization reaction of the ink composition proceeds, an image is fixed, and the film hardness of an image is improved.

Examples of the active energy rays which can be used in the irradiation process include ultraviolet rays (UV light), visible light, and electron beams. Among these, UV light is preferable.

The peak wavelength of the active energy rays (light) is preferably in a range of 200 nm to 405 nm, more preferably in a range of 220 nm to 390 nm, and still more preferably in a range of 220 nm to 385 nm.

Further, the peak wavelength thereof is also preferably in a range of 200 nm to 310 nm and also preferably in a range of 200 nm to 280 nm.

The exposure surface illuminance at the time of irradiation with active energy rays (light) is, for example, in a range of 10 mW/cm$^2$ to 2000 mW/cm$^2$ and preferably in a range of 20 mW/cm$^2$ to 1000 mW/cm$^2$.

As sources used to generate active energy rays (light), a mercury lamp, a metal halide lamp, a UV fluorescent lamp, gas laser, and solid-state laser are widely known.

Further, replacement of the light sources exemplified above with a semiconductor UV light emitting device is industrially and environmentally highly useful.

Further, among semiconductor UV light emitting device, a light emitting diode (LED) and a laser diode (LD) are small in size, long in service life, highly efficient, and at low cost, and thus the LED and the LD are expected as light sources for active energy rays.

As the light sources, a metal halide lamp, an extra-high pressure mercury lamp, a high pressure mercury lamp, a medium pressure mercury lamp, a low pressure mercury lamp, an LED, and blue-violet laser are preferable.

Among these, in a case where a sensitizer and a photo-polymerization initiator are used in combination, an extra-high pressure mercury lamp which is capable of irradiation with light at a wavelength of 365 nm, 405 nm, or 436 nm, a high pressure mercury lamp which is capable of irradiation with light at a wavelength of 365 nm, 405 nm, or 436 nm, or an LED which is capable of irradiation with light at a wavelength of 355 nm, 365 nm, 385 nm, 395 nm, or 405 nm is more preferable; and an LED which is capable of irradiation with light at a wavelength of 355 nm, 365 nm, 385 nm, 395 nm, or 405 nm is most preferable.

In the irradiation process, the time for irradiating the ink composition applied onto a recording medium with active energy rays is in a range of 0.01 seconds to 120 seconds and preferably in a range of 0.1 seconds to 90 seconds.

As the irradiation conditions and the basic irradiation methods, similarly, irradiation conditions and irradiation methods disclosed in JP1985-132767A (JP-S60-132767A) can be used.

Specifically, as a method of irradiation with active energy rays, a method in which irradiation with active energy rays is performed by providing light sources on both sides of a head unit including a jetting device of an ink composition and scanning the head unit and light sources using a so-called shuttle system or a method in which irradiation with active energy rays is performed using another light source that is not driven is preferable.

It is preferable that the irradiation with active energy rays is performed after a certain period of time (for example, in a range of 0.01 seconds to 120 seconds and preferably in a range of 0.01 seconds to 60 seconds) after the ink composition is impacted, heated, and then dried.

(Heating and Drying Process)

The image forming method may further include a heating and drying process after the application process and before the irradiation process as needed.

Examples of the heating means are not particularly limited and include a heat drum, hot air, an infrared lamp, a heat oven, and heating using a heating plate.

The heating temperature is preferably 40° C. or higher, more preferably in a range of 40° C. to 150° C., and still more preferably in a range of 40° C. to 80° C. Moreover, the heating time can be appropriately set in consideration of the composition of the ink composition and the printing speed.

The ink composition fixed by heating is optically fixed by being irradiated with active energy rays in the irradiation process as necessary. As described above, in the irradiation process, it is preferable that the ink composition is fixed using UV light.

[Film Forming Method]

A film forming method of the present embodiment includes an application process of applying the photosensitive composition of the present invention onto a substrate; and an irradiation process of irradiating the photosensitive composition applied onto the substrate with active energy rays.

According to the film forming method of the present embodiment, a film having excellent hardness and adhesiveness to a substrate can be formed. Further, the formed film is also excellent in blocking resistance.

Moreover, the film forming method of the present embodiment is excellent in storage stability of the photosensitive composition and also excellent in jetting stability in a case where an ink composition is jetted from an ink jet head.

The film forming method of the present embodiment is the same as the image forming method of the present embodiment except that the method of applying the photosensitive composition onto a substrate is not limited to the ink-jet method and the preferable modes are the same as each other.

The application of the photosensitive composition onto a substrate can be performed by applying a known coating method or printing method other than the ink-jet method.

The application (coating) of the photosensitive composition according to a coating method can be performed using a coating device such as a bar coater, a roll coater, a slit coater, or a spin coater.

[Resin, Image, Film]

A resin of the present embodiment includes at least one structural unit C selected from the group consisting of units (1-1) to (1-8) and (2-1) and at least one structural unit D selected from the group consisting of units (3-3) to (3-5), (4-1) to (4-4), and (5-1) to (5-3).

The resin of the present embodiment is effective as a component of the photosensitive composition described above.

The preferable mode of the resin of the present embodiment is the same as the preferable mode of the specific resin in the above-described photosensitive composition.

For example, it is preferable that the resin of the present embodiment includes a structural unit which is a unit (1-1) and at least one structural unit selected from the group consisting of units (4-1) to (4-3), (5-1), and (5-2); more preferable that the resin of the present embodiment includes a structural unit which is a unit (1-1) and at least one structural unit selected from units (4-3) and (5-2); and particularly preferable that the resin of the present embodiment includes a structural unit which is a unit (1-1), a structural unit which is a unit (4-3), and a structural unit which is a unit (5-2).

The image of the present embodiment contains the resin of the present embodiment. For this reason, the image of the present embodiment has excellent hardness and adhesiveness to a recording medium. Further, the image of the present embodiment is also excellent in blocking resistance.

Moreover, the film of the present embodiment contains the resin of the present embodiment. For this reason, the film of the present embodiment has excellent hardness and adhesiveness to a substrate. Further, the film of the present embodiment is also excellent in blocking resistance.

EXAMPLES

Hereinafter, the present invention will be described in detail with reference to examples, but the present invention is not limited to the examples described below as long as it is within the gist of the present invention.

Hereinafter, the numbers at the bottom right of respective structural units of a resin (copolymer) indicate copolymerization ratios (% by mass).

[Synthesis of Resin]

<Synthesis of Resin Used in Example 1A>

A resin used in Example 1A (hereinafter, also referred to as a "resin (1A)") was synthesized as follows.

99.91 g of methyl propylene glycol (reaction solvent) was weighed in a 300 ml three-neck flask including a cooling pipe and was heated and stirred at 75° C. in a nitrogen stream.

Apart from this, a mixed solution prepared by mixing 66.61 g of methyl propylene glycol, 35 g of pentamethyl piperidyl methacrylate (raw material monomer), 35 g of phenoxy ethyl methacrylate (raw material monomer), 0.7275 g of V-601 (dimethyl 2,2'-azobis(2-methylpropionate), initiator manufactured by Wako Pure Chemical Industries, Ltd.), and 0.6394 g of dodecyl mercaptan (chain transfer agent) was added dropwise to the above-described flask over two hours. After dropwise addition, the solution was heated at 75° C. for 4 hours, 0.09 g of V-601 (initiator) was added thereto, and the solution was further stirred at 90° C. for 2 hours and then reacted.

The obtained reaction solution was allowed to be cooled, and the cooled reaction solution was poured into 2000 ml of water, re-precipitated, purified, and vacuum-dried.

As described before, approximately 60 g of a resin (1A) (weight-average molecular weight (Mw): 10000) having a structure shown below was obtained.

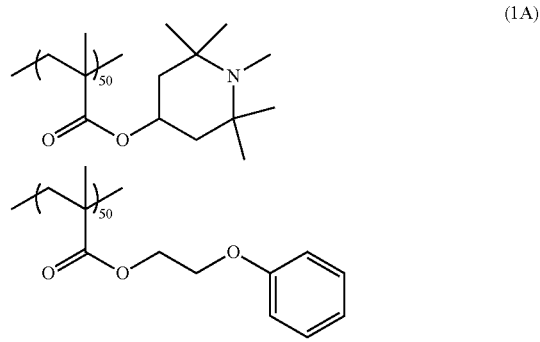

(1A)

<Synthesis of Resin Used in Example 25A>

A resin used in Example 25A (hereinafter, also referred to as a "resin (25A)") was synthesized as follows.

100.4 g of methyl propylene glycol was weighed in a 300 ml three-neck flask including a cooling pipe and was heated and stirred at 75° C. in a nitrogen stream.

Apart from this, a mixed solution prepared by mixing 66.93 g of methyl propylene glycol, 35 g of pentamethyl piperidyl methacrylate (raw material monomer), 35 g of N-vinyl caprolactam (raw material monomer), 0.9157 g of V-601 (initiator), and 0.8049 g of dodecyl mercaptan was added dropwise to the above-described flask over two hours. After dropwise addition, the solution was heated at 75° C. for 4 hours, 0.09 g of V-601 (initiator) was added thereto, and the solution was further stirred at 90° C. for 2 hours and then reacted.

The obtained reaction solution was allowed to be cooled, and the cooled reaction solution was poured into 2000 ml of water, re-precipitated, purified, and vacuum-dried.

As described before, approximately 60 g of a resin (25A) (weight-average molecular weight (Mw): 10000) having a structure shown below was obtained.

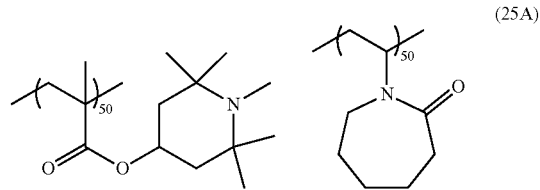

(25A)

<Synthesis of Resin Used in Example 39A>

A resin used in Example 39A (hereinafter, also referred to as a "resin (39A)") was synthesized as follows.

100.4 g of methyl propylene glycol was weighed in a 300 ml three-neck flask including a cooling pipe and was heated and stirred at 75° C. in a nitrogen stream.

Apart from this, a mixed solution prepared by mixing 66.93 g of methyl propylene glycol, 35 g of pentamethyl piperidyl methacrylate (raw material monomer), 21 g of N-vinyl caprolactam (raw material monomer), 14 g of acryloyl morpholine (raw material monomer), 0.9124 g of V-601 (initiator), and 0.8020 g of dodecyl mercaptan was added dropwise to the above-described flask over two hours. After dropwise addition, the solution was heated at 75° C. for 4 hours, 0.09 g of V-601 (initiator) was added thereto, and the solution was further stirred at 90° C. for 2 hours and then reacted.

The obtained reaction solution was allowed to be cooled, and the cooled reaction solution was poured into 2000 ml of water, re-precipitated, purified, and vacuum-dried.

As described before, approximately 60 g of a resin (39A) (weight-average molecular weight (Mw): 10000) having a structure shown below was obtained.

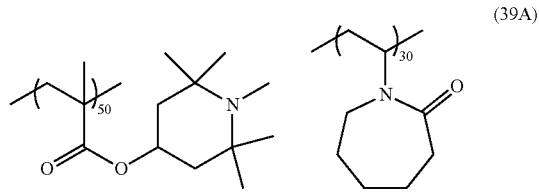

(39A)

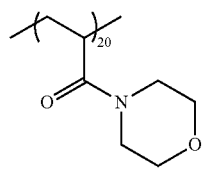

Resins used in other examples described below were synthesized in the same manner as those of the resin (1A), the resin (25A), and the resin (39A) by appropriately selecting the kind of raw material monomer and the amount to be used.

The weight-average molecular weight (Mw) was adjusted by adjusting the amounts of V-601 (initiator) and dodecyl mercaptan.

Example 1A

<Preparation of Photosensitive Composition a (Based on Monofunctional Monomer, Free from Sensitizer, and Free from Colorant)>

Respective components of the following compositions were mixed with each other and a photosensitive composition A was prepared.

The compositions of the photosensitive composition A is based on a monofunctional monomer (that is, a monofunctional radically polymerizable monomer, the same applies to hereinafter) and do not have a sensitizer nor a colorant.

—Compositions of Photosensitive Composition a (Based on Monofunctional Monomer, Free from Sensitizer, and Free from Colorant)—

| | |
|---|---|
| TMCHA (monofunctional monomer) described below | 15.0% by mass |
| DCPA (monofunctional monomer) described below | 15.0% by mass |
| IBOA (monofunctional monomer) described below | 20.9% by mass |
| CTFA (monofunctional monomer) described below | 23.0% by mass |
| PEA (monofunctional monomer) described below | 10.0% by mass |
| CN964 (urethane oligomer having polymerizable group, manufactured by Sartomer Company) | 2.0% by mass |
| IRGACURE 819 (photopolymerization initiator manufactured by BASF Japan Ltd., acyl phosphine oxide compound, specifically, bis(2,4,6-trimethylbenzoyl)-phenylphosphine oxide) | 5.0% by mass |
| IRGACURE 184 (photopolymerization initiator manufactured by BASF Japan Ltd., carbonyl compound, specifically, 1-hydroxy-cyclohexyl-phenyl-ketone) | 3.0% by mass |
| FIRSTCURE ST-1 (polymerization inhibitor manufactured by Albemarle Corporation, tris(N-nitroso-N-phenylhydroxylamine)aluminum salts) | 0.1% by mass |
| BYK-UV3575 (modified polydimethylsiloxane surfactant manufactured by BYK Chemie GmbH) | 1.0% by mass |
| Resin listed in Table 1 | 5.0% by mass |

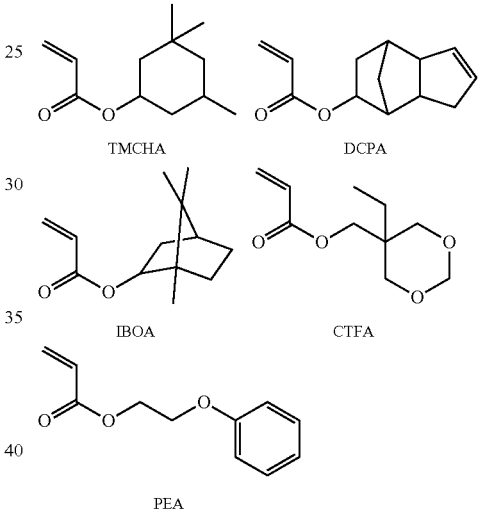

<Evaluation of Photosensitive Composition A>

Evaluation described below was performed using the photosensitive composition A.

The results are listed in Table 1.

(Adhesiveness of Cured Film)

The adhesiveness was evaluated respectively using a sample (PVC) for evaluation, a sample (A-PET) for evaluation, a sample (acryl) for evaluation, a sample (PC) for evaluation, and a sample (PS) for evaluation described below.

The sample (PVC) for evaluation was prepared in the following manner.

First, a polyvinyl chloride (PVC) sheet serving as a substrate was coated with the photosensitive composition A obtained in the above-described manner at a thickness of 12 μm using a K hand coater (bar No. 2, manufactured by RK Print Coat Instruments Ltd.), thereby obtaining a coating film. The obtained coating film was irradiated with UV light (ultraviolet rays) using a UV mini-conveyor apparatus CSOT (manufactured by GS Yuasa International Ltd.) for a test which was equipped with an ozoneless metal halide lamp MAN250L and in which the conveyor speed was set to 9.0 m/min and the exposure intensity was set to 2.0 W/cm², and thus the coating film was cured, thereby obtaining a cured film. In this manner, the sample (PVC) for evaluation was obtained.

The sample (A-PET) for evaluation was prepared in the same manner as that of the sample (PVC) for evaluation except that the substrate was changed into amorphous polyethylene terephthalate (A-PET) sheet.

The sample (acryl) for evaluation was prepared in the same manner as that of the sample (PVC) for evaluation except that the substrate was changed into an acrylic resin sheet.

The sample (PC) for evaluation was prepared in the same manner as that of the sample (PVC) for evaluation except that the substrate was changed into a polycarbonate (PC) sheet.

The sample (PS) for evaluation was prepared in the same manner as that of the sample (PVC) for evaluation except that the substrate was changed into a polystyrene (PS) sheet.

Here, the following sheets were respectively used as the PVC sheet, the A-PET sheet, the acrylic resin sheet, the PC sheet, and the PS sheet.

PVC sheet: "AVERY (registered trademark) 400 GLOSS WHITE PERMANENT" (manufactured by Avery Dennison Corporation)
A-PET sheet: "A-PET" (amorphous polyethylene terephthalate sheet) (manufactured by Takiron Co., Ltd.)
Acrylic resin sheet: "Acryace (registered trademark) UV" (manufactured by JSP Corporation)
PC sheet: "PC1600-2" (manufactured by Takiron Co., Ltd.)
PS sheet: "falcon hi impact polystyrene" (manufactured by Robert Home Group Ltd.)

A cross hatch test was performed on cured films of respective samples for evaluation in conformity with ISO2409 (cross-cut method), and evaluation was performed based on the following evaluation criteria.

In the cross hatch test, the cut interval was set to 1 mm and 25 pieces of square lattices having a dimension of 1 mm² were formed.

In the following evaluation criteria, 0 and 1 are acceptable for practical use.

In the following evaluation criteria, a percentage (%) of a lattice to be peeled off is a value acquired by the following equation. The total number of lattices acquired by the following equation is 25.

Percentage (%) of lattice to be peeled off=[(number of lattices being peeled off)/(total number of lattices)]×100

—Evaluation Criteria of Adhesiveness of Cured Film—
0: The percentage (%) of a lattice to be peeled off was 0%.
1: The percentage (%) of a lattice to be peeled off was greater than 0% to 5% or less.
2: The percentage (%) of a lattice to be peeled off was greater than 5% to 15% or less.
3: The percentage (%) of a lattice to be peeled off was greater than 15% to 35% or less.
4: The percentage (%) of a lattice to be peeled off was greater than 35% to 65% or less.
5: The percentage (%) of a lattice to be peeled off was greater than 65%.

(Pencil Hardness of Cured Film)
The evaluation of pencil hardness of the cured film was performed using the above-described sample (PVC) for evaluation.

The pencil hardness test was performed on the cured film of the sample (PVC) for evaluation using UNI (registered trademark, manufactured by MITSUBISHI PENCIL CO., LTD.) as a pencil in conformity with JIS K5600-5-4 (1999).

In the test results, the acceptable range of pencil hardness is HB or higher and preferably H or higher. There is a possibility that a printed matter whose pencil hardness is B or lower is damaged at the time of handling the printed matter, which is not preferable.

(Blocking Resistance of Cured Film)
The evaluation of blocking resistance of the cured film was performed using the above-described sample (PVC) for evaluation.

The sample (PVC) for evaluation was cut into a size of 20 mm×20 mm and this was used as an evaluation sample. Two evaluation samples were prepared.

Next, two evaluation samples were overlapped each other such that the cured films were brought into contact with each other, and a load of 10 N was applied to a direction in which two evaluation samples were pressed against each other for 10 seconds, and then the evaluation samples were peeled off.

Subsequently, each of the cured films of the two evaluation samples was observed, the presence or absence of traces in which the cured films were adhered to each other and the degree of adhesion in traces was visually observed, and then the blocking resistance of the cured films was evaluated based on the following evaluation criteria.

The results are listed in Table 1.

—Evaluation Criteria of Blocking Resistance of Cured Film—
5: Traces in which cured films were adhered to each other were not found and the blocking resistance of a cured film was markedly excellent.
4: Traces in which cured films were adhered to each other were found in a range of greater than 0% to less than 3% of the entire area of a cured film, but the blocking resistance of the cured film was not problematic for practical use.
3: Traces in which cured films were adhered to each other were found in a range of 3% to less than 10% of the entire area of a cured film, but the blocking resistance of the cured film was within the acceptable range for practical use.
2: Traces in which cured films were adhered to each other were found in a range of 10% to less than 50% of the entire area of a cured film, and the blocking resistance of the cured film was out of the acceptable range for practical use.
1: Traces in which cured films were adhered to each other were found in 50% or greater of the entire area of a cured film, and the blocking resistance of the cured film was extremely poor.

(Jetting Stability of Photosensitive Composition A)
The jetting stability of the photosensitive composition A (ink) was evaluated using a commercially available ink jet recording device (LuxelJet (registered trademark) UV3600GT/XT: trade name, manufactured by Fujifilm Holdings Corporation) including a piezoelectric ink jetting head, a polyethylene terephthalate (PET) film (manufactured by Toray Industries, Inc.) as a recording medium (substrate), and the photosensitive composition A as an ink according to the following method.

A process of forming a 100% solid image by jetting the photosensitive composition A (ink) onto the PET film under the following jetting conditions using the ink jet recording device and irradiating impacted ink with UV light (irradiation dose: 1000 mW/cm²) was continuously performed for 60 minutes.

The number of nozzles with ink clogging (nozzle loss) being generated in a case where the process was continuously performed for 60 minutes and the photosensitive composition was jetted was acquired, and evaluation was performed based on the following evaluation criteria. In the following evaluation criteria, 5 or 4 are acceptable for practical use.

—Jetting Conditions—
Number of channels: 318/head
Drive frequency: 4.8 kHz/dot
Ink drops: 7 drops, 42 pl
Temperature of head nozzle: 45° C.
—Jetting Stability of Photosensitive Composition A—
5: The nozzle loss is 0 to less than 2.
4: The nozzle loss is 2 to less than 5.
3: The nozzle loss is 5 to less than 7.
2: The nozzle loss is 7 to less than 10.
1: The nozzle loss is 10 or greater.

(Storage of Photosensitive Composition A)

The photosensitive composition A (50 mL) was put into a 50 mL glass bottle, and the bottle was covered and allowed to stand for 4 hours under a condition of a thermostatic bath (60° C.). The storage stability of the photosensitive composition A was evaluated based on the following evaluation criteria by measuring the viscosity of the photosensitive composition A before and after the composition was allowed to stand and acquiring an increase rate of the viscosity after the composition was allowed to stand with respect to the viscosity before the composition was allowed to stand. In the following evaluation criteria, 5 or 4 is acceptable for practical use.

Moreover, the viscosity of the photosensitive composition A was measured using a VISCOMETER RE-85L (manufactured by TOKI SANGYO CO., LTD.) as a viscometer under a liquid temperature condition of 25° C.

The results are listed in Table 1.

—Evaluation Criteria of Storage Stability of Photosensitive Composition A—
5: The increase rate of the viscosity after the composition was allowed to stand with respect to the viscosity before the composition was allowed to stand is less than 10%.
4: The increase rate of the viscosity after the composition was allowed to stand with respect to the viscosity before the composition was allowed to stand is 10% to less than 20%.
3: The increase rate of the viscosity after the composition was allowed to stand with respect to the viscosity before the composition was allowed to stand is 20% to less than 30%.
2: The increase rate of the viscosity after the composition was allowed to stand with respect to the viscosity before the composition was allowed to stand is 30% to less than 40%.
1: The increase rate of the viscosity after the composition was allowed to stand with respect to the viscosity before the composition was allowed to stand is 40% or greater.

Examples 2A to 51A

Operations which were the same as those in Example 1A were performed except that at least one of the kind of resin (the kind of structural unit, the copolymerization ratio, and Mw) in the compositions of the photosensitive composition A and the content of the resin based on the total amount of the composition (hereinafter, also simply referred to as the "content of a resin") was changed as listed in Table 1.

The results are listed in Table 1.

In the case of an example in which the content of the resin was changed, the total amount of the resin and monomers was set to be the same as in Example 1A by setting the compositional ratio of monomers to be constant and changing the total amount of the monomers.

Comparative Examples 1A to 5A

In the compositions of the photosensitive composition A, operations which were the same as those in Example 1A were performed except that the kind of resin was changed as listed in Table 1.

The results are listed in Table 1.

In Comparative Examples 1A to 5A, the structures of comparative resins a to d and a comparative compound e are as follows. In the comparative resins a to d, the numbers at the bottom right of respective structural units indicate copolymerization mass ratios. Further, the Mws of the comparative resins a to d are respectively as listed in Table 1.

Here, the comparative resins a, b, and c are respectively shown in specific examples (A-24), (A-25), and (A-7) described in the paragraphs 0100 and 0103 of JP2011-225848A.

The comparative resin d is PA-5 described in the paragraph 0219 of JP2009-139852A.

The comparative compound e is ADK STAB LA-52 (manufactured by ADEKA CORPORATION).

Comparative resin a

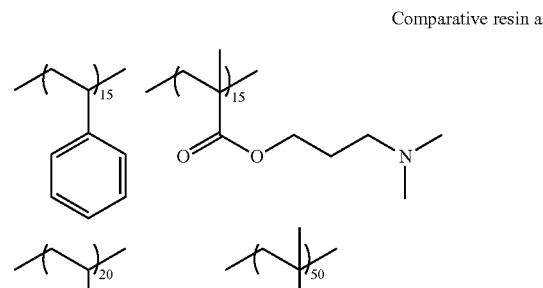

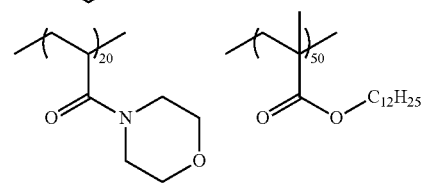

Comparative resin b

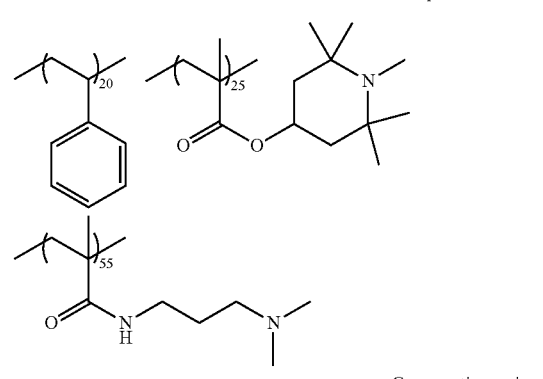

Comparative resin c

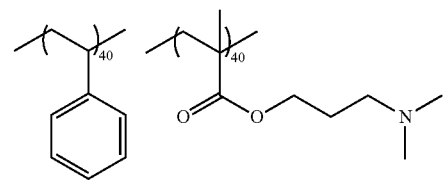

-continued

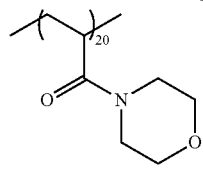
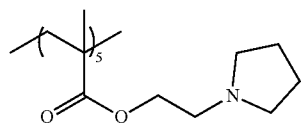

Comparative resin d

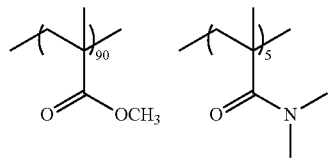

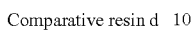

Comparative resin e

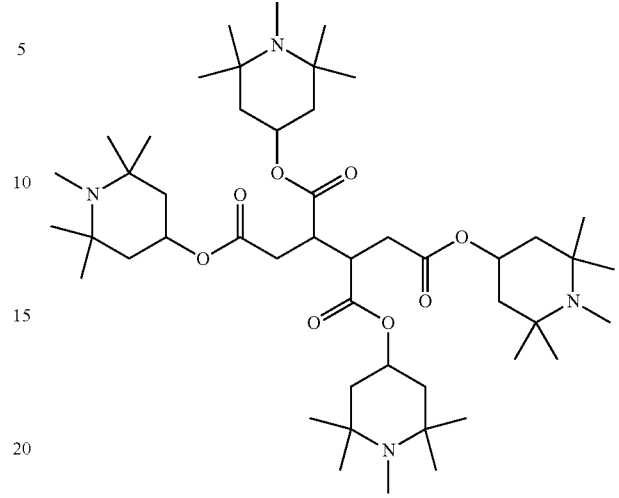

TABLE 1

Photosensitive composition A (based on monofunctional monomer, free from sensitizer, and free from colorant)

| | Resin | | | | | | | | | | Evaluation results | | | | | | |
|---|---|---|---|---|---|---|---|---|---|---|---|---|---|---|---|---|---|
| | Structural unit A | Structural unit B | Copolymerization ratio (% by mass) | | | | Content based on total amount of composition (% by mass) | Pencil hardness | Blocking resistance | Adhesiveness | | | | | Storage stability | Jetting stability |
| | a1 | b1 b2 | a1 | b1 | b2 | Mw | | | | PVC | PET | Acryl | PC | PS | | |
| Example 1A | (1-1) | (3-1) | 50 | 50 | 0 | 10000 | 5.0 | F | 4 | 0 | 1 | 1 | 0 | 1 | 5 | 5 |
| Example 2A | (1-1) | (3-2) | 50 | 50 | 0 | 10000 | 5.0 | F | 4 | 0 | 1 | 1 | 0 | 1 | 5 | 5 |
| Example 3A | (1-2) | (5-2) | 50 | 50 | 0 | 10000 | 5.0 | F | 5 | 0 | 0 | 0 | 0 | 0 | 5 | 5 |
| Example 4A | (1-3) | (5-2) | 50 | 50 | 0 | 10000 | 5.0 | F | 4 | 0 | 0 | 0 | 0 | 0 | 5 | 5 |
| Example 5A | (1-4) | (5-2) | 50 | 50 | 0 | 10000 | 5.0 | F | 5 | 0 | 0 | 0 | 0 | 0 | 5 | 5 |
| Example 6A | (1-5) | (5-2) | 50 | 50 | 0 | 10000 | 5.0 | F | 4 | 0 | 0 | 0 | 0 | 0 | 5 | 5 |
| Example 7A | (1-6) | (5-2) | 50 | 50 | 0 | 10000 | 5.0 | F | 4 | 0 | 0 | 0 | 0 | 0 | 5 | 5 |
| Example 8A | (1-7) | (5-2) | 50 | 50 | 0 | 10000 | 5.0 | F | 4 | 0 | 0 | 0 | 0 | 0 | 5 | 5 |
| Example 9A | (1-8) | (5-2) | 50 | 50 | 0 | 10000 | 5.0 | F | 5 | 0 | 0 | 0 | 0 | 0 | 5 | 5 |
| Example 10A | (2-1) | (5-2) | 50 | 50 | 0 | 10000 | 5.0 | F | 4 | 0 | 0 | 0 | 0 | 0 | 5 | 5 |
| Example 11A | (1-1) | (4-4) | 50 | 50 | 0 | 10000 | 5.0 | F | 5 | 0 | 1 | 0 | 0 | 1 | 5 | 5 |
| Example 12A | (1-1) | (5-3) | 50 | 50 | 0 | 10000 | 5.0 | F | 5 | 0 | 1 | 0 | 0 | 1 | 5 | 5 |
| Example 13A | (1-1) | (3-3) | 50 | 50 | 0 | 10000 | 5.0 | F | 5 | 0 | 1 | 0 | 0 | 1 | 5 | 5 |
| Example 14A | (1-1) | (3-4) | 50 | 50 | 0 | 10000 | 5.0 | F | 5 | 0 | 1 | 0 | 0 | 1 | 5 | 5 |
| Example 15A | (1-1) | (3-5) | 50 | 50 | 0 | 10000 | 5.0 | F | 5 | 0 | 1 | 0 | 0 | 1 | 5 | 5 |
| Example 16A | (1-1) | (4-1) | 50 | 50 | 0 | 10000 | 5.0 | H | 5 | 0 | 1 | 0 | 0 | 0 | 5 | 5 |
| Example 17A | (1-1) | (4-1) | 40 | 60 | 0 | 10000 | 5.0 | H | 5 | 0 | 1 | 0 | 0 | 0 | 5 | 5 |
| Example 18A | (1-1) | (4-1) | 60 | 40 | 0 | 10000 | 5.0 | H | 5 | 0 | 1 | 0 | 0 | 0 | 5 | 5 |
| Example 19A | (1-1) | (4-2) | 50 | 50 | 0 | 10000 | 5.0 | H | 5 | 0 | 1 | 0 | 0 | 0 | 5 | 5 |
| Example 20A | (1-1) | (4-2) | 70 | 30 | 0 | 10000 | 5.0 | H | 5 | 0 | 1 | 0 | 0 | 0 | 5 | 5 |
| Example 21A | (1-1) | (4-2) | 30 | 70 | 0 | 10000 | 5.0 | H | 5 | 0 | 1 | 0 | 0 | 0 | 5 | 5 |
| Example 22A | (1-1) | (5-2) | 20 | 80 | 0 | 10000 | 5.0 | H | 4 | 0 | 0 | 0 | 0 | 0 | 5 | 5 |
| Example 23A | (1-1) | (5-2) | 10 | 90 | 0 | 10000 | 5.0 | H | 4 | 0 | 1 | 1 | 0 | 0 | 5 | 5 |
| Example 24A | (1-1) | (5-2) | 30 | 70 | 0 | 10000 | 5.0 | H | 5 | 0 | 0 | 0 | 0 | 0 | 5 | 5 |
| Example 25A | (1-1) | (5-2) | 50 | 50 | 0 | 10000 | 5.0 | H | 5 | 0 | 0 | 0 | 0 | 0 | 5 | 5 |
| Example 26A | (1-1) | (5-2) | 70 | 30 | 0 | 10000 | 5.0 | H | 5 | 0 | 0 | 0 | 0 | 0 | 5 | 5 |
| Example 27A | (1-1) | (5-2) | 80 | 20 | 0 | 10000 | 5.0 | H | 5 | 0 | 1 | 1 | 0 | 0 | 5 | 5 |
| Example 28A | (1-1) | (5-2) | 90 | 10 | 0 | 10000 | 5.0 | H | 5 | 0 | 1 | 1 | 1 | 0 | 5 | 5 |
| Example 29A | (1-1) | (5-1) | 20 | 80 | 0 | 10000 | 5.0 | H | 4 | 0 | 1 | 0 | 0 | 1 | 5 | 5 |
| Example 30A | (1-1) | (5-1) | 30 | 70 | 0 | 10000 | 5.0 | H | 5 | 0 | 1 | 0 | 0 | 0 | 5 | 5 |
| Example 31A | (1-1) | (5-1) | 50 | 50 | 0 | 10000 | 5.0 | H | 5 | 0 | 1 | 0 | 0 | 0 | 5 | 5 |
| Example 32A | (1-1) | (5-1) | 70 | 30 | 0 | 10000 | 5.0 | H | 5 | 0 | 1 | 0 | 0 | 0 | 5 | 5 |
| Example 33A | (1-1) | (5-1) | 80 | 20 | 0 | 10000 | 5.0 | H | 5 | 0 | 1 | 1 | 0 | 0 | 5 | 5 |
| Example 34A | (1-1) | (4-3) | 20 | 80 | 0 | 10000 | 5.0 | H | 4 | 0 | 0 | 0 | 0 | 1 | 5 | 5 |
| Example 35A | (1-1) | (4-3) | 30 | 70 | 0 | 10000 | 5.0 | H | 5 | 0 | 0 | 0 | 0 | 0 | 5 | 5 |
| Example 36A | (1-1) | (4-3) | 50 | 50 | 0 | 10000 | 5.0 | H | 5 | 0 | 0 | 0 | 0 | 0 | 5 | 5 |

TABLE 1-continued

Photosensitive composition A (based on monofunctional monomer, free from sensitizer, and free from colorant)

| | Resin | | | | | | | | | Evaluation results | | | | | | |
|---|---|---|---|---|---|---|---|---|---|---|---|---|---|---|---|---|
| | Structural unit A | Structural unit B | | Copolymerization ratio (% by mass) | | | | Content based on total amount of composition | Pencil hard- | Blocking | Adhesiveness | | | | | Storage | Jetting |
| | a1 | b1 | b2 | a1 | b1 | b2 | Mw | (% by mass) | ness | resistance | PVC | PET | Acryl | PC | PS | stability | stability |
| Example 37A | (1-1) | (4-3) | | 70 | 30 | 0 | 10000 | 5.0 | H | 5 | 0 | 0 | 0 | 0 | 0 | 5 | 5 |
| Example 38A | (1-1) | (4-3) | | 80 | 20 | 0 | 10000 | 5.0 | H | 5 | 0 | 1 | 1 | 0 | 0 | 5 | 5 |
| Example 39A | (1-1) | (5-2) | (4-3) | 50 | 30 | 20 | 10000 | 5.0 | H | 5 | 0 | 0 | 0 | 0 | 0 | 5 | 5 |
| Example 40A | (1-1) | (5-2) | (4-3) | 40 | 40 | 20 | 10000 | 5.0 | H | 5 | 0 | 0 | 0 | 0 | 0 | 5 | 5 |
| Example 41A | (1-1) | (5-2) | (4-3) | 60 | 20 | 20 | 10000 | 5.0 | H | 5 | 0 | 0 | 0 | 0 | 0 | 5 | 5 |
| Example 42A | (1-1) | (5-2) | | 50 | 50 | 0 | 5000 | 5.0 | H | 5 | 0 | 0 | 0 | 0 | 0 | 5 | 5 |
| Example 43A | (1-1) | (5-2) | | 50 | 50 | 0 | 25000 | 5.0 | H | 5 | 0 | 0 | 0 | 0 | 0 | 5 | 5 |
| Example 44A | (1-1) | (5-2) | | 50 | 50 | 0 | 40000 | 5.0 | H | 5 | 0 | 0 | 0 | 0 | 0 | 5 | 5 |
| Example 45A | (1-1) | (4-3) | | 50 | 50 | 0 | 3000 | 5.0 | H | 5 | 0 | 0 | 0 | 0 | 0 | 5 | 5 |
| Example 46A | (1-1) | (4-3) | | 50 | 50 | 0 | 17000 | 5.0 | H | 5 | 0 | 0 | 0 | 0 | 0 | 5 | 5 |
| Example 47A | (1-1) | (4-3) | | 50 | 50 | 0 | 50000 | 5.0 | H | 5 | 0 | 0 | 0 | 0 | 0 | 5 | 5 |
| Example 48A | (1-1) | (5-2) | | 50 | 50 | 0 | 10000 | 0.5 | F | 5 | 0 | 0 | 0 | 0 | 0 | 5 | 5 |
| Example 49A | (1-1) | (5-2) | | 50 | 50 | 0 | 10000 | 2.0 | H | 5 | 0 | 0 | 0 | 0 | 0 | 5 | 5 |
| Example 50A | (1-1) | (5-2) | | 50 | 50 | 0 | 10000 | 7.0 | H | 5 | 0 | 0 | 0 | 0 | 0 | 5 | 5 |
| Example 51A | (1-1) | (5-2) | | 50 | 50 | 0 | 10000 | 10.0 | H | 5 | 0 | 0 | 0 | 0 | 0 | 5 | 4 |
| Comparative Example 1A | Comparative resin a | | | | | | 33000 | 5.0 | 3B | 2 | 3 | 4 | 5 | 5 | 5 | 1 | 2 |
| Comparative Example 2A | Comparative resin b | | | | | | 15000 | 5.0 | 2B | 3 | 3 | 4 | 4 | 4 | 4 | 1 | 1 |
| Comparative Example 3A | Comparative resin c | | | | | | 12000 | 5.0 | 3B | 2 | 3 | 4 | 4 | 4 | 4 | 1 | 3 |
| Comparative Example 4A | Comparative resin d | | | | | | 60000 | 5.0 | 3B | 1 | 3 | 5 | 5 | 5 | 5 | 2 | 1 |
| Comparative Example 5A | Comparative compound e | | | | | | | 5.0 | 2B | 2 | 4 | 5 | 5 | 5 | 5 | 4 | 4 |

In the columns of "Resin" in Table 1, "a1" indicates a structural unit included in the range of the structural unit A, "b1" and "b2" indicate a structural unit included in the range of the structural unit B. Further, the symbols of "(1-1)" and the like in respective examples indicate the unit (1-1) and the like.

The same applies to Tables 2 to 6.

As listed in Table 1, the photosensitive composition A in Examples 1A to 51A which includes a resin having the structural unit A and the structural unit B was excellent in storage stability and jetting stability (hereinafter, also referred to as "storage stability and the like") and the cured films formed in these examples were excellent in pencil hardness, adhesiveness to a substrate, and blocking resistance (hereinafter, also referred to as "pencil hardness, adhesiveness, and the like").

With respect to the respective examples, the photosensitive compositions in comparative examples (Comparative Examples 1A, 3A, and 4A) which did not include the structural unit A and for which the comparative resins a, c, and d were used were inferior in storage stability and the like and also inferior in pencil hardness of a cured film, adhesiveness of the cured film to a substrate, and the like. Similarly, the photosensitive composition in the comparative example (Comparative Example 2A) which did not include the structural unit B and for which the comparative resin b was used were inferior in storage stability and the like and also inferior in pencil hardness of a cured film, adhesiveness of the cured film, and the like.

Moreover, the photosensitive composition in Comparative Example 5A, which did not use a resin but used the comparative compound e, was inferior in pencil hardness of a cured film, adhesiveness of the cured film, and the like.

Further, from the results of Examples 3A to 9A and 25A, from the viewpoint of the blocking resistance of a cured film, it is understood that the units (1-1), (1-2), (1-4), and (1-8) are preferable as the structural unit A. Among these, from the viewpoints of the hardness and the blocking resistance of a cured film, it is understood that the unit (1-1) is particularly preferable as the structural unit A.

Further, from the results of Examples 1A to 16A, 25A, 31A, and 36A, from the viewpoints of the blocking resistance and the adhesiveness of a cured film, it is understood that the units (3-3) to (3-5), (4-1) to (4-4), and (5-1) to (5-3) are preferable as the structural unit B. Among these, from the viewpoints of the hardness, the blocking resistance, and the adhesiveness of a cured film, it is understood that the units (4-1) to (4-3), (5-1), and (5-2) are more preferable as the structural unit B.

Moreover, from the results of Examples 22A to 38A, from the viewpoints of the blocking resistance and the adhesiveness of a cured film, it is understood that the proportion of the structural unit A in the total amount of the structural unit A and the structural unit B is preferably in a range of 20% by mass to 80% by mass and particularly preferably in a range of 30% by mass to 70% by mass.

In addition, from the results of Examples 48A to 51A, it is understood that the content of a resin based on the total amount of the composition is preferably 1.0% by mass or greater from the viewpoints of the pencil hardness of a film and is preferably 9.0% by mass or less from the viewpoint of the jetting stability.

Example 1B

<Preparation of Photosensitive Composition B (Based on Monofunctional Monomer, Having Sensitizer, and Free from Colorant)>

Respective components of the following compositions were mixed with each other and a photosensitive composition B was prepared.

The compositions of the photosensitive composition B are based on a monofunctional monomer, have a sensitizer, and do not have a colorant.

—Compositions of Photosensitive Composition B (Based on Monofunctional Monomer, Having Sensitizer, and Free from Colorant)—

| | |
|---|---|
| IBOA (monofunctional monomer) described below | 30.0% by mass |
| CTFA (monofunctional monomer) described below | 30.0% by mass |
| PEA (monofunctional monomer) described below | 19.9% by mass |
| CN964 (urethane oligomer having polymerizable group, manufactured by Sartomer Company) | 2.0% by mass |
| IRGACURE 819 (photopolymerization initiator manufactured by BASF Japan Ltd., acyl phosphine oxide compound, specifically, bis(2,4,6-trimethylbenzoyl)-phenylphosphine oxide) | 5.0% by mass |
| IRGACURE 184 (photopolymerization initiator manufactured by BASF Japan Ltd., carbonyl compound, specifically, 1-hydroxy-cyclohexyl-phenyl-ketone) | 3.0% by mass |
| ITX (sensitizer, 2-isopropylthioxanthone) | 1.0% by mass |
| BP (sensitizer, benzophenone) | 2.0% by mass |
| EDB (sensitizer, ethyl 4-(dimethylamino)benzoate) | 1.0% by mass |
| FIRSTCURE ST-1 (polymerization inhibitor manufactured by Albemarle Corporation, tris(N-nitroso-N-phenylhydroxylamine)aluminum salts) | 0.1% by mass |
| BYK-UV3575 (modified polydimethylsiloxane surfactant manufactured by BYK Chemie GmbH) | 1.0% by mass |
| Resin listed in Table 2 | 5.0% by mass |

<Evaluation of Photosensitive Composition B>

Evaluation was performed in the same manner as in Example 1A except that the photosensitive composition B was used in place of the photosensitive composition A and the exposure device and the exposure conditions were changed as shown below.

The results are listed in Table 2.

In the evaluation of the photosensitive composition B, a 385 nm UV-LED irradiator (manufactured by CCS Inc.) for a test was used as an exposure device and an exposure energy of 300 mJ/cm$^2$ was set as the exposure condition.

Examples 2B to 18B

Operations which were the same as those in Example 1B were performed except that the kind of resin (the kind of structural unit, the copolymerization ratio, and Mw) in the compositions of the photosensitive composition B was changed as listed in Table 2.

The results are listed in Table 2.

Comparative Examples 1B to 5B

Operations which were the same as those in Example 1B were performed except that the kind of resin in the compositions of the photosensitive composition B was changed as listed in Table 2.

The results are listed in Table 2.

In Comparative Examples 1B to 5B, the comparative resins a to d and the comparative compound e are as described above.

TABLE 2

Photosensitive composition B (based on monofunctional monomer, having sensitizer, and free from colorant)

| | Resin | | | | | | | Evaluation results | | | | | | | |
|---|---|---|---|---|---|---|---|---|---|---|---|---|---|---|---|
| | Structural unit A | Structural unit B | | Copolymerization ratio (% by mass) | | | | Content based on total amount of composition (% by mass) | Pencil hardness | Blocking resistance | Adhesiveness | | | | | Storage stability | Jetting stability |
| | a1 | b1 | b2 | a1 | b1 | b2 | Mw | | | | PVC | PET | Acryl | PC | PS | | |
| Example 1B | (1-1) | (3-1) | | 50 | 50 | 0 | 10000 | 5.0 | F | 4 | 0 | 1 | 1 | 0 | 1 | 5 | 5 |
| Example 2B | (1-1) | (3-3) | | 50 | 50 | 0 | 10000 | 5.0 | F | 4 | 0 | 1 | 0 | 0 | 1 | 5 | 5 |
| Example 3B | (1-1) | (3-4) | | 50 | 50 | 0 | 10000 | 5.0 | F | 5 | 0 | 1 | 0 | 0 | 1 | 5 | 5 |
| Example 4B | (1-1) | (3-5) | | 50 | 50 | 0 | 10000 | 5.0 | F | 5 | 0 | 1 | 0 | 0 | 1 | 5 | 5 |
| Example 5B | (1-1) | (4-1) | | 50 | 50 | 0 | 10000 | 5.0 | H | 5 | 0 | 1 | 0 | 0 | 0 | 5 | 5 |
| Example 6B | (1-1) | (4-2) | | 50 | 50 | 0 | 10000 | 5.0 | H | 4 | 0 | 1 | 0 | 0 | 0 | 5 | 5 |
| Example 7B | (1-1) | (5-2) | | 30 | 70 | 0 | 10000 | 5.0 | H | 5 | 0 | 0 | 0 | 0 | 0 | 5 | 5 |
| Example 8B | (1-1) | (5-2) | | 50 | 50 | 0 | 10000 | 5.0 | H | 5 | 0 | 0 | 0 | 0 | 0 | 5 | 5 |
| Example 9B | (1-1) | (5-2) | | 70 | 30 | 0 | 10000 | 5.0 | H | 5 | 0 | 0 | 0 | 0 | 0 | 5 | 5 |
| Example 10B | (1-1) | (4-1) | | 50 | 50 | 0 | 10000 | 5.0 | H | 5 | 0 | 1 | 0 | 0 | 0 | 5 | 5 |
| Example 11B | (1-1) | (4-1) | | 70 | 30 | 0 | 10000 | 5.0 | H | 5 | 0 | 1 | 0 | 0 | 0 | 5 | 5 |
| Example 12B | (1-1) | (4-3) | | 50 | 50 | 0 | 10000 | 5.0 | H | 5 | 0 | 0 | 0 | 0 | 0 | 5 | 5 |
| Example 13B | (1-1) | (4-3) | | 70 | 30 | 0 | 10000 | 5.0 | H | 5 | 0 | 0 | 0 | 0 | 0 | 5 | 5 |
| Example 14B | (1-1) | (5-2) | (4-3) | 50 | 30 | 20 | 10000 | 5.0 | H | 5 | 0 | 0 | 0 | 0 | 0 | 5 | 5 |
| Example 15B | (1-1) | (5-2) | | 50 | 50 | 0 | 5000 | 5.0 | H | 5 | 0 | 0 | 0 | 0 | 0 | 5 | 5 |
| Example 16B | (1-1) | (5-2) | | 50 | 50 | 0 | 25000 | 5.0 | H | 5 | 0 | 0 | 0 | 0 | 0 | 5 | 5 |
| Example 17B | (1-1) | (4-3) | | 50 | 50 | 0 | 3000 | 5.0 | H | 5 | 0 | 0 | 0 | 0 | 0 | 5 | 5 |
| Example 18B | (1-1) | (4-3) | | 50 | 50 | 0 | 17000 | 5.0 | H | 5 | 0 | 0 | 0 | 0 | 0 | 5 | 5 |
| Comparative Example 1B | Comparative resin a | | | | | | 33000 | 5.0 | 3B | 2 | 3 | 4 | 5 | 5 | 5 | 1 | 2 |

TABLE 2-continued

| | Photosensitive composition B (based on monofunctional monomer, having sensitizer, and free from colorant) | | | | | | | | | | | | | | | |
|---|---|---|---|---|---|---|---|---|---|---|---|---|---|---|---|---|
| | Resin | | | | | | | | Evaluation results | | | | | | | |
| | Structural unit A | Structural unit B | Copolymerization ratio (% by mass) | | | | Mw | Content based on total amount of composition (% by mass) | Pencil hardness | Blocking resistance | Adhesiveness | | | | | Storage stability | Jetting stability |
| | a1 | b1 | b2 | a1 | b1 | b2 | | | | | PVC | PET | Acryl | PC | PS | | |
| Comparative Example 2B | | Comparative resin b | | | | | 15000 | 5.0 | 2B | 3 | 3 | 4 | 4 | 4 | 4 | 1 | 1 |
| Comparative Example 3B | | Comparative resin c | | | | | 12000 | 5.0 | 3B | 2 | 3 | 4 | 4 | 4 | 4 | 1 | 3 |
| Comparative Example 4B | | Comparative resin d | | | | | 60000 | 5.0 | 3B | 1 | 3 | 5 | 5 | 5 | 5 | 2 | 1 |
| Comparative Example 5B | | Comparative compound e | | | | | | 5.0 | 2B | 2 | 4 | 5 | 5 | 5 | 5 | 4 | 4 |

As listed in Table 2, it was confirmed that the photosensitive composition B in Examples 1B to 18B was excellent in storage stability and the like and also excellent in pencil hardness, adhesiveness, and the like of a cured film.

Example 1C

<Preparation of Photosensitive Composition C (Based on Polyfunctional Monomer, Free from Sensitizer, and Free from Colorant)>

Respective components of the following compositions were mixed with each other and a photosensitive composition C was prepared.

The compositions of the photosensitive composition C are based on a polyfunctional monomer (that is, a polyfunctional radically polymerizable monomer, the same applies to hereinafter) and do not have a sensitizer and a colorant.

—Compositions of Photosensitive Composition C (Based on Polyfunctional Monomer, Free from Sensitizer, and Free from Colorant)—

| | |
|---|---|
| DPGDA (polyfunctional monomer) described below | 35.0% by mass |
| HDDA (polyfunctional monomer) described below | 20.0% by mass |
| DVE3 (polyfunctional monomer) described below | 12.9% by mass |
| VEEA (polyfunctional monomer) described below | 15.0% by mass |
| DPHA (polyfunctional monomer) described below | 1.0% by mass |
| CN964 (urethane oligomer having polymerizable group, manufactured by Sartomer Company) described below | 2.0% by mass |
| IRGACURE 819 (photopolymerization initiator manufactured by BASF Japan Ltd., acyl phosphine oxide compound, specifically, bis(2,4,6-trimethylbenzoyl)-phenylphosphine oxide) | 5.0% by mass |
| IRGACURE 184 (photopolymerization initiator manufactured by BASF Japan Ltd., carbonyl compound, specifically, 1-hydroxy-cyclohexyl-phenyl-ketone) | 3.0% by mass |
| FIRSTCURE ST-1 (polymerization inhibitor manufactured by Albemarle Corporation, tris(N-nitroso-N-phenylhydroxylamine)aluminum salts) | 0.1% by mass |
| BYK-UV3575 (modified polydimethylsiloxane surfactant manufactured by BYK Chemie GmbH) | 1.0% by mass |
| Resin listed in Table 3 | 5.0% by mass |

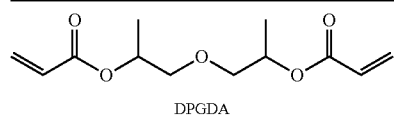

DPGDA

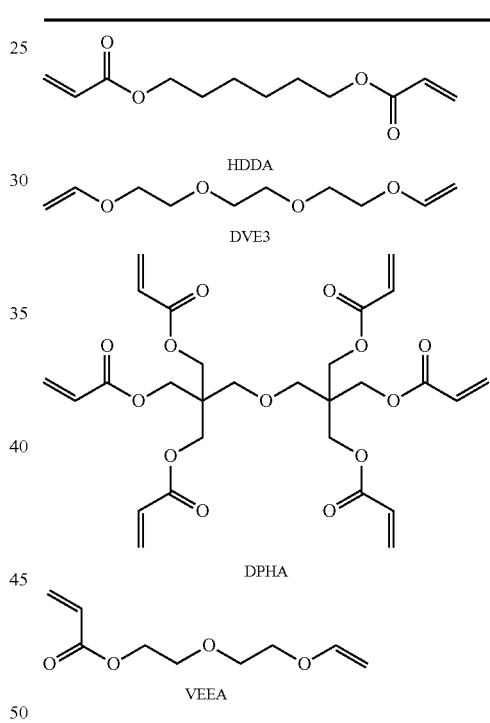

<Evaluation of Photosensitive Composition C>

Evaluation was performed in the same manner as in Example 1A except that the photosensitive composition C was used in place of the photosensitive composition A.

The results are listed in Table 3.

Examples 2C to 26C

Operations which were the same as those in Example 1C were performed except that the kind of resin (the kind of structural unit, the copolymerization ratio, and Mw) in the compositions of the photosensitive composition C was changed as listed in Table 3.

The results are listed in Table 3.

Comparative Examples 1C to 5C

Operations which were the same as those in Example 1C were performed except that the kind of resin in the compositions of the photosensitive composition C was changed as listed in Table 3.

The results are listed in Table 3.

In Comparative Examples 1C to 5C, the comparative resins a to d and the comparative compound e are as described above.

Example 1D

<Preparation of Photosensitive Composition D (Based on Monofunctional Monomer, Free from Sensitizer, and Having Colorant)>

Respective components of the following compositions were mixed with each other and a photosensitive composition D was prepared.

The compositions of the photosensitive composition D are based on a monofunctional monomer, do not have a sensitizer, and have a colorant.

TABLE 3

| | Photosensitive composition C (based on polyfunctional monomer, free from sensitizer, and free from colorant) | | | | | | | | | | | | | | |
|---|---|---|---|---|---|---|---|---|---|---|---|---|---|---|---|
| | Resin | | | | | | | | Evaluation results | | | | | | |
| | Structural unit A | Structural unit B | | Copolymerization ratio (% by mass) | | | | Content based on total amount of composition | Pencil hardness | Blocking resistance | Adhesiveness | | | | Storage stability | Jetting stability |
| | a1 | b1 | b2 | a1 | b1 | b2 | Mw | (% by mass) | | | PVC | PET | Acryl | PC | PS | | |
| Example 1C | (1-1) | (3-1) | | 50 | 50 | 0 | 10000 | 5.0 | H | 4 | 0 | 1 | 1 | 0 | 1 | 4 | 4 |
| Example 2C | (1-1) | (3-2) | | 50 | 50 | 0 | 10000 | 5.0 | H | 4 | 0 | 1 | 1 | 0 | 1 | 4 | 4 |
| Example 3C | (1-2) | (5-2) | | 50 | 50 | 0 | 10000 | 5.0 | H | 5 | 0 | 0 | 0 | 0 | 0 | 4 | 4 |
| Example 4C | (1-1) | (3-3) | | 50 | 50 | 0 | 10000 | 5.0 | H | 5 | 0 | 1 | 0 | 0 | 1 | 4 | 4 |
| Example 5C | (1-1) | (3-4) | | 50 | 50 | 0 | 10000 | 5.0 | H | 5 | 0 | 1 | 0 | 0 | 1 | 4 | 4 |
| Example 6C | (1-1) | (3-5) | | 50 | 50 | 0 | 10000 | 5.0 | H | 5 | 0 | 1 | 0 | 0 | 1 | 4 | 4 |
| Example 7C | (1-1) | (4-1) | | 50 | 50 | 0 | 10000 | 5.0 | 2H | 5 | 0 | 1 | 0 | 0 | 0 | 4 | 4 |
| Example 8C | (1-1) | (4-2) | | 50 | 50 | 0 | 10000 | 5.0 | 2H | 5 | 0 | 1 | 0 | 0 | 0 | 4 | 4 |
| Example 9C | (1-1) | (5-2) | | 20 | 80 | 0 | 10000 | 5.0 | 2H | 4 | 0 | 0 | 0 | 0 | 0 | 4 | 4 |
| Example 10C | (1-1) | (5-2) | | 30 | 70 | 0 | 10000 | 5.0 | 2H | 5 | 0 | 0 | 0 | 0 | 0 | 4 | 4 |
| Example 11C | (1-1) | (5-2) | | 50 | 50 | 0 | 10000 | 5.0 | 2H | 5 | 0 | 0 | 0 | 0 | 0 | 4 | 4 |
| Example 12C | (1-1) | (5-2) | | 70 | 30 | 0 | 10000 | 5.0 | 2H | 5 | 0 | 0 | 0 | 0 | 0 | 4 | 4 |
| Example 13C | (1-1) | (5-1) | | 50 | 50 | 0 | 10000 | 5.0 | 2H | 5 | 0 | 1 | 0 | 0 | 0 | 4 | 4 |
| Example 14C | (1-1) | (5-1) | | 70 | 30 | 0 | 10000 | 5.0 | 2H | 5 | 0 | 1 | 0 | 0 | 0 | 4 | 4 |
| Example 15C | (1-1) | (4-3) | | 30 | 70 | 0 | 10000 | 5.0 | 2H | 5 | 0 | 0 | 0 | 0 | 0 | 4 | 4 |
| Example 16C | (1-1) | (4-3) | | 50 | 50 | 0 | 10000 | 5.0 | 2H | 5 | 0 | 0 | 0 | 0 | 0 | 4 | 4 |
| Example 17C | (1-1) | (4-3) | | 70 | 30 | 0 | 10000 | 5.0 | 2H | 5 | 0 | 0 | 0 | 0 | 0 | 4 | 4 |
| Example 18C | (1-1) | (5-2) | (4-3) | 50 | 30 | 20 | 10000 | 5.0 | 2H | 5 | 0 | 0 | 0 | 0 | 0 | 4 | 4 |
| Example 19C | (1-1) | (5-2) | (4-3) | 40 | 40 | 20 | 10000 | 5.0 | 2H | 5 | 0 | 0 | 0 | 0 | 0 | 4 | 4 |
| Example 20C | (1-1) | (5-2) | (4-3) | 60 | 20 | 20 | 10000 | 5.0 | 2H | 5 | 0 | 0 | 0 | 0 | 0 | 4 | 4 |
| Example 21C | (1-1) | (5-2) | | 50 | 50 | 0 | 5000 | 5.0 | 2H | 5 | 0 | 0 | 0 | 0 | 0 | 4 | 4 |
| Example 22C | (1-1) | (5-2) | | 50 | 50 | 0 | 25000 | 5.0 | 2H | 5 | 0 | 0 | 0 | 0 | 0 | 4 | 4 |
| Example 23C | (1-1) | (5-2) | | 50 | 50 | 0 | 40000 | 5.0 | 2H | 5 | 0 | 0 | 0 | 0 | 0 | 4 | 4 |
| Example 24C | (1-1) | (4-3) | | 50 | 50 | 0 | 3000 | 5.0 | 2H | 5 | 0 | 0 | 0 | 0 | 0 | 4 | 4 |
| Example 25C | (1-1) | (4-3) | | 50 | 50 | 0 | 17000 | 5.0 | 2H | 5 | 0 | 0 | 0 | 0 | 0 | 4 | 4 |
| Example 26C | (1-1) | (4-3) | | 50 | 50 | 0 | 50000 | 5.0 | 2H | 5 | 0 | 0 | 0 | 0 | 0 | 4 | 4 |
| Comparative Example 1C | Comparative resin a | | | | | | 33000 | 5.0 | 3B | 2 | 3 | 4 | 5 | 5 | 5 | 1 | 1 |
| Comparative Example 2C | Comparative resin b | | | | | | 15000 | 5.0 | 2B | 3 | 3 | 4 | 4 | 4 | 4 | 1 | 1 |
| Comparative Example 3C | Comparative resin c | | | | | | 12000 | 5.0 | 3B | 2 | 3 | 4 | 4 | 4 | 4 | 1 | 2 |
| Comparative Example 4C | Comparative resin d | | | | | | 60000 | 5.0 | 3B | 1 | 3 | 5 | 5 | 5 | 5 | 1 | 1 |
| Comparative Example 5C | Comparative compound e | | | | | | | 5.0 | 2B | 2 | 4 | 5 | 5 | 5 | 5 | 3 | 3 |

As listed in Table 3, it was confirmed that the photosensitive composition C in Examples 1C to 26C was in the range in which the storage stability and the like were acceptable for practical use and was also excellent in pencil hardness of a cured film, adhesiveness of a cured film to each substrate, and the like.

The photosensitive composition D in Example 1D is a composition having a cyan (C) color, which contains a cyan (C) pigment as a colorant. The color of the composition is listed in Table 4.

Evaluation was performed in the same manner as in Example 1A except that the photosensitive composition D was used in place of the photosensitive composition A. The results are listed in Table 4.

—Compositions of Photosensitive Composition D (Based on Monofunctional Monomer, Free from Sensitizer, and Having Colorant)—

| | |
|---|---|
| TMCHA (monofunctional monomer) | 13.0% by mass |
| DCPA (monofunctional monomer) | 13.0% by mass |
| IBOA (monofunctional monomer) | 18.9% by mass |
| CTFA (monofunctional monomer) | 21.0% by mass |
| PEA (monofunctional monomer) | 6.0% by mass |
| CN964 (urethane oligomer having polymerizable group, manufactured by Sartomer Company) | 2.0% by mass |
| IRGACURE 819 (photopolymerization initiator manufactured by BASF Japan Ltd., acyl phosphine oxide compound, specifically, bis(2,4,6-trimethylbenzoyl)-phenylphosphine oxide) | 5.0% by mass |
| IRGACURE 184 (photopolymerization initiator manufactured by BASF Japan Ltd., carbonyl compound, specifically, 1-hydroxy-cyclohexyl-phenyl-ketone) | 3.0% by mass |
| FIRSTCURE ST-1 (polymerization inhibitor manufactured by Albemarle Corporation, tris(N-nitroso-N-phenylhydroxylamine)aluminum salts) | 0.1% by mass |
| BYK-UV3575 (modified polydimethylsiloxane surfactant manufactured by BYK Chemie GmbH) | 1.0% by mass |
| C (cyan) pigment dispersion liquid | 12.0% by mass |
| Resin listed in Table 4 | 5.0% by mass |

<Preparation of Pigment Dispersion Liquid>

In Example 1D and respective examples and comparative examples described below, in examples in which the colors of the compositions were described as yellow (Y), magenta (M), cyan (C), and black (K), a yellow (Y) pigment dispersion liquid, a magenta (M) pigment dispersion liquid, a cyan (C) pigment dispersion liquid, and a black (K) pigment dispersion liquid described below were respectively used as a pigment dispersion liquid. Hereinafter, a method of preparing these pigment dispersion liquids is described.

The following pigment (colorant), dispersant, and polymerizable monomer were mixed with each other and stirred for 10 minutes at 2,500 rev/min using a mixer (L4R, manufactured by Silverson Machine Ltd.), thereby obtaining a mixture. Thereafter, the obtained mixture was put into a bead mill disperser DISPERMAT LS (manufactured by VMA Getzmann GmbH) and dispersed at 2,500 rev/min for 6 hours using a YTZ ball (manufactured by NIKKATO CORPORATION) having a diameter of 0.65 mm, thereby preparing respective pigment dispersion liquids (Y, M, C, and K).

Examples 2D to 51D

Operations which were the same as those in Example 1D were performed except that at least one of the kind of resin (the kind of structural unit, the copolymerization ratio, and Mw), the content of the resin based on the total amount of the composition (hereinafter, also simply referred to as the "content of a resin"), and the color of the composition (that is, the kind of pigment dispersion liquid) in the compositions of the photosensitive composition D was changed as listed in Table 4.

The results are listed in Table 4.

In an example in which the content of the resin was changed, the total amount of the resin and monomers was set to be the same as in Example 1A by setting the compositional ratio of monomers to be constant and changing the total amount of the monomers.

Comparative Examples 1D to 5D

Operations which were the same as those in Example 1D were performed except that the kind of resin in the compositions of the photosensitive composition D was changed as listed in Table 4.

| -Yellow (Y) pigment dispersion liquid- | |
|---|---|
| Pigment: C.I. Pigment Yellow 12 (yellow pigment, manufactured by CLARIANT) | 10 parts |
| Dispersant: Solsperse 32000 (polymer dispersant, manufactured by Lubrizol Corporation) | 5 parts |
| Polymerizable monomer: 2-phenoxyethyl acrylate | 85 parts |
| -Magenta (M) pigment dispersion liquid- | |
| Pigment: C.I. Pigment Red 57:1 (magenta pigment, manufactured by CLARIANT) | 15 parts |
| Dispersant: Solsperse 32000 (polymer dispersant, manufactured by Lubrizol Corporation) | 5 parts |
| Polymerizable monomer: 2-phenoxyethyl acrylate | 80 parts |
| -Cyan (C) pigment dispersion liquid- | |
| Pigment: C.I. Pigment Blue 15:3 (cyan pigment, manufactured by CLARIANT) | 20 parts |
| Dispersant: Solsperse 32000 (polymer dispersant, manufactured by Lubrizol Corporation) | 5 parts |
| Polymerizable monomer: 2-phenoxyethyl acrylate | 75 parts |
| -Black (K) pigment dispersion liquid- | |
| Pigment: C.I. Pigment Black 7 (black pigment, manufactured by CLARIANT) | 20 parts |
| Dispersant: Solsperse 32000 (polymer dispersant, manufactured by Lubrizol Corporation) | 5 parts |
| Polymerizable monomer: 2-phenoxyethyl acrylate | 75 parts |

The results are listed in Table 4.

In Comparative Examples 1D to 5D, the comparative resins a to d and a comparative compound e are as described above.

TABLE 4

| | Photosensitive composition D (based on monofunctional monomer, free from sensitizer, and having colorant) | | | | | | | | | | | | | | | | | |
|---|---|---|---|---|---|---|---|---|---|---|---|---|---|---|---|---|---|---|
| | Resin | | | | | | | Content based on total amount of composition (% by mass) | | Evaluation results | | | | | | | |
| | Structural unit A | Structural unit B | | Copolymerization ratio (% by mass) | | | | | | | | Adhesiveness | | | | | |
| | | | | | | | | | | Pencil hardness | Blocking resistance | | | | | | Storage stability | Jetting stability |
| | a1 | b1 | b2 | a1 | b1 | b2 | Mw | | Color | | | PVC | PET | Acryl | PC | PS | | |
| Example 1D | (1-1) | (3-1) | | 50 | 50 | 0 | 10000 | 5.0 | C | F | 4 | 0 | 1 | 1 | 0 | 1 | 5 | 5 |
| Example 2D | (1-1) | (3-2) | | 50 | 50 | 0 | 10000 | 5.0 | C | F | 4 | 0 | 1 | 1 | 0 | 1 | 5 | 5 |
| Example 3D | (1-2) | (5-2) | | 50 | 50 | 0 | 10000 | 5.0 | C | F | 5 | 0 | 0 | 0 | 0 | 0 | 5 | 5 |
| Example 4D | (1-3) | (5-2) | | 50 | 50 | 0 | 10000 | 5.0 | C | F | 4 | 0 | 0 | 0 | 0 | 0 | 5 | 5 |
| Example 5D | (1-4) | (5-2) | | 50 | 50 | 0 | 10000 | 5.0 | C | F | 5 | 0 | 0 | 0 | 0 | 0 | 5 | 5 |
| Example 6D | (1-5) | (5-2) | | 50 | 50 | 0 | 10000 | 5.0 | C | F | 4 | 0 | 0 | 0 | 0 | 0 | 5 | 5 |
| Example 7D | (1-6) | (5-2) | | 50 | 50 | 0 | 10000 | 5.0 | C | F | 4 | 0 | 0 | 0 | 0 | 0 | 5 | 5 |
| Example 8D | (1-7) | (5-2) | | 50 | 50 | 0 | 10000 | 5.0 | C | F | 4 | 0 | 0 | 0 | 0 | 0 | 5 | 5 |
| Example 9D | (1-8) | (5-2) | | 50 | 50 | 0 | 10000 | 5.0 | C | F | 5 | 0 | 0 | 0 | 0 | 0 | 5 | 5 |
| Example 10D | (2-1) | (5-2) | | 50 | 50 | 0 | 10000 | 5.0 | C | F | 4 | 0 | 0 | 0 | 0 | 0 | 5 | 5 |
| Example 11D | (1-1) | (4-4) | | 50 | 50 | 0 | 10000 | 5.0 | C | F | 5 | 0 | 1 | 0 | 0 | 1 | 5 | 5 |
| Example 12D | (1-1) | (5-3) | | 50 | 50 | 0 | 10000 | 5.0 | C | F | 5 | 0 | 1 | 0 | 0 | 1 | 5 | 5 |
| Example 13D | (1-1) | (3-3) | | 50 | 50 | 0 | 10000 | 5.0 | C | F | 5 | 0 | 1 | 0 | 0 | 1 | 5 | 5 |
| Example 14D | (1-1) | (3-4) | | 50 | 50 | 0 | 10000 | 5.0 | C | F | 5 | 0 | 1 | 0 | 0 | 1 | 5 | 5 |
| Example 15D | (1-1) | (3-5) | | 50 | 50 | 0 | 10000 | 5.0 | C | F | 5 | 0 | 1 | 0 | 0 | 1 | 5 | 5 |
| Example 16D | (1-1) | (4-1) | | 50 | 50 | 0 | 10000 | 5.0 | C | H | 5 | 0 | 1 | 0 | 0 | 0 | 5 | 5 |
| Example 17D | (1-1) | (4-1) | | 40 | 60 | 0 | 10000 | 5.0 | C | H | 5 | 0 | 1 | 0 | 0 | 0 | 5 | 5 |
| Example 18D | (1-1) | (4-1) | | 60 | 40 | 0 | 10000 | 5.0 | C | H | 5 | 0 | 1 | 0 | 0 | 0 | 5 | 5 |
| Example 19D | (1-1) | (4-2) | | 50 | 50 | 0 | 10000 | 5.0 | M | H | 5 | 0 | 1 | 0 | 0 | 0 | 5 | 5 |
| Example 20D | (1-1) | (4-2) | | 70 | 30 | 0 | 10000 | 5.0 | M | H | 5 | 0 | 1 | 0 | 0 | 0 | 5 | 5 |
| Example 21D | (1-1) | (4-2) | | 30 | 70 | 0 | 10000 | 5.0 | M | H | 5 | 0 | 1 | 0 | 0 | 0 | 5 | 5 |
| Example 22D | (1-1) | (5-2) | | 20 | 80 | 0 | 10000 | 5.0 | Y | H | 4 | 0 | 0 | 0 | 0 | 0 | 5 | 5 |
| Example 23D | (1-1) | (5-2) | | 10 | 90 | 0 | 10000 | 5.0 | Y | H | 4 | 0 | 1 | 1 | 0 | 0 | 5 | 5 |
| Example 24D | (1-1) | (5-2) | | 30 | 70 | 0 | 10000 | 5.0 | Y | H | 5 | 0 | 0 | 0 | 0 | 0 | 5 | 5 |
| Example 25D | (1-1) | (5-2) | | 50 | 50 | 0 | 10000 | 5.0 | Y | H | 5 | 0 | 0 | 0 | 0 | 0 | 5 | 5 |
| Example 26D | (1-1) | (5-2) | | 70 | 30 | 0 | 10000 | 5.0 | Y | H | 5 | 0 | 0 | 0 | 0 | 0 | 5 | 5 |
| Example 27D | (1-1) | (5-2) | | 80 | 20 | 0 | 10000 | 5.0 | Y | H | 5 | 0 | 1 | 1 | 0 | 0 | 5 | 5 |
| Example 28D | (1-1) | (5-2) | | 90 | 10 | 0 | 10000 | 5.0 | Y | H | 5 | 0 | 1 | 1 | 1 | 0 | 5 | 5 |
| Example 29D | (1-1) | (5-1) | | 20 | 80 | 0 | 10000 | 5.0 | K | H | 4 | 0 | 1 | 0 | 0 | 1 | 5 | 5 |
| Example 30D | (1-1) | (5-1) | | 30 | 70 | 0 | 10000 | 5.0 | K | H | 5 | 0 | 1 | 0 | 0 | 0 | 5 | 5 |
| Example 31D | (1-1) | (5-1) | | 50 | 50 | 0 | 10000 | 5.0 | K | H | 5 | 0 | 1 | 0 | 0 | 0 | 5 | 5 |
| Example 32D | (1-1) | (5-1) | | 70 | 30 | 0 | 10000 | 5.0 | K | H | 5 | 0 | 1 | 0 | 0 | 0 | 5 | 5 |
| Example 33D | (1-1) | (5-1) | | 80 | 20 | 0 | 10000 | 5.0 | K | H | 5 | 0 | 1 | 1 | 0 | 0 | 5 | 5 |

TABLE 4-continued

Photosensitive composition D (based on monofunctional monomer, free from sensitizer, and having colorant)

| | Resin | | | | | | | | | | | | | | | | |
|---|---|---|---|---|---|---|---|---|---|---|---|---|---|---|---|---|---|
| | Structural unit A | Structural unit B | | Copolymerization ratio (% by mass) | | | | Content based on total amount of composition (% by mass) | | Evaluation results | | | | | | | |
| | | | | | | | | | | | | Adhesiveness | | | | | |
| | | | | | | | | | Pencil hardness | Blocking resistance | | | | | | Storage stability | Jetting stability |
| | a1 | b1 | b2 | a1 | b1 | b2 | Mw | | Color | | | PVC | PET | Acryl | PC | PS | |
| Example 34D | (1-1) | (4-3) | | 20 | 80 | 0 | 10000 | 5.0 | C | H | 4 | 0 | 0 | 0 | 0 | 1 | 5 | 5 |
| Example 35D | (1-1) | (4-3) | | 30 | 70 | 0 | 10000 | 5.0 | C | H | 5 | 0 | 0 | 0 | 0 | 0 | 5 | 5 |
| Example 36D | (1-1) | (4-3) | | 50 | 50 | 0 | 10000 | 5.0 | C | H | 5 | 0 | 0 | 0 | 0 | 0 | 5 | 5 |
| Example 37D | (1-1) | (4-3) | | 70 | 30 | 0 | 10000 | 5.0 | C | H | 5 | 0 | 0 | 0 | 0 | 0 | 5 | 5 |
| Example 38D | (1-1) | (4-3) | | 80 | 20 | 0 | 10000 | 5.0 | C | H | 5 | 0 | 1 | 1 | 0 | 0 | 5 | 5 |
| Example 39D | (1-1) | (5-2) | (4-3) | 50 | 30 | 20 | 10000 | 5.0 | K | H | 5 | 0 | 0 | 0 | 0 | 0 | 5 | 5 |
| Example 40D | (1-1) | (5-2) | (4-3) | 40 | 40 | 20 | 10000 | 5.0 | K | H | 5 | 0 | 0 | 0 | 0 | 0 | 5 | 5 |
| Example 41D | (1-1) | (5-2) | (4-3) | 60 | 20 | 20 | 10000 | 5.0 | K | H | 5 | 0 | 0 | 0 | 0 | 0 | 5 | 5 |
| Example 42D | (1-1) | (5-2) | | 50 | 50 | 0 | 5000 | 5.0 | C | H | 5 | 0 | 0 | 0 | 0 | 0 | 5 | 5 |
| Example 43D | (1-1) | (5-2) | | 50 | 50 | 0 | 25000 | 5.0 | C | H | 5 | 0 | 0 | 0 | 0 | 0 | 5 | 5 |
| Example 44D | (1-1) | (5-2) | | 50 | 50 | 0 | 40000 | 5.0 | C | H | 5 | 0 | 0 | 0 | 0 | 0 | 5 | 5 |
| Example 45D | (1-1) | (4-3) | | 50 | 50 | 0 | 3000 | 5.0 | C | H | 5 | 0 | 0 | 0 | 0 | 0 | 5 | 5 |
| Example 46D | (1-1) | (4-3) | | 50 | 50 | 0 | 17000 | 5.0 | C | H | 5 | 0 | 0 | 0 | 0 | 0 | 5 | 5 |
| Example 47D | (1-1) | (4-3) | | 50 | 50 | 0 | 50000 | 5.0 | C | H | 5 | 0 | 0 | 0 | 0 | 0 | 5 | 5 |
| Example 48D | (1-1) | (5-2) | | 50 | 50 | 0 | 10000 | 0.5 | Y | F | 5 | 0 | 0 | 0 | 0 | 0 | 5 | 5 |
| Example 49D | (1-1) | (5-2) | | 50 | 50 | 0 | 10000 | 2.0 | Y | H | 5 | 0 | 0 | 0 | 0 | 0 | 5 | 5 |
| Example 50D | (1-1) | (5-2) | | 50 | 50 | 0 | 10000 | 7.0 | Y | H | 5 | 0 | 0 | 0 | 0 | 0 | 5 | 5 |
| Example 51D | (1-1) | (5-2) | | 50 | 50 | 0 | 10000 | 10.0 | Y | H | 5 | 0 | 0 | 0 | 0 | 0 | 5 | 4 |
| Comparative Example 1D | Comparative resin a | | | | | | 33000 | 5.0 | C | 3B | 2 | 3 | 4 | 5 | 5 | 5 | 1 | 2 |
| Comparative Example 2D | Comparative resin b | | | | | | 15000 | 5.0 | C | 2B | 3 | 3 | 4 | 4 | 4 | 4 | 1 | 1 |
| Comparative Example 3D | Comparative resin c | | | | | | 12000 | 5.0 | C | 3B | 2 | 3 | 4 | 4 | 4 | 4 | 1 | 3 |
| Comparative Example 4D | Comparative resin d | | | | | | 60000 | 5.0 | C | 3B | 1 | 3 | 5 | 5 | 5 | 5 | 2 | 1 |
| Comparative Example 5D | Comparative compound e | | | | | | | 5.0 | C | 2B | 2 | 4 | 5 | 5 | 5 | 5 | 4 | 4 |

As listed in Table 4, it was confirmed that the photosensitive composition D in Examples 1D to 51D was excellent in storage stability and the like and also excellent in pencil hardness, adhesiveness, and the like of a cured film.

Example 1E

<Preparation of Photosensitive Composition E (Based on Monofunctional Monomer, Having Sensitizer, and Having Colorant)>

Respective components of the following compositions were mixed with each other and a photosensitive composition E was prepared.

The compositions of the photosensitive composition E are based on a monofunctional monomer, have a sensitizer, and have a colorant.

The photosensitive composition E in Example 1E is a composition having a cyan (C) color, which contains a cyan (C) pigment as a colorant. The color of the composition is listed in Table 5.

—Compositions of Photosensitive Composition E (Based on Monofunctional Monomer, Having Sensitizer, and Having Colorant)—

| | |
|---|---|
| IBOA (monofunctional monomer) | 25.0% by mass |
| CTFA (monofunctional monomer) | 25.0% by mass |
| PEA (monofunctional monomer) | 17.9% by mass |
| CN964 (urethane oligomer having polymerizable group, manufactured by Sartomer Company) | 2.0% by mass |
| IRGACURE 819 (photopolymerization initiator manufactured by BASF Japan Ltd., acyl phosphine oxide compound, specifically, bis(2,4,6-trimethylbenzoyl)-phenylphosphine oxide) | 5.0% by mass |
| IRGACURE 184 (photopolymerization initiator manufactured by BASF Japan Ltd., carbonyl compound, specifically, 1-hydroxy-cyclohexyl-phenyl-ketone) | 3.0% by mass |
| ITX (sensitizer, 2-isopropylthioxanthone) | 1.0% by mass |
| BP (sensitizer, benzophenone) | 2.0% by mass |
| EDB (sensitizer, ethyl 4-(dimethylamino)benzoate) | 1.0% by mass |
| FIRSTCURE ST-1 (polymerization inhibitor manufactured by Albemarle Corporation) | 0.1% by mass |
| BYK-UV3575 (modified polydimethylsiloxane surfactant manufactured by BYK Chemie GmbH) | 1.0% by mass |
| Cyan (C) pigment dispersion liquid | 12.0% by mass |
| Resin listed in Table 5 | 5.0% by mass |

<Evaluation of Photosensitive Composition E>

Evaluation was performed in the same manner as in Example 1A except that the photosensitive composition E was used in place of the photosensitive composition A and the exposure device and the exposure conditions were changed as shown below.

The results are listed in Table 5.

In the evaluation of the photosensitive composition E, a 385 nm UV-LED irradiator (manufactured by CCS Inc.) for a test used as an exposure device and an exposure energy of 300 mJ/cm$^2$ was set as the exposure condition.

Examples 2E to 22E

Operations which were the same as those in Example 1E were performed except that the kind of resin (the kind of structural unit, the copolymerization ratio, and Mw) and the color of the composition (that is, the kind of pigment dispersion liquid) in the compositions of the photosensitive composition E were changed as listed in Table 5.

The results are listed in Table 5.

In examples in which the colors of the compositions were described as yellow (Y), magenta (M), and black (K), a yellow (Y) pigment dispersion liquid, a magenta (M) pigment dispersion liquid, and a black (K) pigment dispersion liquid described above were respectively used as a pigment dispersion liquid.

Comparative Examples 1E to 5E

Operations which were the same as those in Example 1E were performed except that the kind of resin in the compositions of the photosensitive composition E was changed as listed in Table 5.

The results are listed in Table 5.

In Comparative Examples 1E to 5E, the comparative resins a to d and the comparative compound e are as described above.

TABLE 5

Photosensitive composition E (based on monofunctional monomer, having sensitizer, and having colorant)

| | Resin | | | | | | Content based on total amount of composition | | Evaluation results | | | | | | | |
|---|---|---|---|---|---|---|---|---|---|---|---|---|---|---|---|---|---|
| | Structural unit A | Structural unit B | | Copolymerization ratio (% by mass) | | | | | | Pencil hardness | Blocking resistance | Adhesiveness | | | | | Storage stability | Jetting stability |
| | a1 | b1 | b2 | a1 | b1 | b2 | Mw | (% by mass) | Color | | | PVC | PET | Acryl | PC | PS | | |
| Example 1E | (1-1) | (3-1) | | 50 | 50 | 0 | 10000 | 5.0 | C | F | 4 | 0 | 1 | 1 | 0 | 1 | 5 | 5 |
| Example 2E | (1-1) | (3-3) | | 50 | 50 | 0 | 10000 | 5.0 | C | F | 4 | 0 | 1 | 1 | 0 | 1 | 5 | 5 |
| Example 3E | (1-1) | (3-4) | | 50 | 50 | 0 | 10000 | 5.0 | C | F | 5 | 0 | 1 | 0 | 0 | 1 | 5 | 5 |
| Example 4E | (1-1) | (3-5) | | 50 | 50 | 0 | 10000 | 5.0 | C | H | 5 | 0 | 1 | 0 | 0 | 0 | 5 | 5 |
| Example 5E | (1-1) | (4-1) | | 50 | 50 | 0 | 10000 | 5.0 | M | H | 5 | 0 | 1 | 0 | 0 | 0 | 5 | 5 |
| Example 6E | (1-1) | (4-2) | | 50 | 50 | 0 | 10000 | 5.0 | Y | H | 4 | 0 | 0 | 0 | 0 | 0 | 5 | 5 |
| Example 7E | (1-1) | (5-2) | | 30 | 70 | 0 | 10000 | 5.0 | Y | H | 5 | 0 | 0 | 0 | 0 | 0 | 5 | 5 |
| Example 8E | (1-1) | (5-2) | | 50 | 50 | 0 | 10000 | 5.0 | Y | H | 5 | 0 | 0 | 0 | 0 | 0 | 5 | 5 |
| Example 9E | (1-1) | (5-2) | | 70 | 30 | 0 | 10000 | 5.0 | Y | H | 5 | 0 | 0 | 0 | 0 | 0 | 5 | 5 |
| Example 10E | (1-1) | (4-1) | | 50 | 50 | 0 | 10000 | 5.0 | Y | H | 5 | 0 | 1 | 1 | 0 | 0 | 5 | 5 |
| Example 11E | (1-1) | (4-1) | | 70 | 30 | 0 | 10000 | 5.0 | K | H | 5 | 0 | 1 | 0 | 0 | 0 | 5 | 5 |
| Example 12E | (1-1) | (4-3) | | 50 | 50 | 0 | 10000 | 5.0 | C | H | 5 | 0 | 0 | 0 | 0 | 0 | 5 | 5 |

TABLE 5-continued

Photosensitive composition E (based on monofunctional monomer, having sensitizer, and having colorant)

| | Resin Structural unit A a1 | Resin Structural unit B b1 | Resin Structural unit B b2 | Copolymerization ratio (% by mass) a1 | Copolymerization ratio (% by mass) b1 | Copolymerization ratio (% by mass) b2 | Mw | Content based on total amount of composition (% by mass) | Color | Pencil hardness | Blocking resistance | Adhesiveness PVC | Adhesiveness PET | Adhesiveness Acryl | Adhesiveness PC | Adhesiveness PS | Storage stability | Jetting stability |
|---|---|---|---|---|---|---|---|---|---|---|---|---|---|---|---|---|---|---|
| Example 13E | (1-1) | (4-3) | | 70 | 30 | 0 | 10000 | 5.0 | C | H | 5 | 0 | 0 | 0 | 0 | 0 | 5 | 5 |
| Example 14E | (1-1) | (5-2) | (4-3) | 50 | 30 | 20 | 10000 | 5.0 | K | H | 5 | 0 | 0 | 0 | 0 | 0 | 5 | 5 |
| Example 15E | (1-1) | (5-2) | (4-3) | 50 | 30 | 20 | 10000 | 5.0 | K | H | 5 | 0 | 0 | 0 | 0 | 0 | 5 | 5 |
| Example 16E | (1-1) | (5-2) | (4-3) | 50 | 30 | 20 | 10000 | 5.0 | K | H | 5 | 0 | 0 | 0 | 0 | 0 | 5 | 5 |
| Example 17E | (1-1) | (5-2) | | 50 | 50 | 0 | 5000 | 5.0 | C | H | 5 | 0 | 0 | 0 | 0 | 0 | 5 | 5 |
| Example 18E | (1-1) | (5-2) | | 50 | 50 | 0 | 25000 | 5.0 | C | H | 5 | 0 | 0 | 0 | 0 | 0 | 5 | 5 |
| Example 19E | (1-1) | (5-2) | | 50 | 50 | 0 | 40000 | 5.0 | C | H | 5 | 0 | 0 | 0 | 0 | 0 | 5 | 4 |
| Example 20E | (1-1) | (4-3) | | 50 | 50 | 0 | 3000 | 5.0 | C | H | 5 | 0 | 0 | 0 | 0 | 0 | 5 | 5 |
| Example 21E | (1-1) | (4-3) | | 50 | 50 | 0 | 17000 | 5.0 | C | H | 5 | 0 | 0 | 0 | 0 | 0 | 5 | 5 |
| Example 22E | (1-1) | (4-3) | | 50 | 50 | 0 | 50000 | 5.0 | C | H | 5 | 0 | 0 | 0 | 0 | 0 | 5 | 4 |
| Comparative Example 1E | Comparative resin a | | | | | | 33000 | 5.0 | C | 3B | 2 | 3 | 4 | 5 | 5 | 5 | 1 | 2 |
| Comparative Example 2E | Comparative resin b | | | | | | 15000 | 5.0 | C | 2B | 3 | 3 | 4 | 4 | 4 | 4 | 1 | 1 |
| Comparative Example 3E | Comparative resin c | | | | | | 12000 | 5.0 | C | 3B | 2 | 3 | 4 | 4 | 4 | 4 | 1 | 3 |
| Comparative Example 4E | Comparative resin d | | | | | | 60000 | 5.0 | C | 3B | 1 | 3 | 5 | 5 | 5 | 5 | 2 | 1 |
| Comparative Example 5E | Comparative compound e | | | | | | | 5.0 | C | 2B | 2 | 4 | 5 | 5 | 5 | 5 | 4 | 4 |

As listed in Table 5, it was confirmed that the photosensitive composition E in Examples 1E to 22E was excellent in storage stability and the like and also excellent in pencil hardness, adhesiveness, and the like of a cured film.

Particularly, from the results of Examples 18E to 22E, from the viewpoint of the jetting stability, it is understood that the Mw of the resin is preferably in a range of 1000 to 30000.

Example 1F

<Preparation of Photosensitive Composition F (Based on Polyfunctional Monomer, Free from Sensitizer, and Having Colorant)>

Respective components of the following compositions were mixed with each other and a photosensitive composition F was prepared.

The compositions of the photosensitive composition F are based on a polyfunctional monomer, do not have a sensitizer, and have a colorant.

—Compositions of Photosensitive Composition F (Based on Polyfunctional Monomer, Free from Sensitizer, and Free from Colorant)—

| | |
|---|---|
| DPGDA (polyfunctional monomer) | 35.0% by mass |
| HDDA (polyfunctional monomer) | 20.0% by mass |
| DVE3 (polyfunctional monomer) | 12.9% by mass |
| VEEA (polyfunctional monomer) | 15.0% by mass |
| DPHA (polyfunctional monomer) | 1.0% by mass |
| CN964 (urethane oligomer having polymerizable group, manufactured by Sartomer Company) | 2.0% by mass |
| IRGACURE 819 (photopolymerization initiator manufactured by BASF Japan Ltd., acyl phosphine oxide compound, specifically, bis(2,4,6-trimethylbenzoyl)-phenylphosphine oxide) | 5.0% by mass |

-continued

| | |
|---|---|
| IRGACURE 184 (photopolymerization initiator manufactured by BASF Japan Ltd., carbonyl compound, specifically, 1-hydroxy-cyclohexyl-phenyl-ketone) | 3.0% by mass |
| FIRSTCURE ST-1 (polymerization inhibitor manufactured by Albemarle Corporation, tris(N-nitroso-N-phenylhydroxylamine)aluminum salts) | 0.1% by mass |
| BYK-UV3575 (modified polydimethylsiloxane surfactant manufactured by BYK Chemie GmbH) | 1.0% by mass |
| Cyan (C) pigment dispersion liquid | 12.0% by mass |
| Resin listed in Table 6 | 5.0% by mass |

<Evaluation of Photosensitive Composition F>

Evaluation was performed in the same manner as in Example 1A except that the photosensitive composition F was used in place of the photosensitive composition A.

The results are listed in Table 6.

Examples 2F to 22F

Operations which were the same as those in Example 1F were performed except that the kind of resin (the kind of structural unit, the copolymerization ratio, and Mw) and the color of the composition (that is, the kind of pigment dispersion liquid) in the compositions of the photosensitive composition F were changed as listed in Table 6.

The results are listed in Table 6.

In examples in which the colors of the compositions were described as yellow (Y), magenta (M), and black (K), a yellow (Y) pigment dispersion liquid, a magenta (M) pigment dispersion liquid, and a black (K) pigment dispersion liquid described above were respectively used as a pigment dispersion liquid.

Comparative Examples 1F to 5F

Operations which were the same as those in Example 1F were performed except that the kind of resin in the compositions of the photosensitive composition F was changed as listed in Table 6.

The results are listed in Table 6.

In Comparative Examples 1F to 5F, the comparative resins a to d and the comparative compound e are as described above.

TABLE 6

Photosensitive composition F (based on polyfunctional monomer, free from sensitizer, and having colorant)

| | Resin | | | | | | | Content based on total amount of composition (% by mass) | Color | Evaluation results | | | | | | | |
|---|---|---|---|---|---|---|---|---|---|---|---|---|---|---|---|---|---|
| | Structural unit A | Structural unit B | | Copolymerization ratio (% by mass) | | | Mw | | | Pencil hardness | Blocking resistance | Adhesiveness | | | | | Storage stability | Jetting stability |
| | a1 | b1 | b2 | a1 | b1 | b2 | | | | | | PVC | PET | Acryl | PC | PS | | |
| Example 1F | (1-1) | (3-1) | | 50 | 50 | 0 | 10000 | 5.0 | C | H | 4 | 0 | 1 | 1 | 0 | 1 | 4 | 4 |
| Example 2F | (1-1) | (3-3) | | 50 | 50 | 0 | 10000 | 5.0 | C | H | 5 | 0 | 1 | 0 | 0 | 1 | 4 | 4 |
| Example 3F | (1-1) | (4-1) | | 60 | 40 | 0 | 10000 | 5.0 | C | 2H | 5 | 0 | 1 | 0 | 0 | 0 | 4 | 4 |
| Example 4F | (1-1) | (4-2) | | 70 | 30 | 0 | 10000 | 5.0 | M | 2H | 5 | 0 | 1 | 0 | 0 | 0 | 4 | 4 |
| Example 5F | (1-1) | (5-2) | | 20 | 80 | 0 | 10000 | 5.0 | Y | 2H | 4 | 0 | 0 | 0 | 0 | 0 | 4 | 4 |
| Example 6F | (1-1) | (5-2) | | 30 | 70 | 0 | 10000 | 5.0 | Y | 2H | 5 | 0 | 0 | 0 | 0 | 0 | 4 | 4 |
| Example 7F | (1-1) | (5-2) | | 50 | 50 | 0 | 10000 | 5.0 | Y | 2H | 5 | 0 | 0 | 0 | 0 | 0 | 4 | 4 |
| Example 8F | (1-1) | (5-2) | | 70 | 30 | 0 | 10000 | 5.0 | Y | 2H | 5 | 0 | 0 | 0 | 0 | 0 | 4 | 4 |
| Example 9F | (1-1) | (5-2) | | 80 | 20 | 0 | 10000 | 5.0 | Y | 2H | 5 | 0 | 1 | 1 | 0 | 0 | 4 | 4 |
| Example 10F | (1-1) | (5-1) | | 20 | 80 | 0 | 10000 | 5.0 | K | 2H | 4 | 0 | 1 | 0 | 0 | 1 | 4 | 4 |
| Example 11F | (1-1) | (5-1) | | 50 | 50 | 0 | 10000 | 5.0 | K | 2H | 5 | 0 | 1 | 0 | 0 | 0 | 4 | 4 |
| Example 12F | (1-1) | (5-1) | | 80 | 20 | 0 | 10000 | 5.0 | K | 2H | 5 | 0 | 1 | 1 | 0 | 0 | 4 | 4 |
| Example 13F | (1-1) | (4-3) | | 30 | 70 | 0 | 10000 | 5.0 | C | 2H | 5 | 0 | 0 | 0 | 0 | 0 | 4 | 4 |
| Example 14F | (1-1) | (4-3) | | 70 | 30 | 20 | 10000 | 5.0 | C | 2H | 5 | 0 | 0 | 0 | 0 | 0 | 4 | 4 |
| Example 15F | (1-1) | (5-2) | (4-3) | 50 | 30 | 20 | 10000 | 5.0 | K | 2H | 5 | 0 | 0 | 0 | 0 | 0 | 4 | 4 |
| Example 16F | (1-1) | (5-2) | (4-3) | 40 | 40 | 20 | 10000 | 5.0 | K | 2H | 5 | 0 | 0 | 0 | 0 | 0 | 4 | 4 |
| Example 17F | (1-1) | (5-2) | | 50 | 50 | 0 | 5000 | 5.0 | C | 2H | 5 | 0 | 0 | 0 | 0 | 0 | 4 | 4 |
| Example 18F | (1-1) | (5-2) | | 50 | 50 | 0 | 25000 | 5.0 | C | 2H | 5 | 0 | 0 | 0 | 0 | 0 | 4 | 4 |

TABLE 6-continued

Photosensitive composition F (based on polyfunctional monomer, free from sensitizer, and having colorant)

| | Resin | | | | | | | | | Evaluation results | | | | | | | |
|---|---|---|---|---|---|---|---|---|---|---|---|---|---|---|---|---|---|
| | Structural unit A | Structural unit B | | Copolymerization ratio (% by mass) | | | | Content based on total amount of composition (% by mass) | | Pencil hardness | Blocking resistance | Adhesiveness | | | | | Storage stability | Jetting stability |
| | a1 | b1 | b2 | a1 | b1 | b2 | Mw | | Color | | | PVC | PET | Acryl | PC | PS | | |
| Example 19F | (1-1) | (5-2) | | 50 | 50 | 0 | 40000 | 5.0 | C | 2H | 5 | 0 | 0 | 0 | 0 | 0 | 4 | 4 |
| Example 20F | (1-1) | (4-3) | | 50 | 50 | 0 | 3000 | 5.0 | C | 2H | 5 | 0 | 0 | 0 | 0 | 0 | 4 | 4 |
| Example 21F | (1-1) | (4-3) | | 50 | 50 | 0 | 17000 | 5.0 | C | 2H | 5 | 0 | 0 | 0 | 0 | 0 | 4 | 4 |
| Example 22F | (1-1) | (4-3) | | 50 | 50 | 0 | 50000 | 5.0 | C | 2H | 5 | 0 | 0 | 0 | 0 | 0 | 4 | 4 |
| Comparative Example 1F | Comparative resin a | | | | | | 33000 | 5.0 | C | 3B | 2 | 3 | 4 | 5 | 5 | 5 | 1 | 1 |
| Comparative Example 2F | Comparative resin b | | | | | | 15000 | 5.0 | C | 2B | 3 | 3 | 4 | 4 | 4 | 4 | 1 | 1 |
| Comparative Example 3F | Comparative resin c | | | | | | 12000 | 5.0 | C | 3B | 2 | 3 | 4 | 4 | 4 | 4 | 1 | 2 |
| Comparative Example 4F | Comparative resin d | | | | | | 60000 | 5.0 | C | 3B | 1 | 3 | 5 | 5 | 5 | 5 | 1 | 1 |
| Comparative Example 5F | Comparative compound e | | | | | | | 5.0 | C | 2B | 2 | 4 | 5 | 5 | 5 | 5 | 3 | 3 |

As listed in Table 6, it was confirmed that the photosensitive composition F in Examples 1F to 22F was in the range in which the storage stability and the like were acceptable for practical use and was also excellent in pencil hardness of a cured film, adhesiveness of a cured film, and the like.

Example 1G

<Preparation of Photosensitive Composition G (Based on Polyfunctional Monomer, Free from Sensitizer, and Having Colorant)>

Respective components of the following compositions were mixed with each other by changing the cyan (C) pigment dispersion liquid to a yellow (Y) pigment dispersion liquid in the composition of the photosensitive composition F described above and further changing the resin to the resin listed in Table 7, thereby preparing a photosensitive composition G.

(Re-Jetting Properties after Photosensitive Composition G being Left to Stand)

After the photosensitive composition G (ink) was jetted (first jetting) for 30 minutes under the following jetting conditions using a commercially available ink jet recording device (LuxelJet (registered trademark) UV3600GT/XT: trade name, manufactured by Fujifilm Corporation) including a piezoelectric ink jetting head, the jetting was stopped.

After a predetermined time elapsed since the jetting was stopped, a 100% solid image having a size of 5 cm×5 cm was formed by jetting the ink again from the head onto a polyethylene terephthalate (PET) film (manufactured by Toray Industries, Inc.) serving as a substrate and irradiating the impacted ink with UV light (irradiation dose: 1000 mW/cm$^2$).

The obtained image was visually observed, the presence of dot loss resulting from occurrence of nozzles with jetting failure was confirmed, and re-jetting properties after the composition was left to stand were evaluated.

<Jetting Conditions>

Number of channels: 318/head

Drive frequency: 4.8 kHz/dot

Ink drops: 7 drops, 42 pl

Temperature of head nozzle: 45° C.

<Evaluation Standard of Re-Jetting Properties after being Left to Stand>

3: In jetting after 5 minutes from the first jetting, occurrence of dot loss resulting from the occurrence of nozzles with jetting failure was not found and an excellent image was obtained.

2: In jetting after 3 minutes from the first jetting, occurrence of dot loss resulting from the occurrence of nozzles with jetting failure was not found and an excellent image was obtained. However, in jetting after 4 minutes from the first jetting, occurrence of dot loss to the extent that does not inhibit practical use was slightly found.

1: In jetting after 2 minutes from the first jetting, occurrence of dot loss resulting from the occurrence of nozzles with jetting failure was not found and an excellent image was obtained. However, in jetting after 3 minutes from the first jetting, occurrence of dot loss to the extent that does not inhibit practical use was slightly found.

Other evaluations of the photosensitive composition G were performed in the same manner as in Example 1A.

TABLE 7

Photosensitive composition G (based on polyfunctional monomer, free from sensitizer, and having colorant)

| | Resin | | | | | | | |
|---|---|---|---|---|---|---|---|---|
| | Structural unit A | Structural unit B | | Copolymerization ratio (% by mass) | | | | Content based on total amount of composition |
| | a1 | b1 | b2 | a1 | b1 | b2 | Mw | (% by mass) | Color |
| Example 1G | (1-1) | (5-2) | — | 70 | 30 | — | 10000 | 50 | Y |
| Example 2G | (1-1) | (5-2) | (3-3) | 60 | 10 | 30 | 10000 | 50 | Y |
| Example 3G | (1-1) | (5-2) | (3-4) | 60 | 10 | 30 | 10000 | 50 | Y |
| Example 4G | (1-1) | (5-2) | (3-5) | 60 | 10 | 30 | 10000 | 50 | Y |
| Example 5G | (1-1) | (5-1) | (3-3) | 60 | 10 | 30 | 10000 | 50 | Y |
| Example 6G | (1-1) | (4-3) | (3-3) | 60 | 10 | 30 | 10000 | 50 | Y |

Photosensitive composition G (based on polyfunctional monomer, free from sensitizer, and having colorant)
Evaluation results

| | Pencil hardness | Blocking resistance | Adhesiveness | | | | | Storage stability | Jetting stability | Re-jetting properties after being left to stand |
|---|---|---|---|---|---|---|---|---|---|---|
| | | | PVC | A-PET | Acryl | PC | PS | | | |
| Example 1G | 2H | 5 | 0 | 0 | 0 | 0 | 0 | 4 | 4 | 1 |
| Example 2G | 2H | 5 | 0 | 0 | 0 | 0 | 0 | 4 | 5 | 3 |
| Example 3G | 2H | 5 | 0 | 0 | 0 | 0 | 0 | 4 | 5 | 3 |
| Example 4G | 2H | 5 | 0 | 0 | 0 | 0 | 0 | 4 | 5 | 3 |
| Example 5G | 2H | 5 | 0 | 0 | 0 | 0 | 0 | 4 | 5 | 2 |
| Example 6G | 2H | 5 | 0 | 0 | 0 | 0 | 0 | 4 | 5 | 2 |

The disclosure of JP No. 2015-167974 filed on Aug. 27, 2015 is incorporated herein by reference.

In a case where all documents, patent applications, and technical standards described in the present specification are specified to be incorporated specifically and individually as cited documents, the documents, patent applications, and technical standards are incorporated herein in the same limited scope as the cited documents. The scope of the present invention is intended to be determined based on the following claims and the equivalents thereof.

The invention claimed is:

1. A photosensitive composition containing:
a resin which includes a structural unit A represented by Formula (1) or (2) and a structural unit B represented by Formula (3), (4), or (5); and
a radically polymerizable monomer,

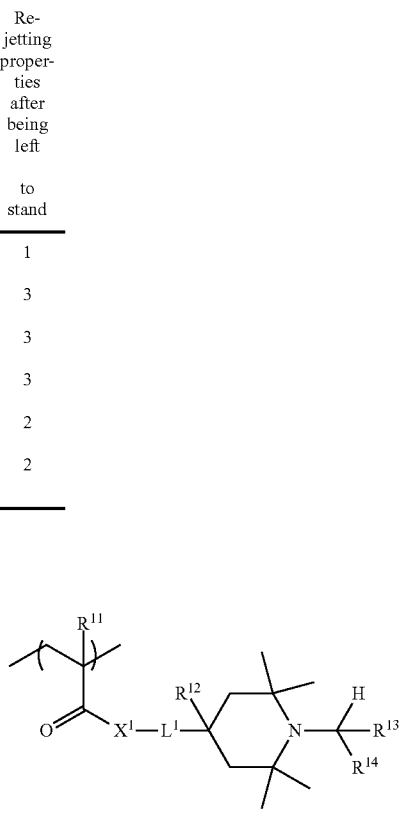

-continued

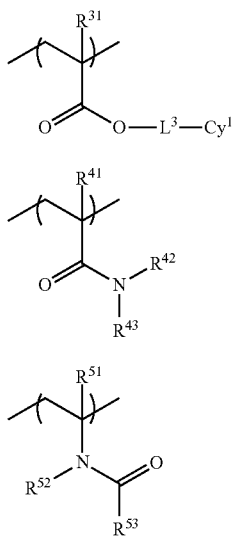

(3)

(4)

(5)

wherein, in Formula (1), $R^{11}$ represents a hydrogen atom or a hydrocarbon group, $R^{12}$, $R^{13}$, and $R^{14}$ each independently represent a hydrocarbon group, which may be substituted with a halogen atom and contain an oxygen atom, a hydrogen atom, or a hydroxyl group, $L^1$ represents a single bond or a divalent linking group, $X^1$ represents a —O— group or a —$NR^{15}$— group, and $R^{15}$ represents a hydrogen atom or a hydrocarbon group, in Formula (2), $R^{21}$ represents a hydrogen atom or a hydrocarbon group, $R^{22}$ represents a hydrocarbon group, which may be substituted with a halogen atom and contain an oxygen atom, a hydrogen atom, or a hydroxyl group, $R^{23}$ and $R^{24}$ each independently represent a hydrocarbon group, which may be substituted with a halogen atom and contain an oxygen atom, a hydrogen atom, or a hydroxyl group or $R^{23}$ and $R^{24}$ are integrated to represent an oxygen atom, $L^2$ represents a single bond or a divalent linking group, $X^2$ represents a —O— group or a —$NR^{25}$— group, and $R^{25}$ represents a hydrogen atom or a hydrocarbon group, in Formula (3), $R^{31}$ represents a hydrogen atom or a hydrocarbon group, $L^3$ represents a single bond or a divalent linking group, and $Cy^1$ represents a hydrocarbon group which may contain an oxygen atom and has a cyclic structure, in Formula (4), $R^{41}$ represents a hydrogen atom or a hydrocarbon group, $R^{42}$ and $R^{43}$ each independently represent a hydrocarbon group which may contain an oxygen atom, or a hydrogen atom, and $R^{42}$ and $R^{43}$ may be bonded to each other and form a ring, and in Formula (5), $R^{51}$ represents a hydrogen atom or a hydrocarbon group, $R^{52}$ and $R^{53}$ each independently represent a hydrogen atom or a hydrocarbon group, and $R^{52}$ and $R^{53}$ may be bonded to each other and form a ring, wherein the total content of the structural unit A and the structural unit B in the resin is 80% by mass or greater based on the total amount of the resin, and the content of the radically polymerizable monomer is 50% by mass or greater based on the total amount of the photosensitive composition; and wherein the proportion of the structural unit A in the total content of the structural unit A and the structural unit B in the resin is in a range of 30% by mass to 70% by mass.

2. The photosensitive composition according to claim 1, wherein, in Formula (1), $R^{11}$ represents a hydrogen atom or an alkyl group having 1 to 3 carbon atoms, $R^{12}$, $R^{13}$, and $R^{14}$ each independently represent a hydrocarbon group having 1 to 12 carbon atoms, which may be substituted with a halogen atom and contain an oxygen atom, a hydrogen atom, or a hydroxyl group, $L^1$ represents a single bond, an alkylene group having 1 to 3 carbon atoms, or a group represented by any one of Formulae (L11) to (L14), and $R^{15}$ represents a hydrogen atom or an alkyl group having 1 to 3 carbon atoms, in Formula (2), $R^{21}$ represents a hydrogen atom or an alkyl group having 1 to 3 carbon atoms, $R^{22}$ represents a hydrocarbon group having 1 to 12 carbon atoms, which may be substituted with a halogen atom and contain an oxygen atom, a hydrogen atom, or a hydroxyl group, $R^{23}$ and $R^{24}$ each independently represent a hydrocarbon group having 1 to 12 carbon atoms, which may be substituted with a halogen atom and contain an oxygen atom, a hydrogen atom, or a hydroxyl group or $R^{23}$ and $R^{24}$ are integrated to represent an oxygen atom, $L^2$ represents an alkylene group having 1 to 3 carbon atoms or a group represented by any one of Formulae (L21) to (L24), and $R^{25}$ represents a hydrogen atom or an alkyl group having 1 to 3 carbon atoms, in Formula (3), $R^{31}$ represents a hydrogen atom or an alkyl group having 1 to 3 carbon atoms, $L^3$ represents a single bond, an alkylene group having 1 to 3 carbon atoms, or a group represented by any one of Formulae (L31) to (L34), and $Cy^1$ represents a hydrocarbon group which may contain an oxygen atom, has a cyclic structure, and has 3 to 20 carbon atoms, in Formula (4), $R^{41}$ represents a hydrogen atom or an alkyl group having 1 to 3 carbon atoms, and $R^{42}$ and $R^{43}$ each independently represent a hydrogen atom or an alkyl group having 1 to 6 carbon atoms or $R^{42}$ and $R^{43}$ are bonded to each other and represent a group represented by any one of Formulae (N41) to (N44), and in Formula (5), $R^{51}$ represents a hydrogen atom or an alkyl group having 1 to 3 carbon atoms, and $R^{52}$ and $R^{53}$ each independently represent a hydrogen atom or an alkyl group having 1 to 6 carbon atoms or $R^{52}$ and $R^{53}$ are bonded to each other and represent a group represented by Formula (N51) or (N52), (L11)

$*1{-}(L{-}O)_n{-}*2$

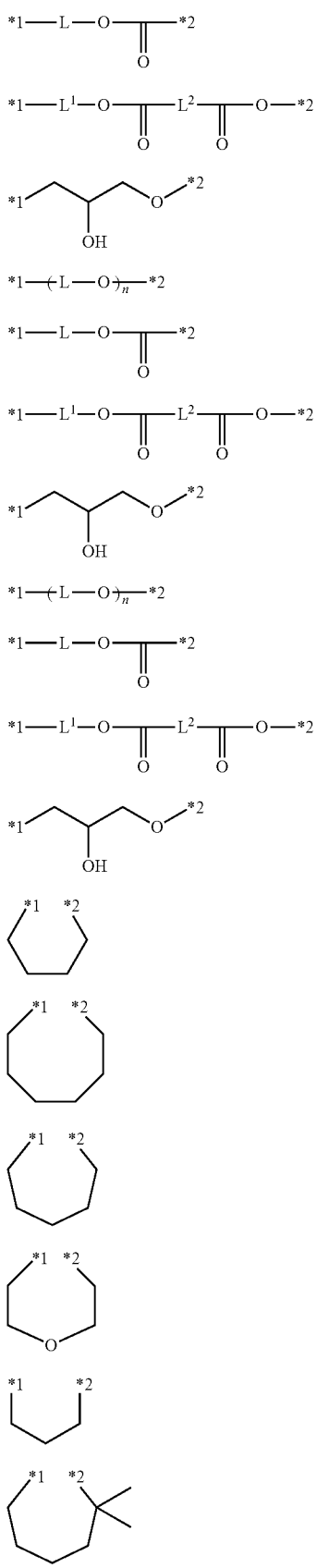

wherein, in Formula (L11), L represents an alkylene group having 1 to 3 carbon atoms, n represents an integer of 1 to 4, *1 represents a binding position with respect to $X^1$, and *2 represents a binding position with respect to a carbon atom, in Formula (L12), L represents an alkylene group having 1 to 3 carbon atoms, *1 represents a binding position with respect to $X^1$, and *2 represents a binding position with respect to a carbon atom, in Formula (L13), $L^1$ and $L^2$ each independently represent an alkylene group having 1 to 3 carbon atoms, *1 represents a binding position with respect to $X^1$, and *2 represents a binding position with respect to a carbon atom, in Formula (L14), *1 represents a binding position with respect to $X^1$, and *2 represents a binding position with respect to a carbon atom, in Formula (L21), L represents an alkylene group having 1 to 3 carbon atoms, n represents an integer of 1 to 4, *1 represents a binding position with respect to $X^2$, and *2 represents a binding position with respect to a carbon atom, in Formula (L22), L represents an alkylene group having 1 to 3 carbon atoms, *1 represents a binding position with respect to $X^2$, and *2 represents a binding position with respect to a carbon atom, in Formula (L23), $L^1$ and $L^2$ each independently represent an alkylene group having 1 to 3 carbon atoms, *1 represents a binding position with respect to $X^2$, and *2 represents a binding position with respect to a carbon atom, in Formula (L24), *1 represents a binding position with respect to $X^2$, and *2 represents a binding position with respect to a carbon atom, in Formula (L31), L represents an alkylene group having 1 to 3 carbon atoms, n represents an integer of 1 to 4, *1 represents a binding position with respect to an oxygen atom, and *2 represents a binding position with respect to $Cy^1$, in Formula (L32), L represents an alkylene group having 1 to 3 carbon atoms, *1 represents a binding position with respect to an oxygen atom, and *2 represents a binding position with respect to $Cy^1$, in Formula (L33), $L^1$ and $L^2$ each independently represent an alkylene group having 1 to 3 carbon atoms, *1 represents a binding position with respect to an oxygen atom, and *2 represents a binding position with respect to $Cy^1$, in Formula (L34), *1 represents a binding position with respect to an oxygen atom, and *2 represents a binding position with respect to $Cy^1$, in Formulae (N41) to (N44), *1 and *2 represent a binding position with respect to a nitrogen atom, and in Formulae (N51) and (N52), *1 represents a binding position with respect to a nitrogen atom, and *2 represents a binding position with respect to a carbon atom.

3. The photosensitive composition according to claim 1, wherein the structural unit A is at least one structural unit C selected from the group consisting of a structural unit represented by Formula (1-1), a structural unit represented by Formula (1-2), a structural unit represented by Formula (1-3), a structural unit represented by Formula (1-4), a structural unit represented by Formula (1-5), a structural unit represented by Formula (1-6), a structural unit represented by Formula (1-7), a structural unit represented by Formula (1-8), and a structural unit represented by Formula (2-1).

represented by Formula (3-3), a structural unit represented by Formula (3-4), a structural unit represented by Formula (3-5), a structural unit represented by Formula (4-1), a structural unit represented by Formula (4-2), a structural unit represented by Formula (4-3), a structural unit represented by Formula (4-4), a structural unit represented by Formula (5-1), a structural unit represented by Formula (5-2), and a structural unit represented by Formula (5-3).

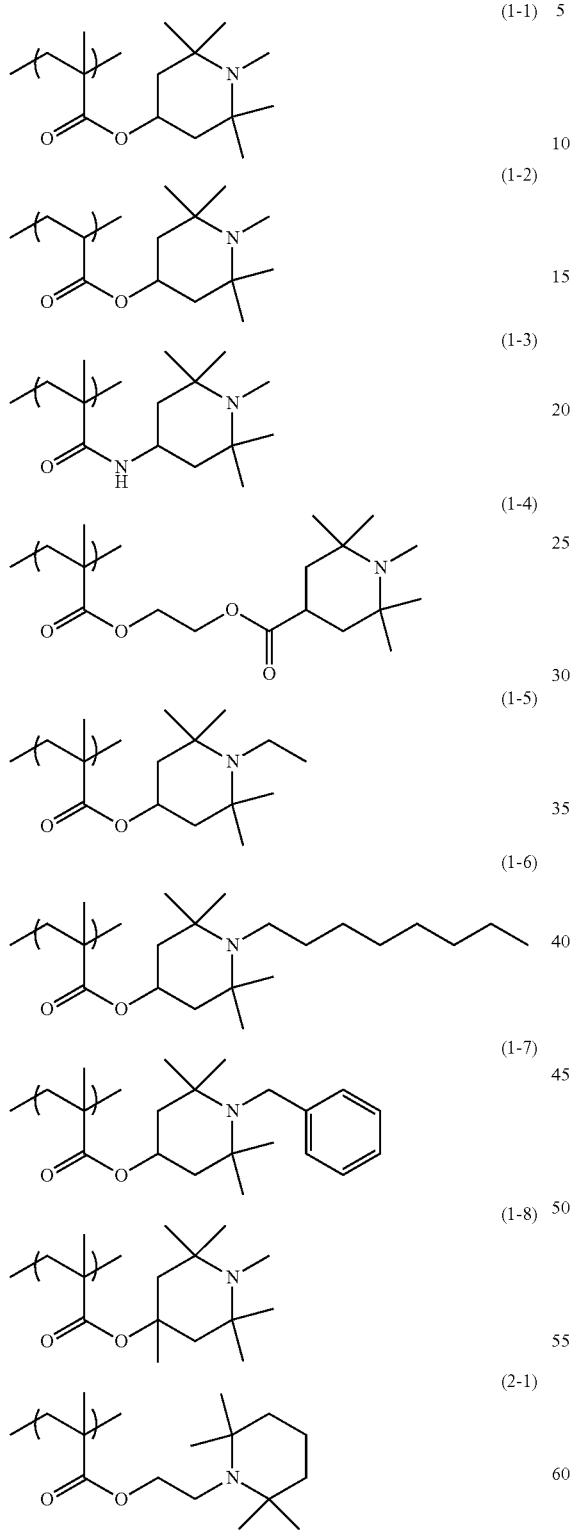

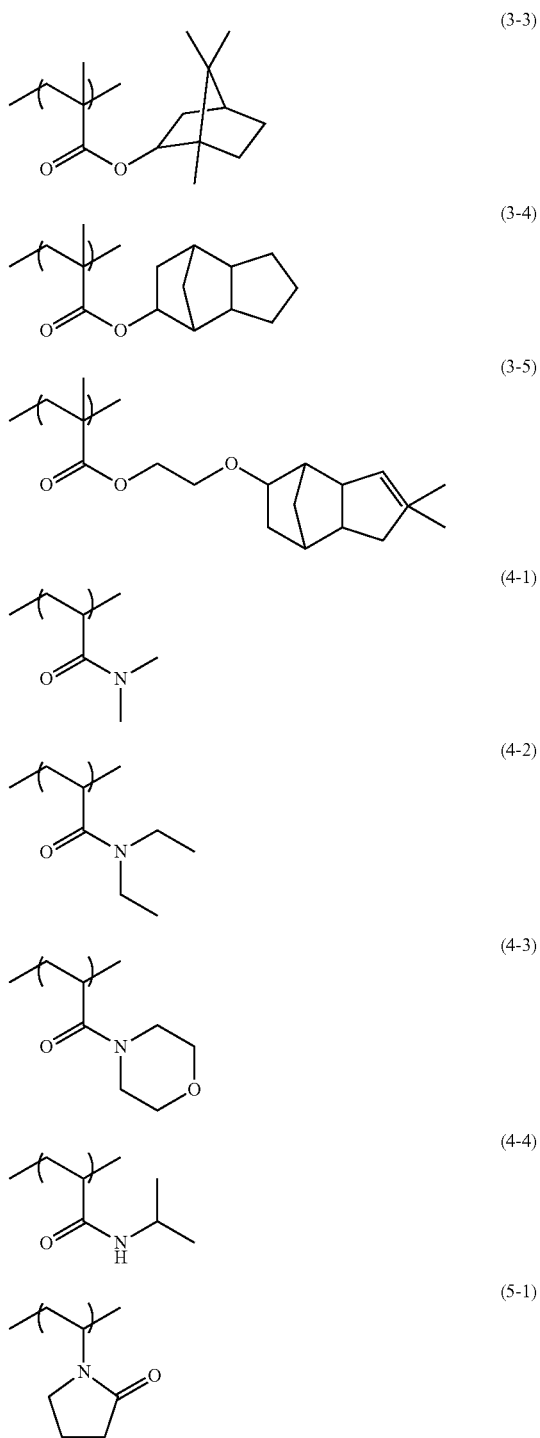

4. The photosensitive composition according to claim 1, wherein the structural unit B is at least one structural unit D selected from the group consisting of a structural unit

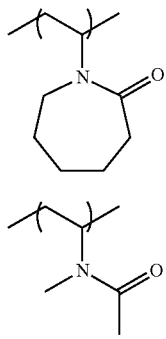

(5-2)

(5-3)

5. The photosensitive composition according to claim 1, wherein $Cy^1$ in Formula (3) includes a polycyclic structure as the cyclic structure, and
$R^{41}$ in Formula (4) represents a hydrogen atom.
6. The photosensitive composition according to claim 1, wherein the structural unit B includes at least one structural unit represented by Formula (3) and further includes at least one selected from the group consisting of structural units represented by Formulae (4) and (5).
7. The photosensitive composition according to claim 1, wherein the weight-average molecular weight of the resin is in a range of 1000 to 50000.
8. The photosensitive composition according to claim 1, wherein the content of the resin is in a range of 0.5% by mass to 10.0% by mass based on the total amount of the photosensitive composition.
9. The photosensitive composition according to claim 1, wherein the radically polymerizable monomer includes a monofunctional radically polymerizable monomer.
10. The photosensitive composition according to claim 1, further containing a photopolymerization initiator.
11. An image forming method comprising:
an application process of applying an ink composition which is the photosensitive composition according to claim 1 onto a recording medium according to an ink-jet method; and
an irradiation process of irradiating the ink composition applied onto the recording medium with active energy rays.
12. A film forming method comprising:
an application process of applying the photosensitive composition according to claim 1 onto a substrate; and
an irradiation process of irradiating the photosensitive composition applied onto the substrate with active energy rays.
13. A resin comprising:
at least one structural unit C selected from the group consisting of a structural unit represented by Formula (1-1), a structural unit represented by Formula (1-2), a structural unit represented by Formula (1-3), a structural unit represented by Formula (1-4), a structural unit represented by Formula (1-5), a structural unit represented by Formula (1-6), a structural unit represented by Formula (1-7), a structural unit represented by Formula (1-8), and a structural unit represented by Formula (2-1); and
at least one structural unit D selected from the group consisting of a structural unit represented by Formula (3-3), a structural unit represented by Formula (3-4), a structural unit represented by Formula (3-5), a structural unit represented by Formula (4-1), a structural unit represented by Formula (4-2), a structural unit represented by Formula (4-3), a structural unit represented by Formula (4-4), a structural unit represented by Formula (5-1), a structural unit represented by Formula (5-2), and a structural unit represented by Formula (5-3);

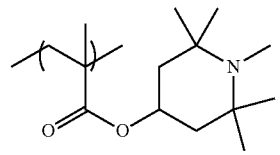

(1-1)

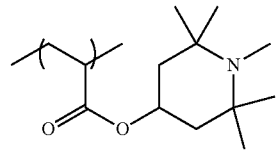

(1-2)

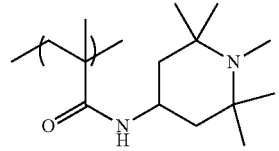

(1-3)

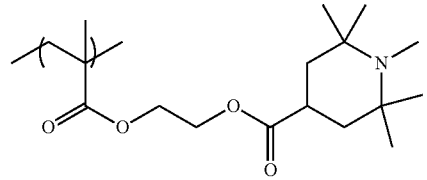

(1-4)

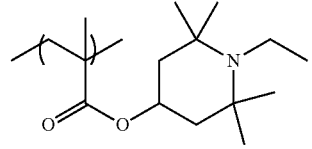

(1-5)

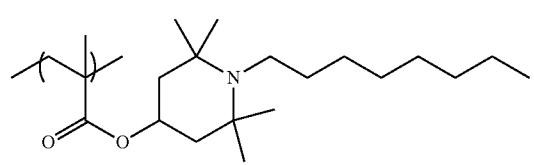

(1-6)

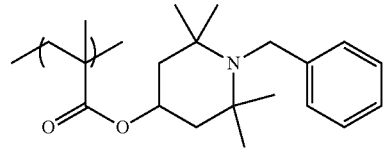

(1-7)

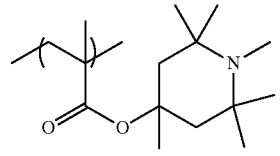

(1-8)

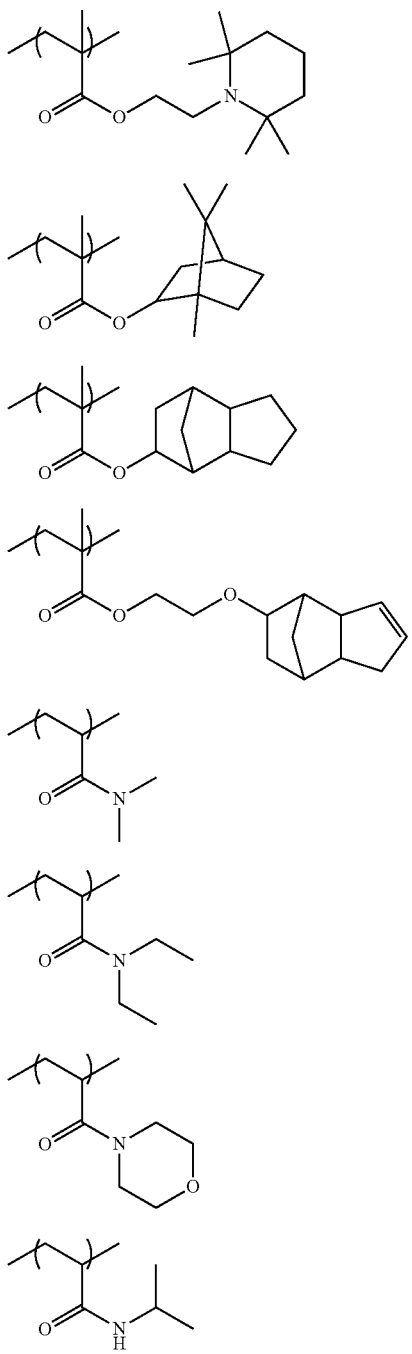
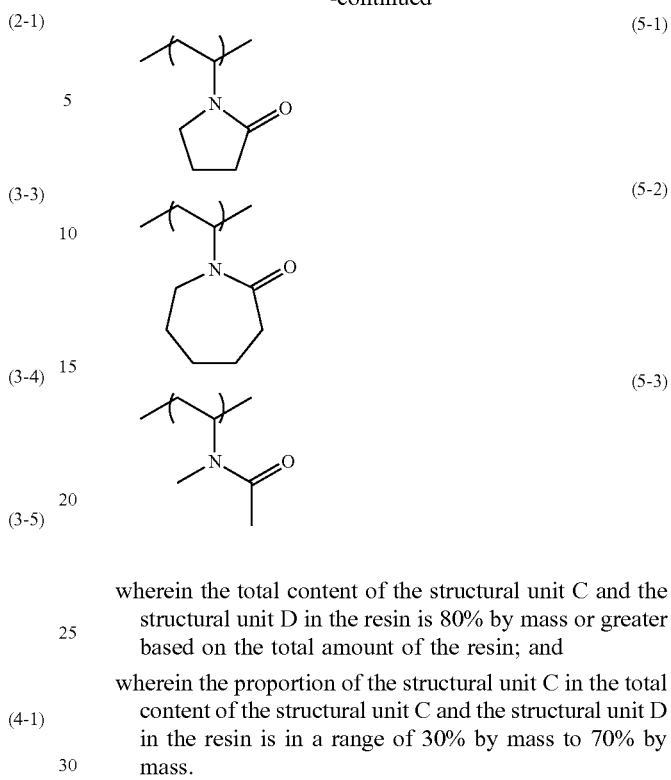

wherein the total content of the structural unit C and the structural unit D in the resin is 80% by mass or greater based on the total amount of the resin; and wherein the proportion of the structural unit C in the total content of the structural unit C and the structural unit D in the resin is in a range of 30% by mass to 70% by mass.

14. The resin according to claim 13, wherein the structural unit D includes at least one selected from the group consisting of a structural unit represented by Formula (3-3), a structural unit represented by Formula (3-4), and a structural unit represented by Formula (3-5) and further includes at least one selected from the group consisting of a structural unit represented by Formula (4-1), a structural unit represented by Formula (4-2), a structural unit represented by Formula (4-3), a structural unit represented by Formula (4-4), a structural unit represented by Formula (5-1), a structural unit represented by Formula (5-2), and a structural unit represented by Formula (5-3).

15. An image containing:

the resin according to claim 13.

16. A film containing:

the resin according to claim 13.

17. An inkjet ink comprising the photosensitive composition according to claim 1.

* * * * *